(12) United States Patent
Pollard, Jr. et al.

(10) Patent No.: US 12,736,171 B2
(45) Date of Patent: Sep. 15, 2026

(54) TV LIFT ASSIST

(71) Applicant: DISH Network L.L.C., Englewood, CO (US)

(72) Inventors: Jimmy A. Pollard, Jr., Boiling Springs, SC (US); John Pye, Inman, SC (US)

(73) Assignee: DISH Network L.L.C., Englewood, CO (US)

(*) Notice: Subject to any disclaimer, the term of this patent is extended or adjusted under 35 U.S.C. 154(b) by 280 days.

(21) Appl. No.: 18/498,236

(22) Filed: Oct. 31, 2023

(65) Prior Publication Data

US 2025/0137573 A1 May 1, 2025

(51) Int. Cl.
*F16M 11/04* (2006.01)
*F16M 7/00* (2006.01)
*F16M 11/08* (2006.01)

(52) U.S. Cl.
CPC ............ *F16M 11/046* (2013.01); *F16M 7/00* (2013.01); *F16M 11/08* (2013.01); *F16M 2200/028* (2013.01)

(58) Field of Classification Search
CPC ........ F16M 11/046; F16M 7/00; F16M 11/08; F16M 2200/028
USPC ......... 248/188.1, 188.2, 188.4, 188.5, 188.8, 248/188.9, 158, 161, 162.1, 157, 163.1
See application file for complete search history.

(56) References Cited

U.S. PATENT DOCUMENTS 10,991,279 B1 * 4/2021 Vande Waerdt ........ G09F 13/00
11,460,147 B2 * 10/2022 You ........................ F16M 11/16
2009/0095856 A1 * 4/2009 Nakatani ................ F16M 11/22 248/188.8
2020/0056738 A1 * 2/2020 Kuzmin .................. F16B 2/065

* cited by examiner

*Primary Examiner* — Alfred J Wujciak
(74) *Attorney, Agent, or Firm* — Wash Park IP Ltd.; John T Kennedy

(57) ABSTRACT

A TV lift assist device and methods of operation and assembly thereof are described. The device includes a TV Holder Assembly ("TVHA"), a riser assembly, and a stand assembly. The stand assembly include a center rail assembly and two outrigger rail assemblies coupled thereto. The outrigger rail assemblies extend from front to end, include a top and a bottom surface, a front foot pad, a Leg Height Adjustment Assembly, a first adjustable leg coupled to the first LHAA, and an end foot pad coupled to a bottom surface of the first adjustable leg. The LHAA facilitates levelling of the stand assembly by extensions or retractions of the first adjustable leg within the first LHAA when the first front foot pad is resting on a first surface at a first elevation and the first end foot pad is resting on a second surface at a second elevation.

20 Claims, 39 Drawing Sheets

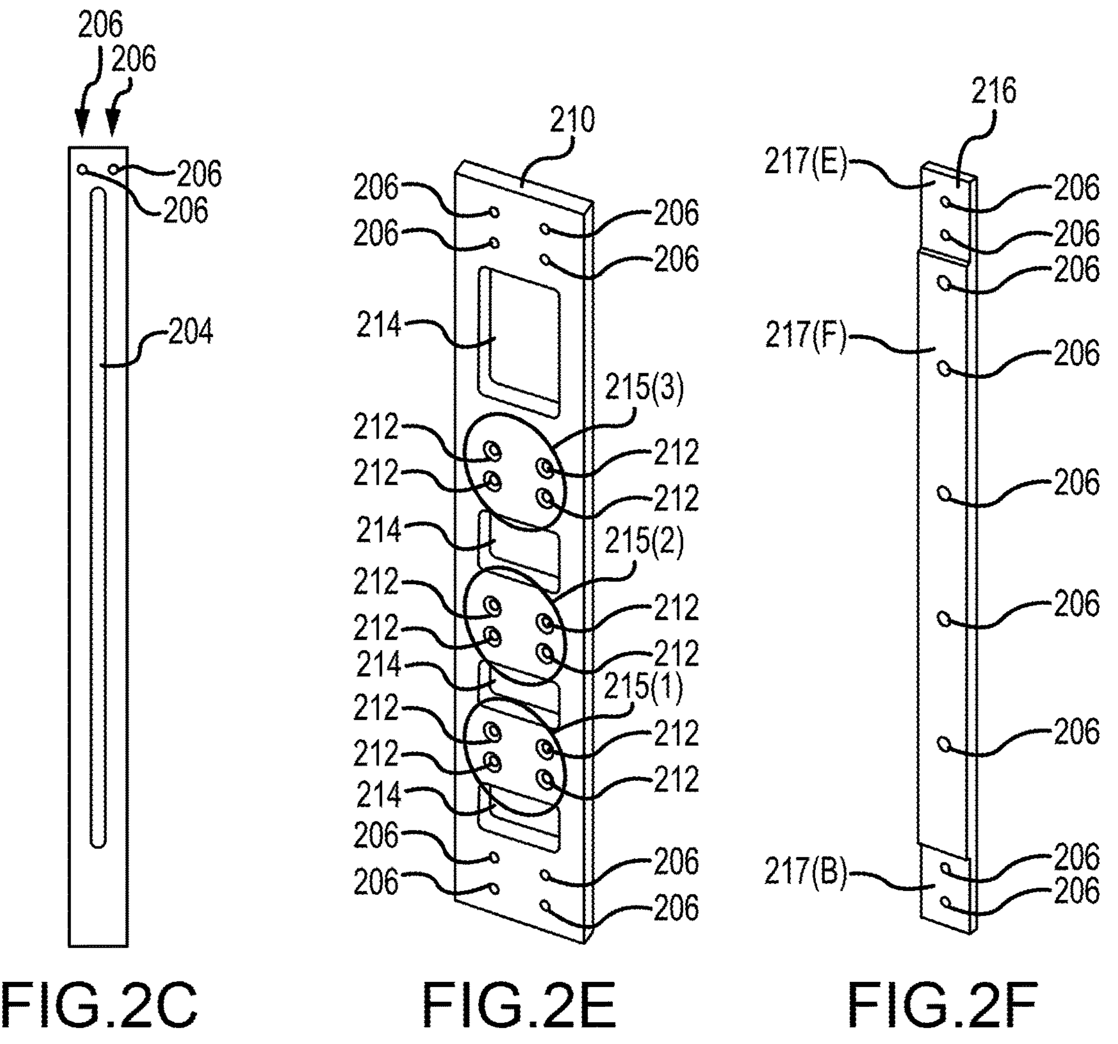
FIG.2C
FIG.2E
FIG.2F
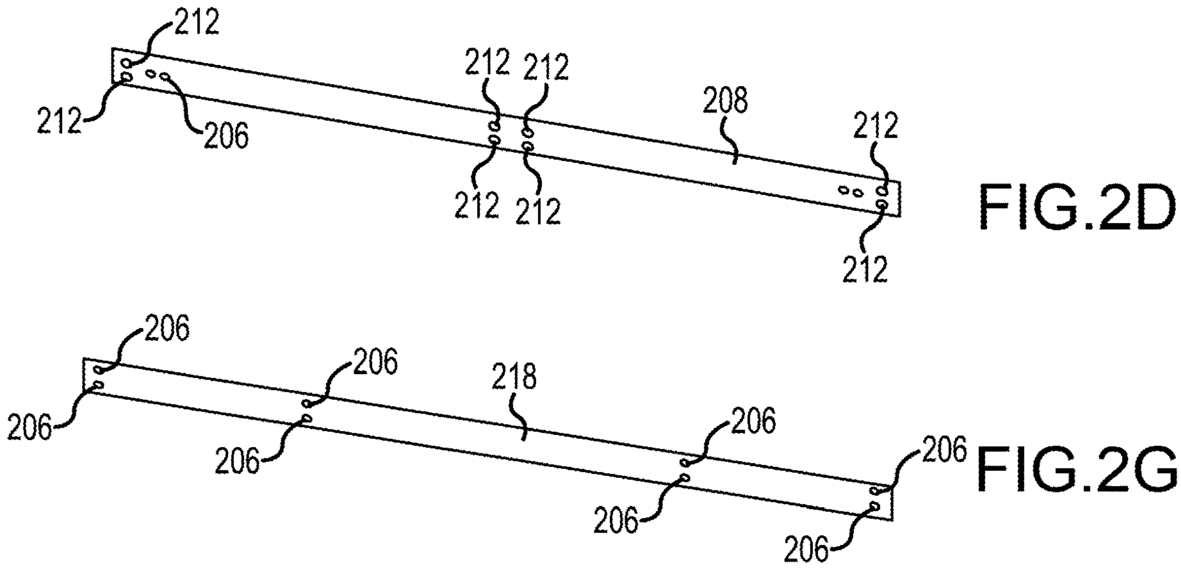
FIG.2D
FIG.2G

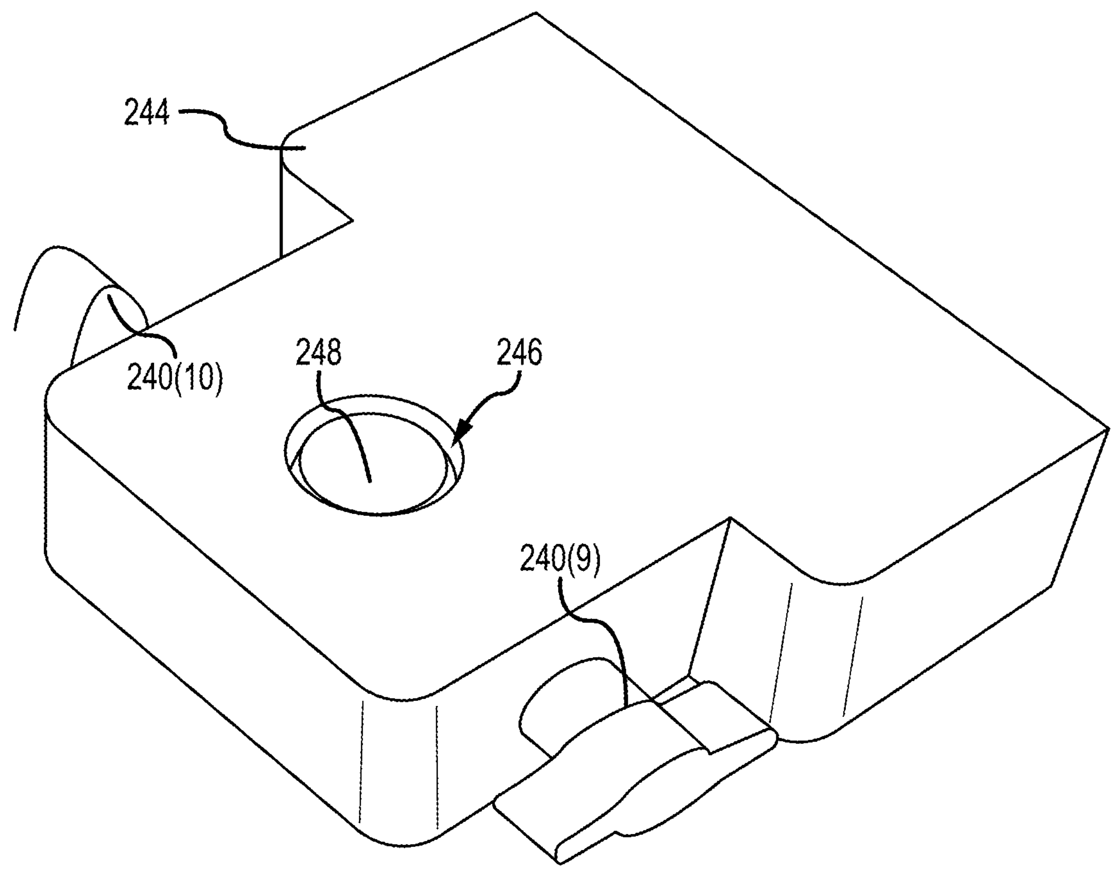
FIG.2N
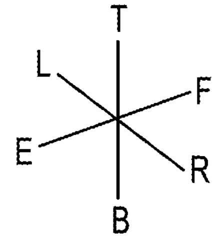

303(F)
206
303(E)
302
R
T
F
L
E
B

E
R
T
B
F
303(E)
303(F)
302

303(F)
206
302
206

R
F
T
L
B 400
206
213
408(F)
402(F)
406(L)
408(R)
410
402(E)
408(E)
406(R)
408(L)

402
404

206
406(R)

212
T
R
F
L
B
E 502
530
516(L)
528(LT)
510
514
512
538
240(12)
500
504(L)
504(R)
528(RT)
506(R)
518(R)
528(RB)
508
539
532
240(11)
A2
534
536
T
L
E
F
R
B

504(R)

506(R)

508

510

536
T
L
F
B
E
R

T
F
R
B
L
E
534

540
542
206
206

L
B
F
R
E
T
532

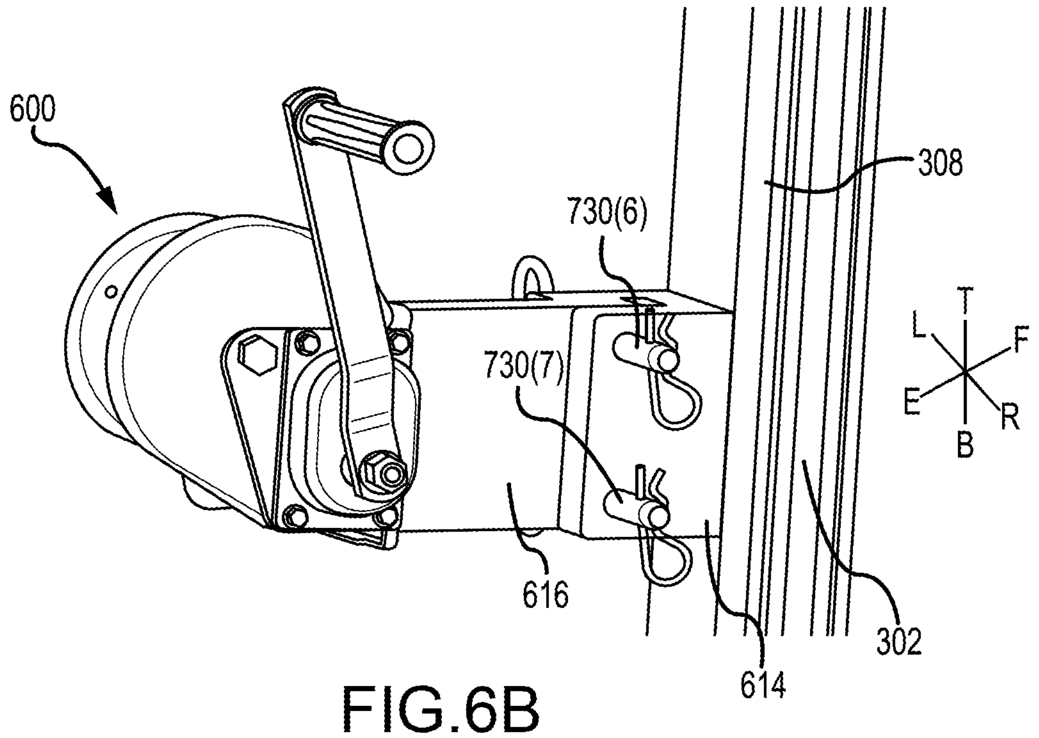
FIG.6B
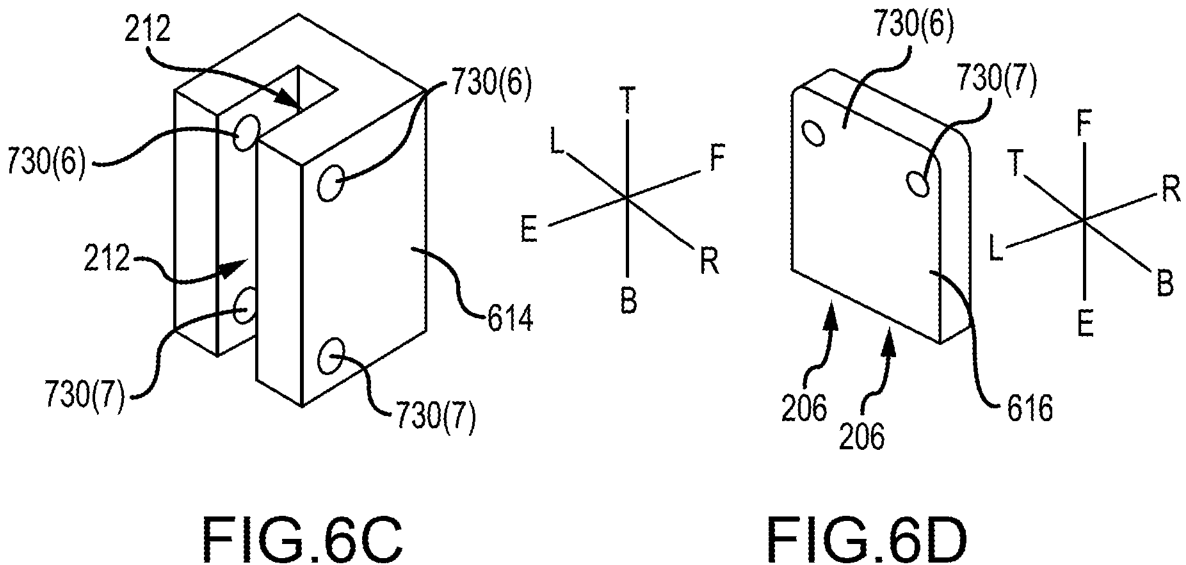
FIG.6C
FIG.6D

714(L)
712(L)
711(L)
754(L)
738(3)
708(L)
710(L)
702
706
704
738(4)

L
T
F
B
R
738(2)
710(R)
754(R)
712(R)
708(R)
711(R)
714(R)

206
723
722
730(4)
724(L)
724(C)
724(R)
212
206(X4)
732
732(1)
732(2)
730(5)
734

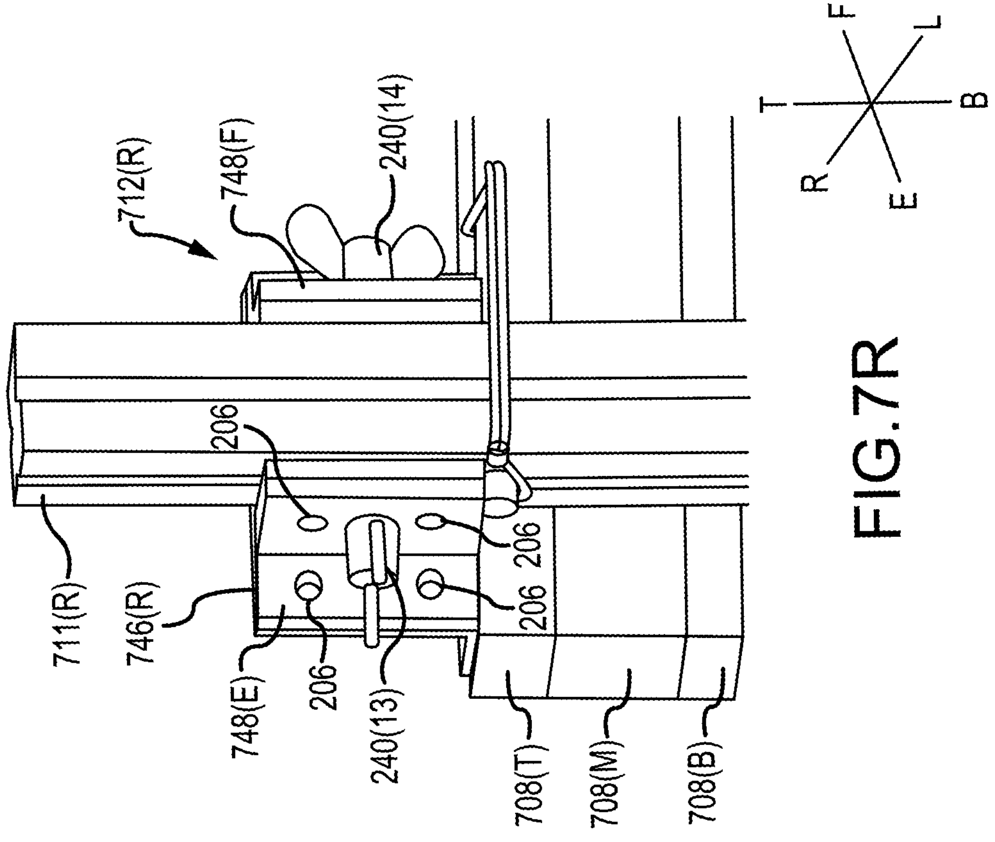
FIG.7R
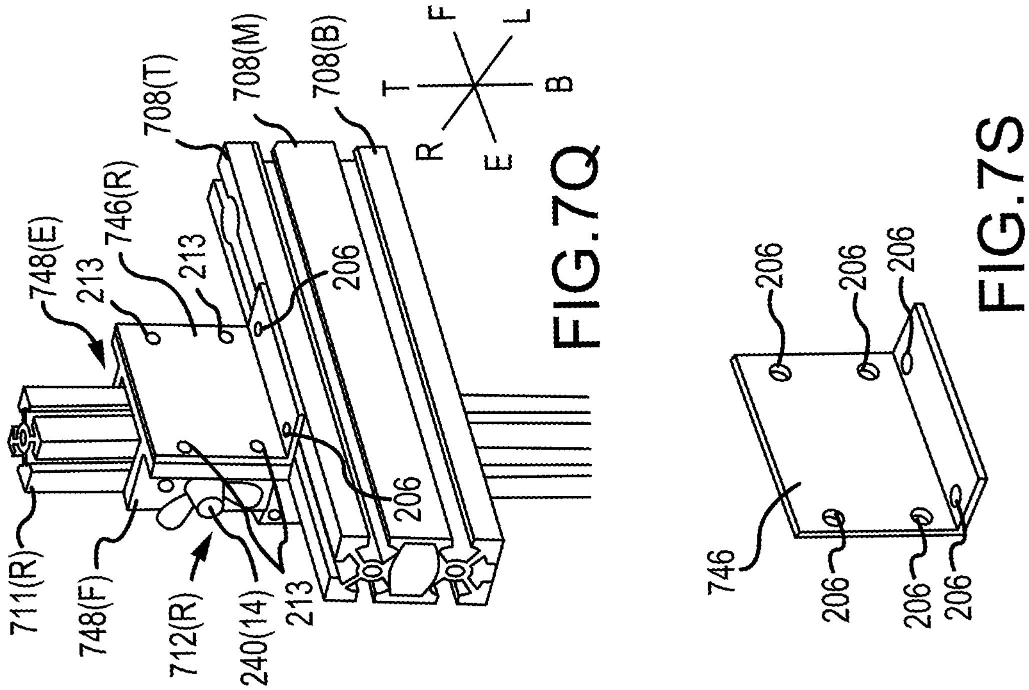
FIG.7Q
FIG.7S

TV LIFT ASSIST

TECHNICAL FIELD

The subject matter described herein relates to devices, systems, and methods for assisting technicians with mounting a television ("TV") on a wall or other vertically extending surface.

BACKGROUND

A TV commonly is available in various sizes and weights, with TVs ranging from four (4) pounds for a 19" diagonal screen, to twenty (20) pounds, for a fifty inch diagonal screen TV, and to over one-hundred and thirty (130) pounds for a ninety-eight (98) inch or larger diagonal screen TV. TVs are often mounted to walls or other substantially vertical surfaces. Commonly the mounting height for the TV is four feet or higher above the floor. Further, TVs commonly have Light-Emitting-Diode (LED) and other surfaces which can be damaged when pressure is applied to them and are not impact resistant (e.g., due to being dropped). Accordingly, mounting a TV to a wall is often a challenging endeavor given the size, weight, form factor, lack of impact resistance and the like.

Commonly, mounting a TV greater than ten (10) pounds requires two persons. Mounting a TV greater than forty (40) pounds often requires three persons, two to hold opposite ends of the TV while another person guides the TV onto a mounting bracket pre-attached to the wall.

Further, various non-movable obstacles often are located below a vertical wall surface on which a given TV is to be mounted. For example, a fireplace or the like may be located on the wall and below a given mounting location for a TV above the fireplace. Such fireplaces may include thresholds and other obstacles which further increase the challenge of mounting the TV to the wall.

Accordingly, a TV lift assist device is needed which facilitates mounting of a TV onto a wall. Further, a TV lift assist device that facilitates mounting of the TV above a fireplace or the like is needed. Further a TV lift assist device that facilitates mounting of a TV by a single technician is needed. Further, a TV lift assist device that is portable and can be assembled/disassembled inside the room (or other area) in which the TV is to be mounted is needed.

The various implementations of the present disclosure address these and other needs that arise when mounting a TV to wall.

SUMMARY

In accordance with at least one implementation of the present disclosure, a TV lift assist device includes the following: a TV Holder Assembly ("TVHA") configured for holding a television ("TV") during at least one TV mounting operation; a riser assembly, coupled to the TVHA; and a stand assembly, coupled to the riser assembly.

For at least one implementation, the stand assembly includes: a center rail assembly; and a first outrigger rail assembly coupled to the center rail assembly. The first outrigger rail assembly may extend from a front to an end of the first outrigger rail assembly, and includes a top surface and a bottom surface. In relation to an X Y Z coordinate system, where "front" corresponds to a +X axis; "end" corresponds to a −X axis; "right" corresponds to a +Y axis; "left" corresponds to a −Y axis; "top" corresponds to a +Z axis; and "bottom" corresponds to a −Z axis, the first outrigger rail assembly may include: a first front foot pad coupled to the bottom surface and at a first location proximate to the first outrigger rail assembly; a first Leg Height Adjustment Assembly ("LHAA") coupled to the first outrigger rail assembly at a second location proximate to the end of the first outrigger rail assembly; a first adjustable leg coupled to the first LHAA; and a first end foot pad coupled to a bottom surface of the first adjustable leg.

For at least one implementation, the first LHAA facilitates levelling of the stand assembly by extensions or retractions of the first adjustable leg within the first LHAA when the first front foot pad is resting on a first surface at a first elevation and the first end foot pad is resting on a second surface at a second elevation.

For at least one implementation, the first elevation is higher than the second elevation. The first surface may be a top surface of a hearth in a room and the second surface may be a floor of the room.

For at least one implementation, the first LHAA may include: a front facing LHAA leg bracket, coupled the first outrigger rail assembly; and an end facing LHAA leg bracket, coupled to first outrigger rail assembly; and wherein, to level the stand assembly, the first adjustable leg is configured to be raised and lowered within a first channel formed by the front facing LHAA leg bracket and the end facing LHAA leg bracket.

For at least one implementation, the stand assembly may include a cotter pin; the adjustable leg includes at least two cotter pin holes; and the height of the second location above the second foot pad is configured by inserting the cotter pin through a given cotter pin hole, selected from the at least two cotter pin holes, then located below a bottom of the channel formed by the front facing LHAA leg bracket and the end facing LHAA leg bracket.

For at least one implementation, the first LHAA may include: a first LHAA rail bracket coupled to the top surface of the first outrigger rail assembly; a first adjustment knob; and the first LHAA rail bracket may be further coupled to each of the front facing LHAA leg bracket and to the end facing LHAA leg bracket. The front facing LHAA leg bracket may include a first hole for receiving the first adjustment knob and upon tightening of the first adjustment knob, the adjustable leg is fastened to the outrigger rail assembly.

For at least one implementation, the outrigger rail assembly may include: a top rail portion; a middle rail portion; and a center rail portion. At least one of the top rail portion, the middle rail portion and the center rail portion may have a T-slotted configuration. A second outrigger rail assembly may be configured as a mirror image of the first outrigger rail assembly.

For at least one implementation, the first outrigger rail assembly is couplable to the center rail assembly by an Outrigger Rail Mating Assembly ("ORMA") having: a top ORMA plate configured for permanent fastening to the top surface of the outrigger rail assembly; a bottom ORMA plate configured for permanent fastening to the bottom surface of the outrigger rail assembly; a front ORMA plate, permanently fastened to a front edge of each of the top ORMA plate and the bottom ORMA plate, and having at least one cotter pin hole; and an end ORMA plate, permanently fastened to an end edge each of the top ORMA plate and the bottom ORMA plate, and having at least one cotter pin hole. When coupled together, the top ORMA plate, bottom ORMA plate, front ORMA plate and end ORMA plate form a pocket for receiving an end of the center rail assembly. The center rail assembly may include a cotter pin hole located along the center rail assembly. Upon insertion of the end of the center rail assembly into the pocket, the cotter pin hole in the center rail assembly, the cotter pin hole in the front ORMA plate and the cotter pin hole the end ORMA plate align to facilitate insertion therein of a second cotter pin. Upon insertion of the second cotter pin into the cotter pin holes, the center rail assembly is non-permanently fastened to the first outrigger rail assembly.

For at least one implementation, the stand assembly includes a front rail assembly, extending perpendicularly to and away from the center rail assembly towards the front. The center rail assembly may be non-permanently fastened to a riser assembly shaft and permanently fastened to the front rail assembly by a riser assembly shaft mating assembly ("RSMA").

For at least one implementation, the RSMA includes: a RSMA center angle bracket; a RSMA shaft bracket; a RSMA left angle bracket; a RSMA right angle bracket; a left front RSMA right-angle bracket; and a right front RSMA right-angle bracket.

The front rail assembly may be coupled to the RSMA shaft bracket by the RSMA center angle bracket. The front rail assembly may be coupled to the center rail assembly by the left front RSMA right-angle bracket and by the right front RSMA right-angle bracket. The center rail assembly may be coupled to the RSMA shaft bracket by the RSMA left angle bracket and by the RSMA right angle bracket.

For at least one implementation, the RSMA includes: a left end RSMA right-angle bracket coupled to an end surface of the center rail assembly; a right end RSMA right-angle bracket coupled to the end surface of the center rail assembly; and a RSMA back brace having a given width. The left end RSMA right-angle bracket may be fastened, along the center rail assembly the given width from the right end RSMA right-angle bracket so as to accept insertion of the RSMA back brace therebetween. The RSMA back brace, when inserted between the left end RSMA right-angle bracket and the right end RSMA right-angle bracket increases the structural rigidity of the TV lift assist device when a riser assembly shaft is inserted into the RSMA.

For at least one implementation, the riser assembly may include: a riser assembly shaft; a middle riser assembly; an upper riser assembly; a hoist assembly; and a strap extending from the hoist assembly, over the upper riser assembly, and to the middle riser assembly to non-permanently fasten the hoist assembly to the middle riser assembly. Operation of the hoist assembly facilitates raising and lowering of the middle riser assembly, along the riser assembly shaft.

For at least one implementation, the middle riser assembly is non-permanently fastened to the TVHA; the middle riser assembly is non-permanently fastened to the riser assembly shaft; the upper riser assembly is non-permanently fastened to the riser assembly shaft; the hoist assembly is non-permanently fastened to the riser assembly shaft; and the riser assembly shaft is non-permanently fastened to the stand assembly.

For at least one implementation, the middle riser assembly facilitates extensions of the TVHA away from the riser assembly shaft. The middle riser assembly may facilitate yaw movements of the TVHA relative to a ground plane formed by an X-Y plane in the X Y Z coordinate system.

For at least one implementation, the TVHA may include: a left TVHA vertical plate; a left TVHA vertical support plate; a right TVHA vertical plate; a right TVHA vertical support plate; a TVHA upper horizontal plate; a TVHA front shelf plate; a TVHA end shelf plate; and a TVHA middle vertical plate. The left TVHA vertical support plate may be substantially parallel with and coupled to the left TVHA vertical plate. The right TVHA vertical plate may be substantially parallel to the left TVHA vertical plate. The right TVHA vertical support plate may be substantially parallel with and coupled to the right TVHA vertical plate. The TVHA upper horizontal plate may be perpendicular to and coupled on a left side of the TVHA to the left TVHA vertical support plate. The TVHA upper horizontal plate may be perpendicular to and coupled on a right side of the TVHA to the right TVHA vertical support plate. The TVHA front shelf plate may be perpendicular to and coupled on the left side of the TVHA to the left TVHA vertical support plate. The TVHA front shelf plate may be perpendicular to and coupled on the right side of the TVHA to the right TVHA vertical support plate. The TVHA end shelf plate may be substantially parallel to and coupled to the TVHA front shelf plate. The TVHA middle vertical plate may be substantially perpendicular to and coupled to TVHA upper horizontal plate. The TVHA middle vertical plate may be substantially perpendicular to and coupled to TVHA end shelf plate. The TVHA middle vertical plate may couple the TVHA to the riser assembly.

For at least one implementation, the left TVHA vertical support plate may be adjustably coupled to the left TVHA vertical plate, and the right TVHA vertical support plate may be adjustably coupled to the left TVHA vertical plate. An adjustment of the left TVHA vertical plate above the TVHA vertical support plate, and an adjustment of the right TVHA vertical plate relative to the right TVHA vertical support plate may configure the TVHA to hold a television having a height ranging between twenty-four (24) inches and sixty-four (64) inches.

For at least one implementation, the TVHA front shelf plate may be adjustably coupled to the TVHA end shelf plate and an adjustment of the TVHA front shelf plate relative to the TVHA end shelf plate may configure the TVHA to hold a television having a width ranging between twenty-four (24) inches and one hundred and twenty-four (124) inches.

For at least one implementation, the TVHA may include at least one of a left TVHA assist arm coupled to one of the left TVHA vertical plate. The left TVHA assist arm may stabilize the TV by extending a TVHA TV hook beyond a left vertical plane formed by a combination of the left TVHA vertical plate and the left TVHA vertical support plate. A right TVHA assist arm may be coupled to the right TVHA vertical plate. The right TVHA assist arm may stabilize the TV by extending the TVHA TV hook beyond a right vertical plane formed by a combination of the right TVHA vertical plate and the right TVHA vertical support plate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the various implementations described herein is provided in the following written description of various implementations and illustrated in the accompanying drawings.

BRIEF DESCRIPTION OF THE DRAWINGS

The disclosure will be readily understood by the following detailed description in conjunction with the accompanying drawings. For at least one implementation, given reference numerals designate like structural elements.

The use of cross-hatching in the accompanying figures is generally provided to indicate a surface of a cross-section cut. The use of contour lines, shading, or stippling in the accompanying figures is generally provided indicate surface features, including curved surfaces or changes in depth, to clarify boundaries between adjacent elements, and to facilitate legibility of the figures. Accordingly, neither the presence nor the absence of cross-hatching, contour lines, shading, or stippling conveys or indicates any preference or requirement for particular materials, material properties, element proportions, element dimensions, commonalities of similarly illustrated elements, or any other characteristic, attribute, or property for any element illustrated in the accompanying figures.

Additionally, the proportions and dimensions (either relative or absolute) of the various features and elements (and collections and groupings thereof) and the boundaries, separations, and positional relationships presented therebetween, are provided in the accompanying figures merely to facilitate an understanding of the various non-limiting implementations described herein and, accordingly, may not be presented or illustrated to scale, and do not indicate any preference or requirement for an illustrated implementation to the exclusion of other implementations described with reference thereto.

Figure 1A:
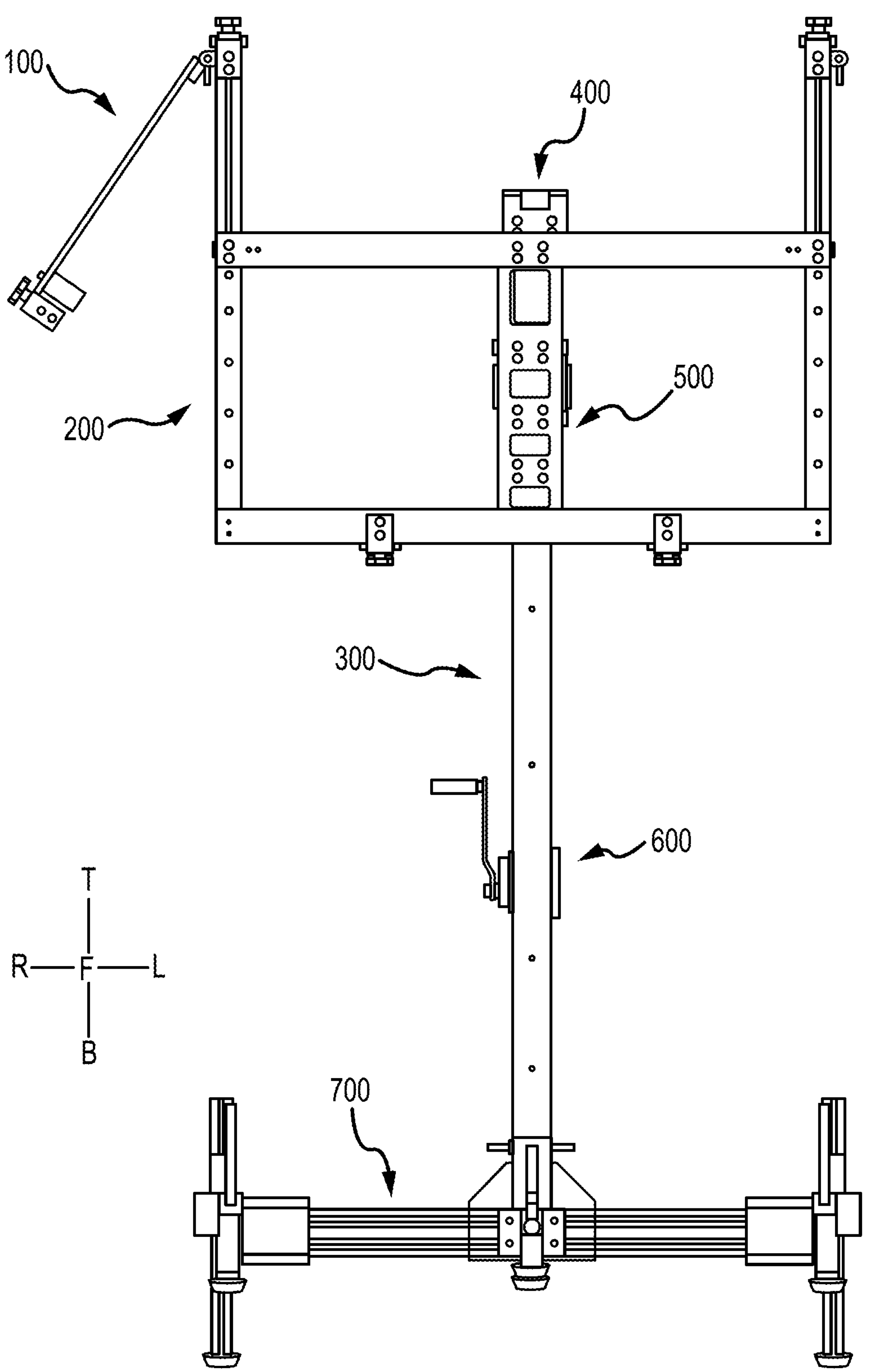

FIG. 1A is a front ("F") view of a TV lift assist device and in accordance with at least one implementation of the present disclosure.

Figure 1B:
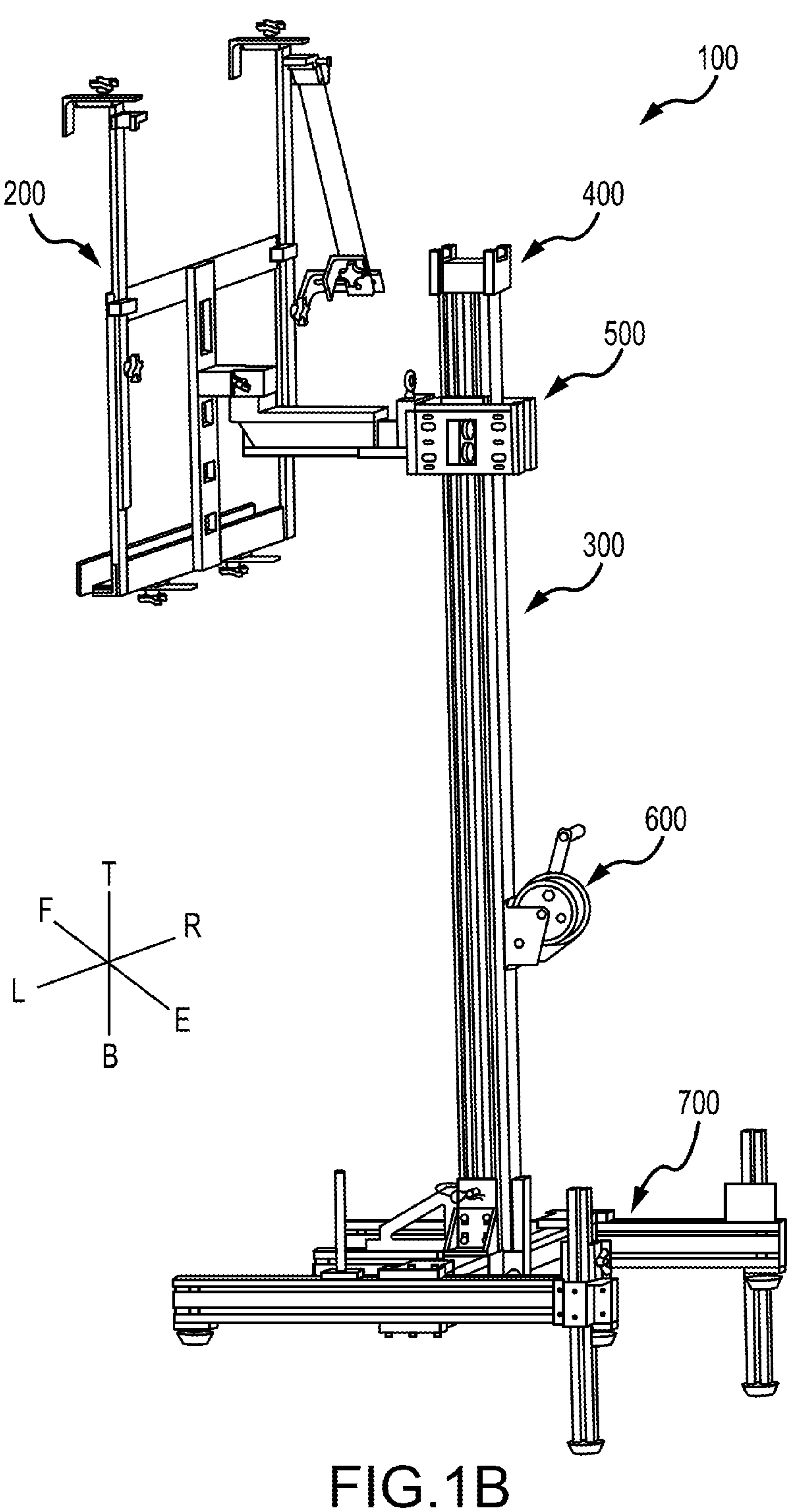

FIG. 1B is an isometric and right ("R") view of TV lift assist device implementation shown in FIG. 1A.

Figure 1C:
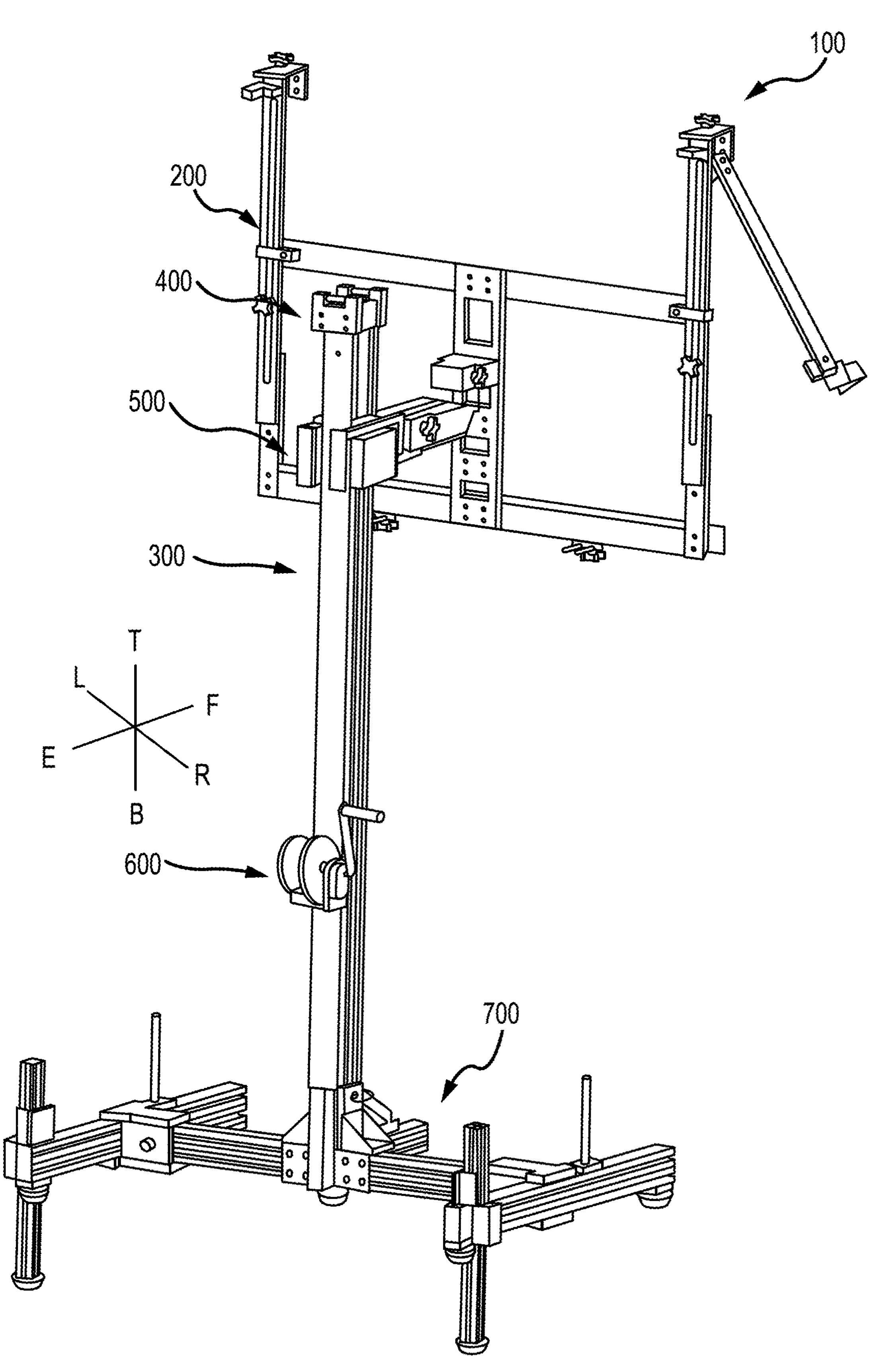

FIG. 1C is an isometric and end ("E") view of the TV lift assist device implantation shown in FIG. 1A.

Figure 1D:
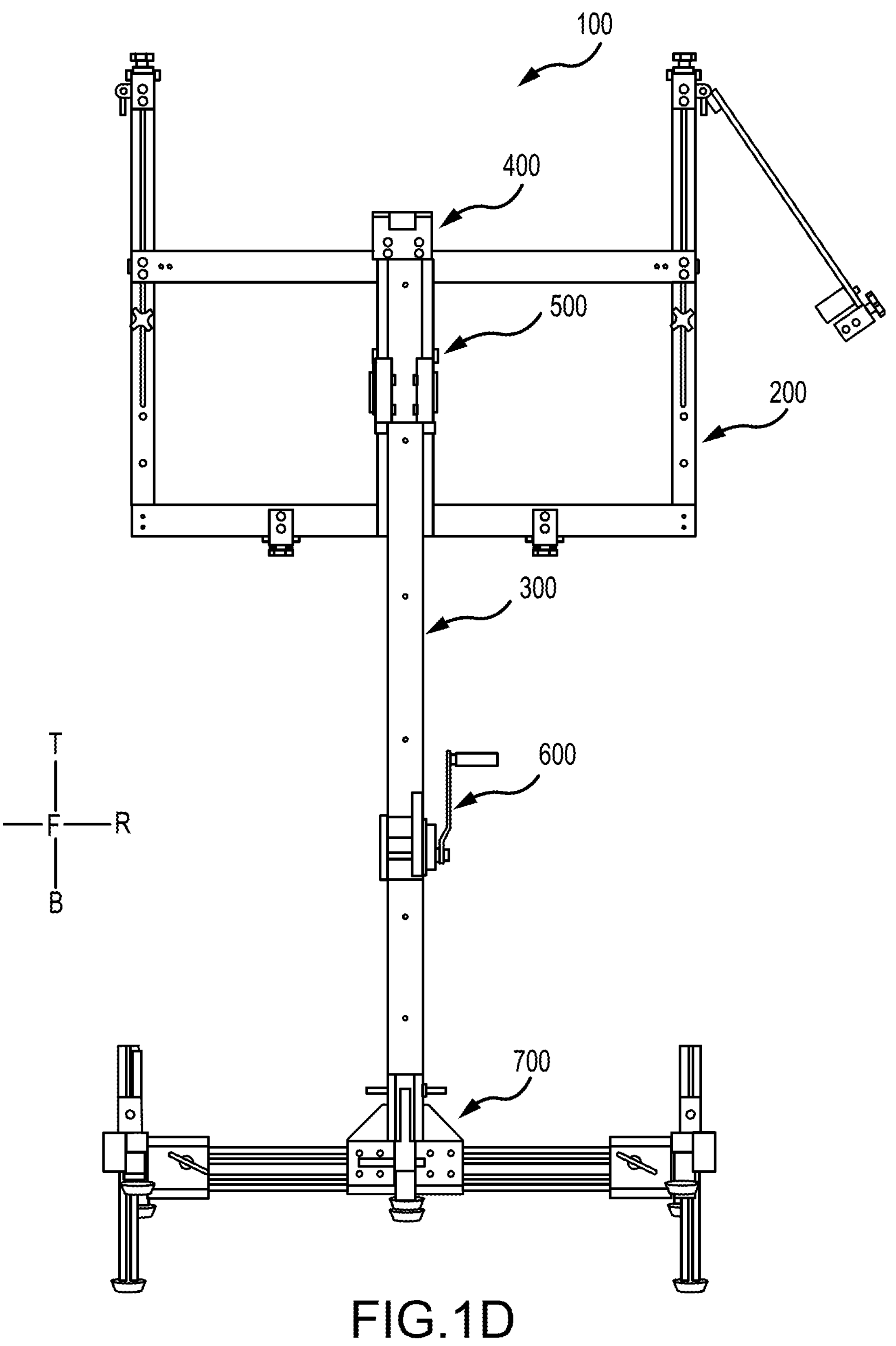

FIG. 1D is an end view of the TV lift assist device implementation shown in FIG. 1A.

Figure 1E:
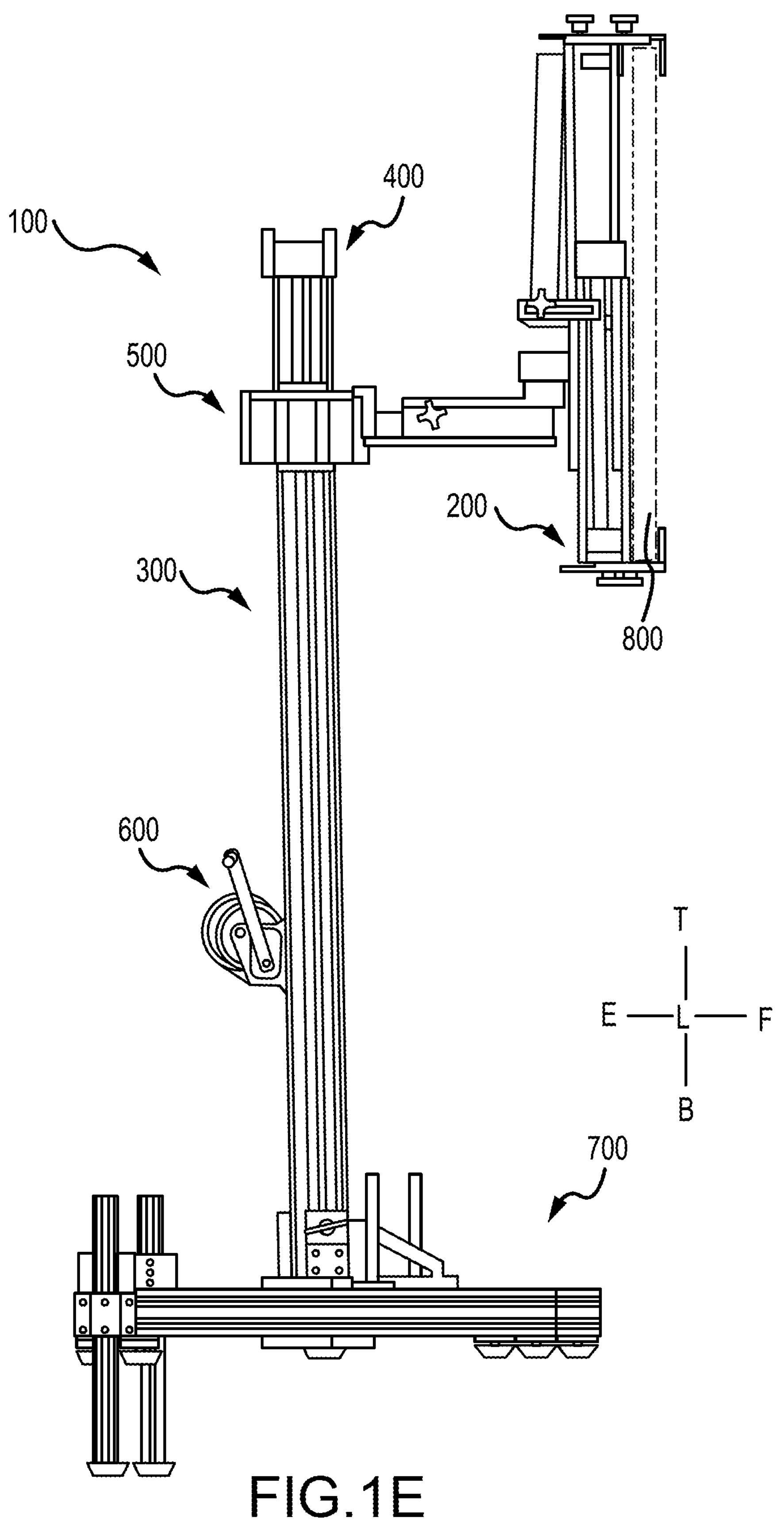

FIG. 1E is a left ("L") view of the TV lift assist device implementation shown in FIG. 1A.

Figure 2A:
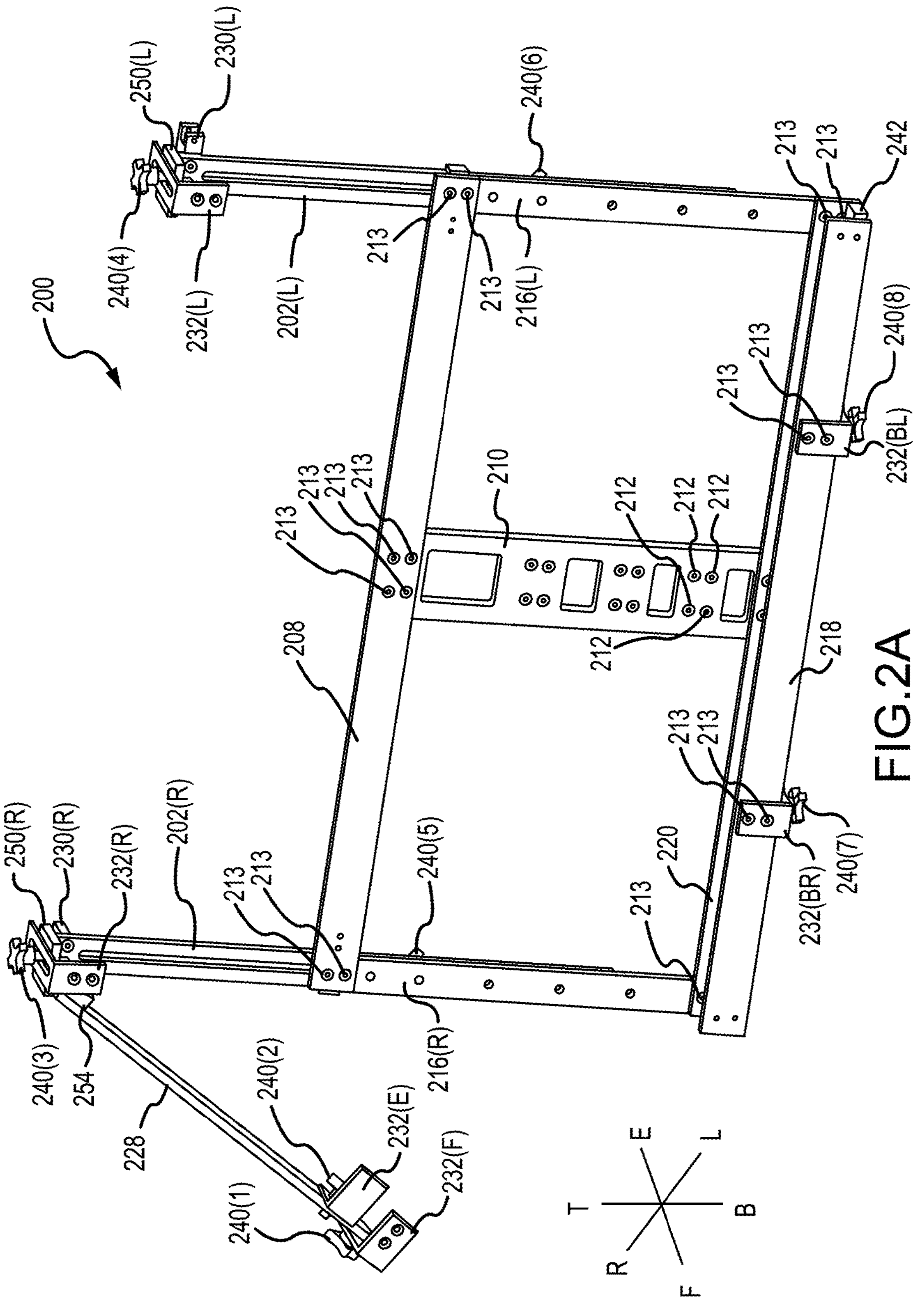

FIG. 2A is an isometric front (F) view of an implementation of a TVHA for the TV lift assist device implementation shown in FIGS. 1A-1E.

Figure 2B:
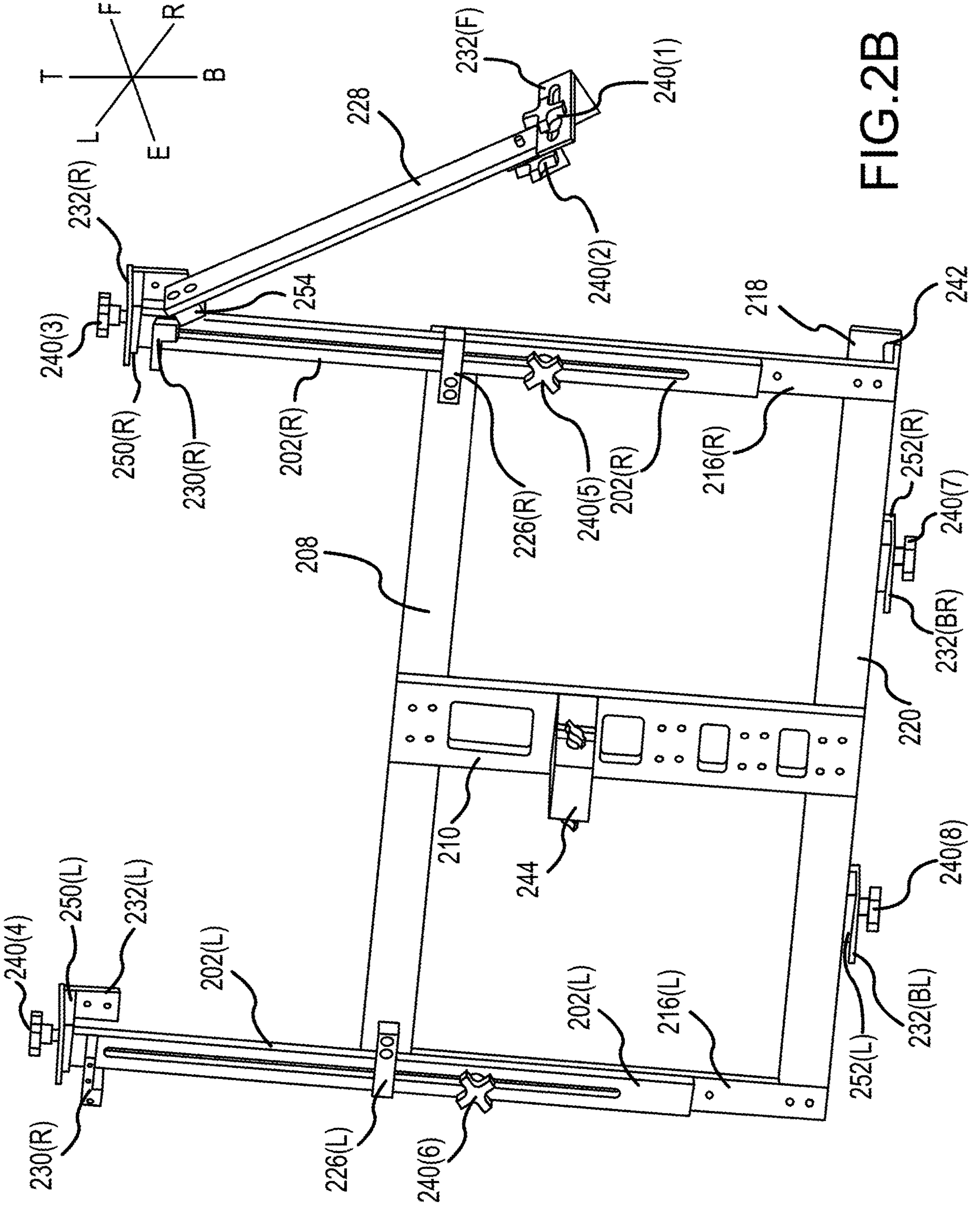

FIG. 2B is an isometric end (E) view of the implementation of the TVHA shown in FIG. 2A.

FIG. 2C is a front view of a vertical plate for the TVHA implementation shown in FIGS. 2A and 2B.

FIG. 2D is an isometric front (F) view of an upper horizontal plate for the TVHA implementation shown in FIGS. 2A and 2B.

FIG. 2E is an isometric front (F) view of a middle vertical plate for the TVHA implementation shown in FIGS. 2A and 2B.

FIG. 2F is an isometric front (F) view of a vertical support plate for the TVHA implementation shown in FIGS. 2A and 2B.

FIG. 2G is an isometric front (F) view of a front shelf plate for the TVHA implementation shown in FIGS. 2A and 2B.

Figure 2H:
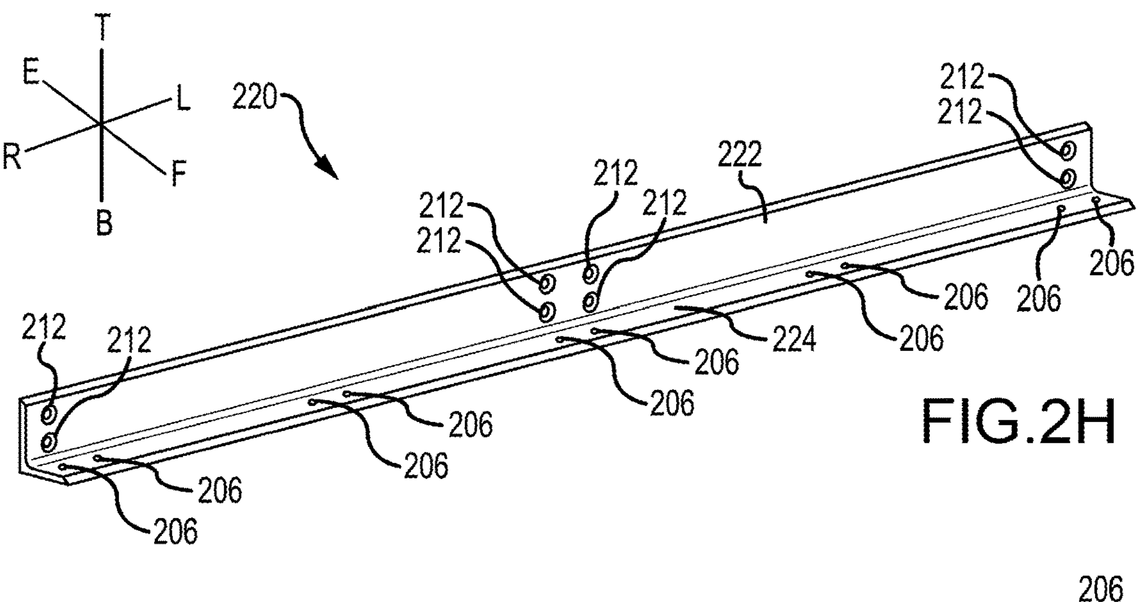

FIG. 2H is an isometric front (F) view of an end shelf plate for the TVHA implementation shown in FIGS. 2A and 2B.

Figure 2J:
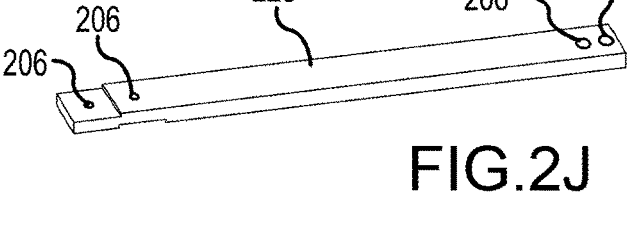
Figure 2I:
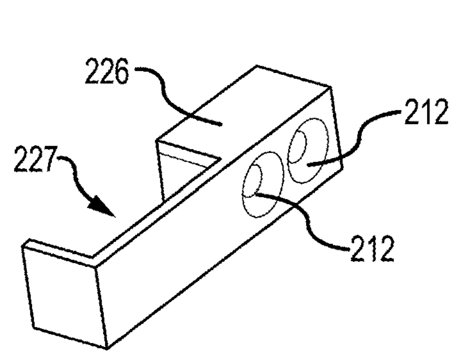

FIG. 2I is an isometric rear (R) view of a vertical support plate guide for the TVHA implementation shown in FIGS. 2A and 2B.

FIG. 2J is an isometric view of an assist arm for the TVHA implementation shown in FIGS. 2A and 2B.

Figure 2L:
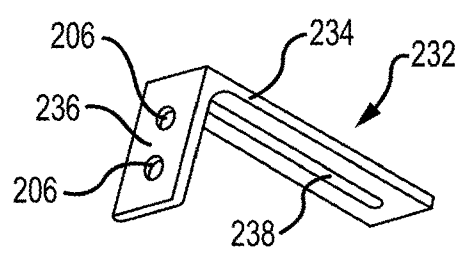
Figure 2K:
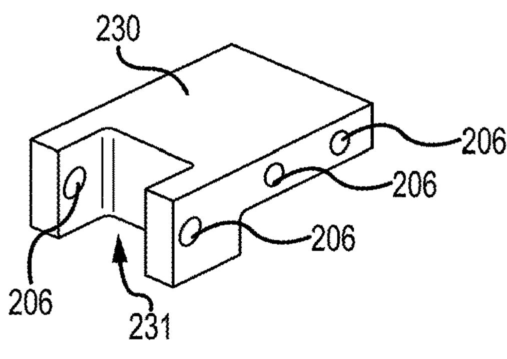

FIG. 2K is an isometric left (L) view of an assist arm block for the TVHA implementation shown in FIGS. 2A and 2B.

FIG. 2L is an isometric front (F) view of a TV hook for the TVHA implementation shown in FIGS. 2A and 2B.

Figure 2M:
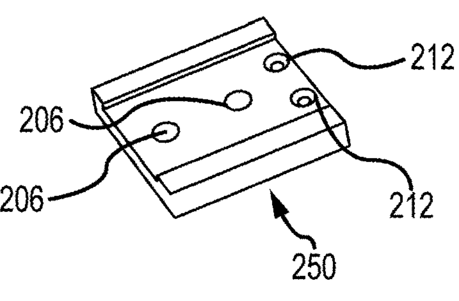

FIG. 2M is an isometric view of a top hold down plate for the TVHA implementation shown in FIGS. 2A and 2B.

FIG. 2N is an isometric front (F) view of a riser attachment block for the TVHA implementation shown in FIGS. 2A and 2B.

Figure 2O:
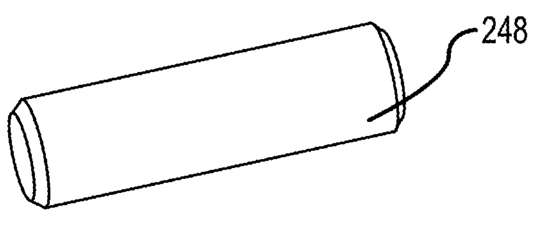

FIG. 2O is an isometric view of a dowel for the TVHA implementation shown in FIGS. 2A and 2B.

Figure 2P:
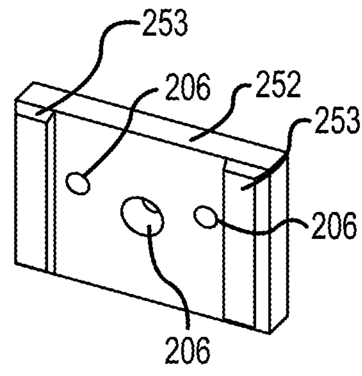

FIG. 2P is an isometric top (T) view of a bottom block for the TVHA implementation shown in FIGS. 2A and 2B.

Figure 2Q:
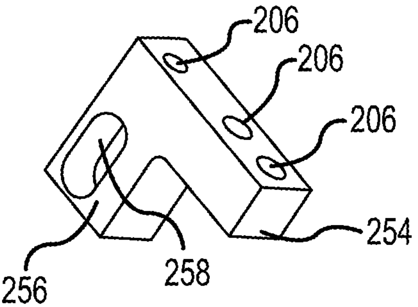

FIG. 2Q is an isometric view of an assist arm bearing block for the TVHA implementation show in FIGS. 2A and 2B.

Figure 2R:
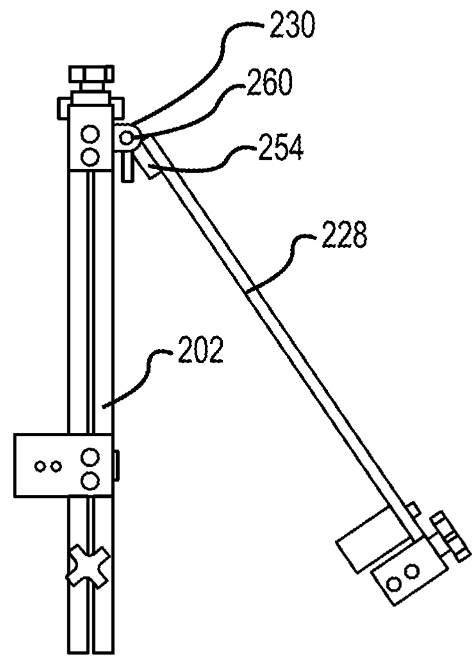

FIG. 2R is an end (E) plan view of an assembly of a TVHA assist arm with a TVHA vertical plate for the TVHA implementation shown in FIGS. 2A and 2B.

Figure 3A:
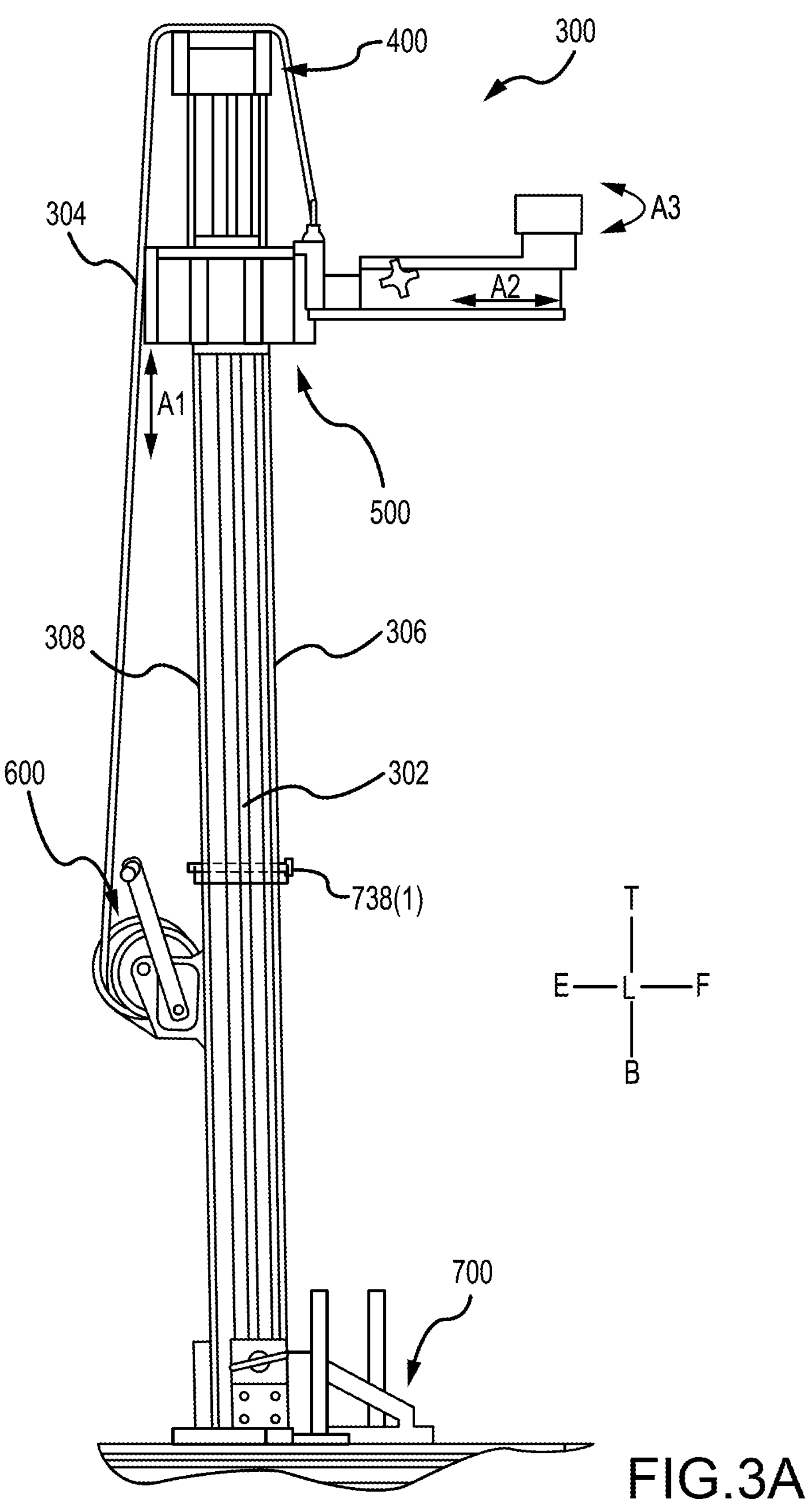

FIG. 3A is a side plan view of a riser assembly for the TV lift assist device implementation shown in FIGS. 1A-1E.

Figure 3B:
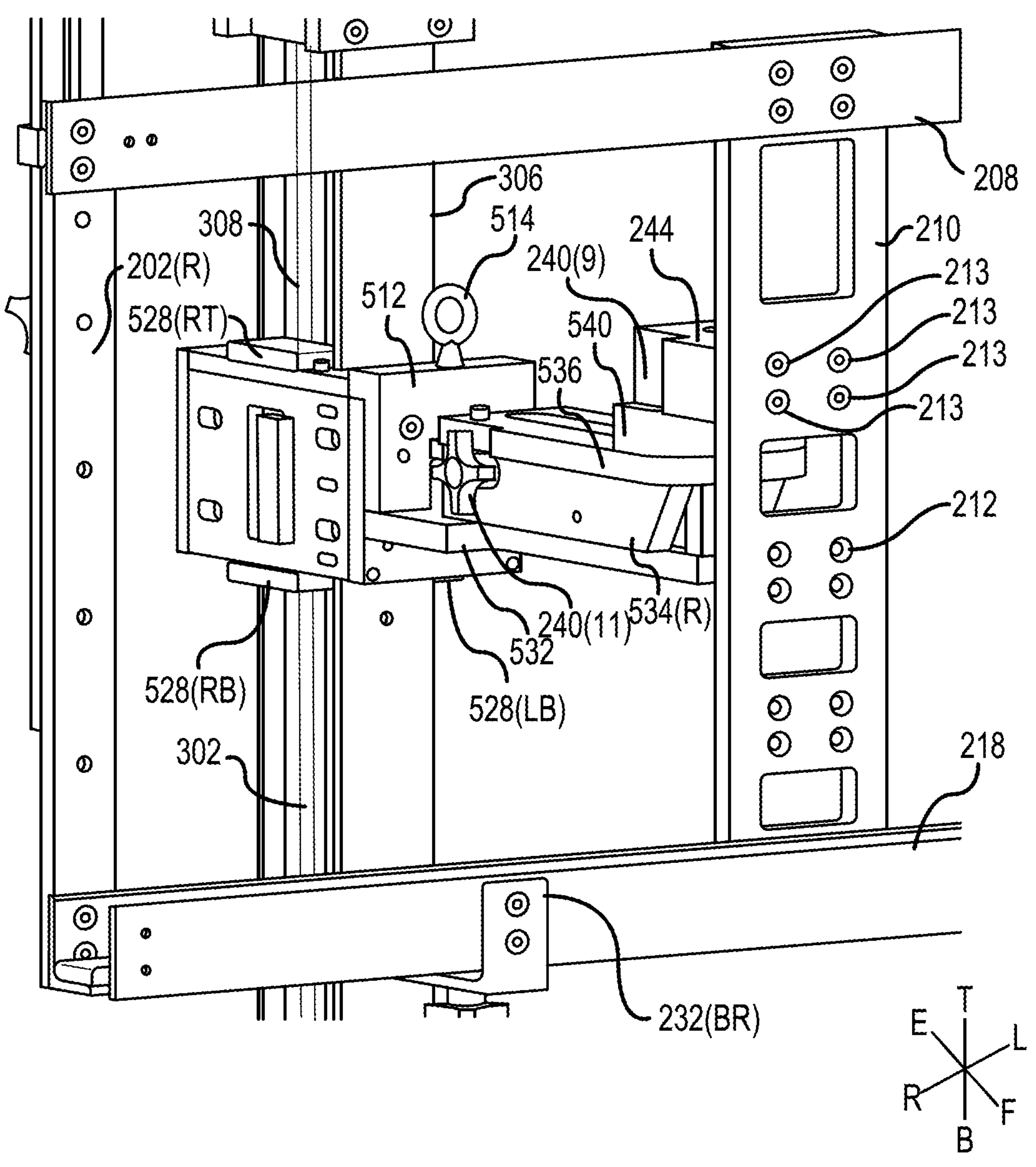

FIG. 3B is an isometric front (F) view of a Middle Riser Assembly ("MRA") for the riser assembly implementation shown in FIG. 3A.

Figure 3C:
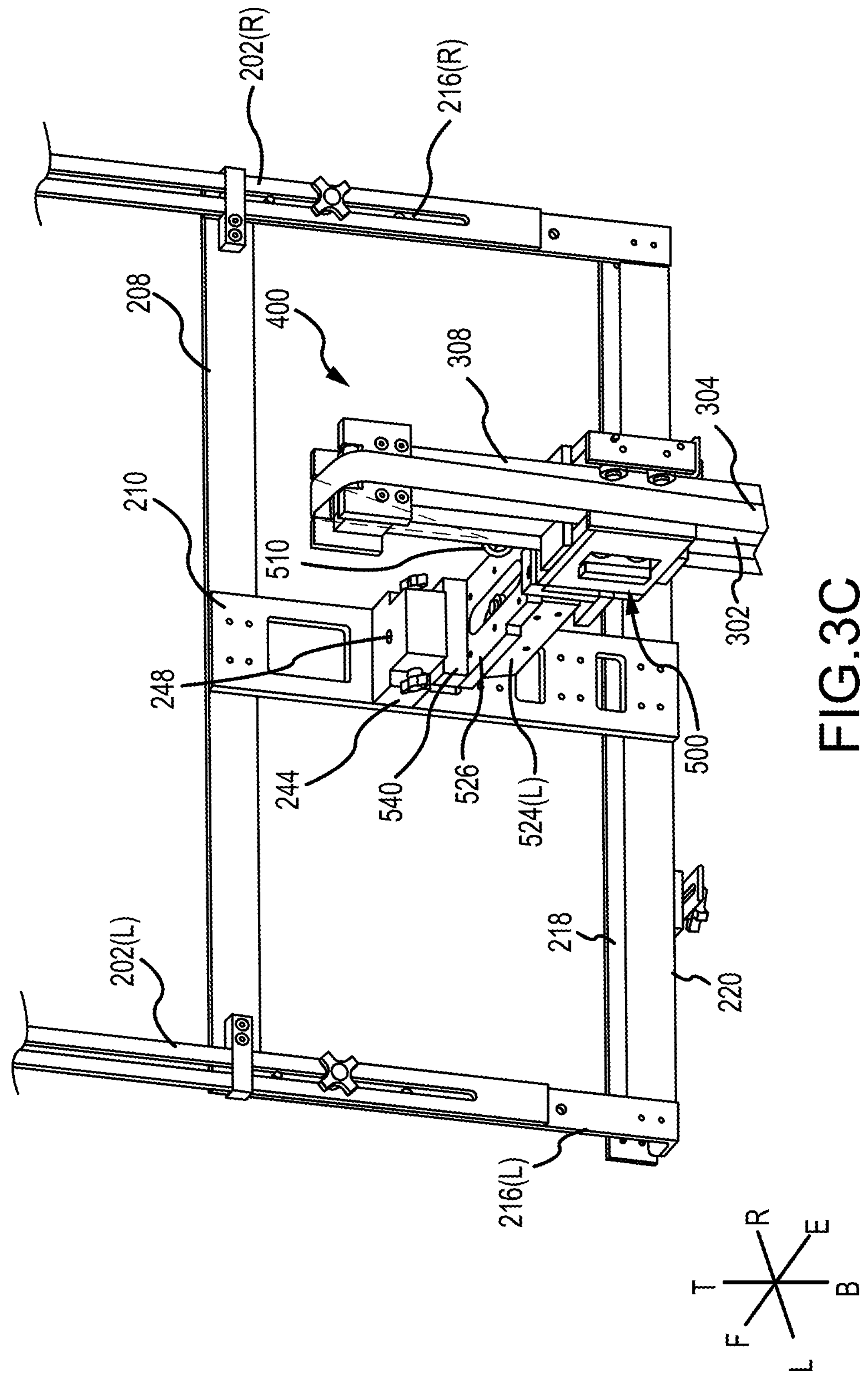

FIG. 3C is an isometric end (E) view of an Upper Riser Assembly ("URA") and the middle riser assembly for the riser assembly implementation shown in FIGS. 3A and 3B.

Figures 3D, 3E, 3F:
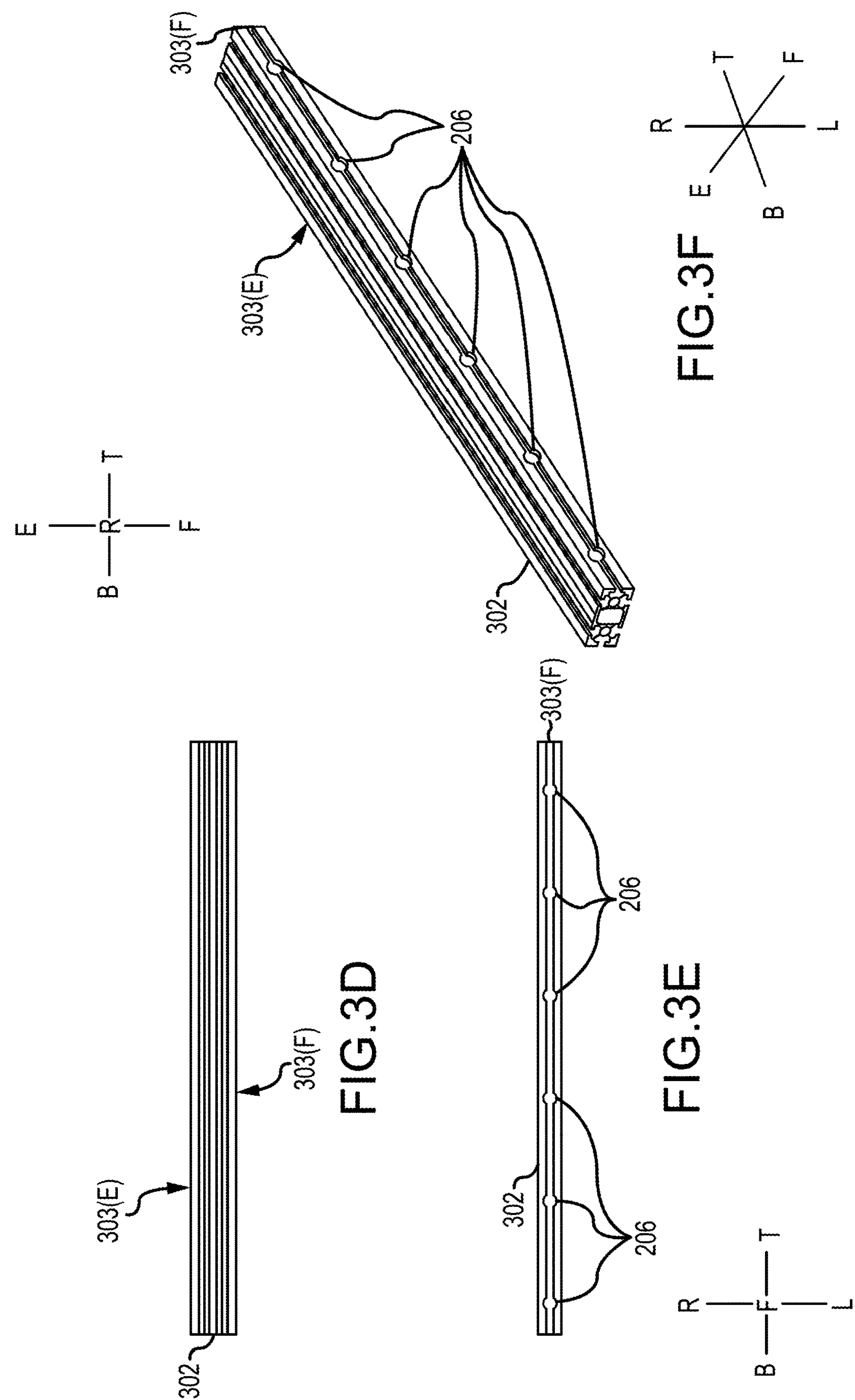

FIG. 3D is a top plan view of a riser assembly shaft for the riser assembly implementation shown in FIG. 3A.

FIG. 3E is a front plan view of the riser assembly shaft shown in FIG. 3D.

FIG. 3F is an isometric view of the riser assembly shaft shown in FIG. 3D.

Figure 3G:
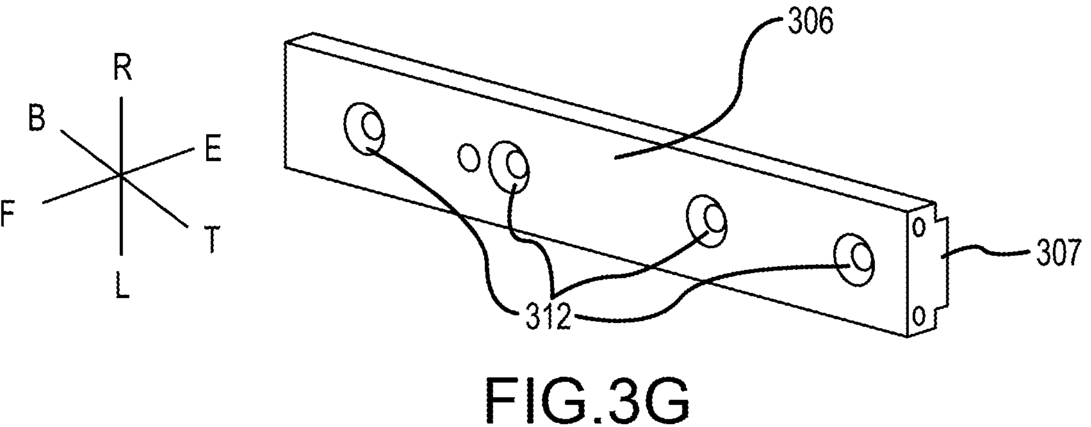

FIG. 3G is an isometric view of a first extender plate for the riser assembly implementation shown in FIG. 3A.

Figure 3H:
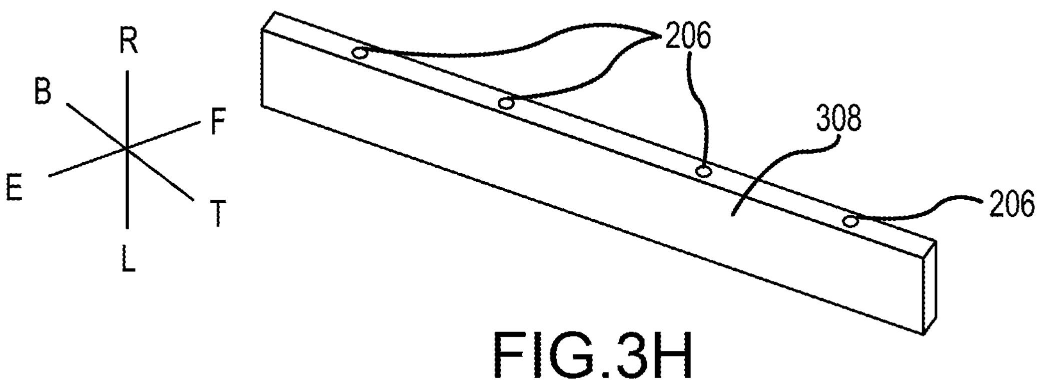

FIG. 3H is an isometric view of a second extender plate for the riser assembly implementation shown in FIG. 3A.

Figures 4A, 4B, 4C, 4D, 4E:
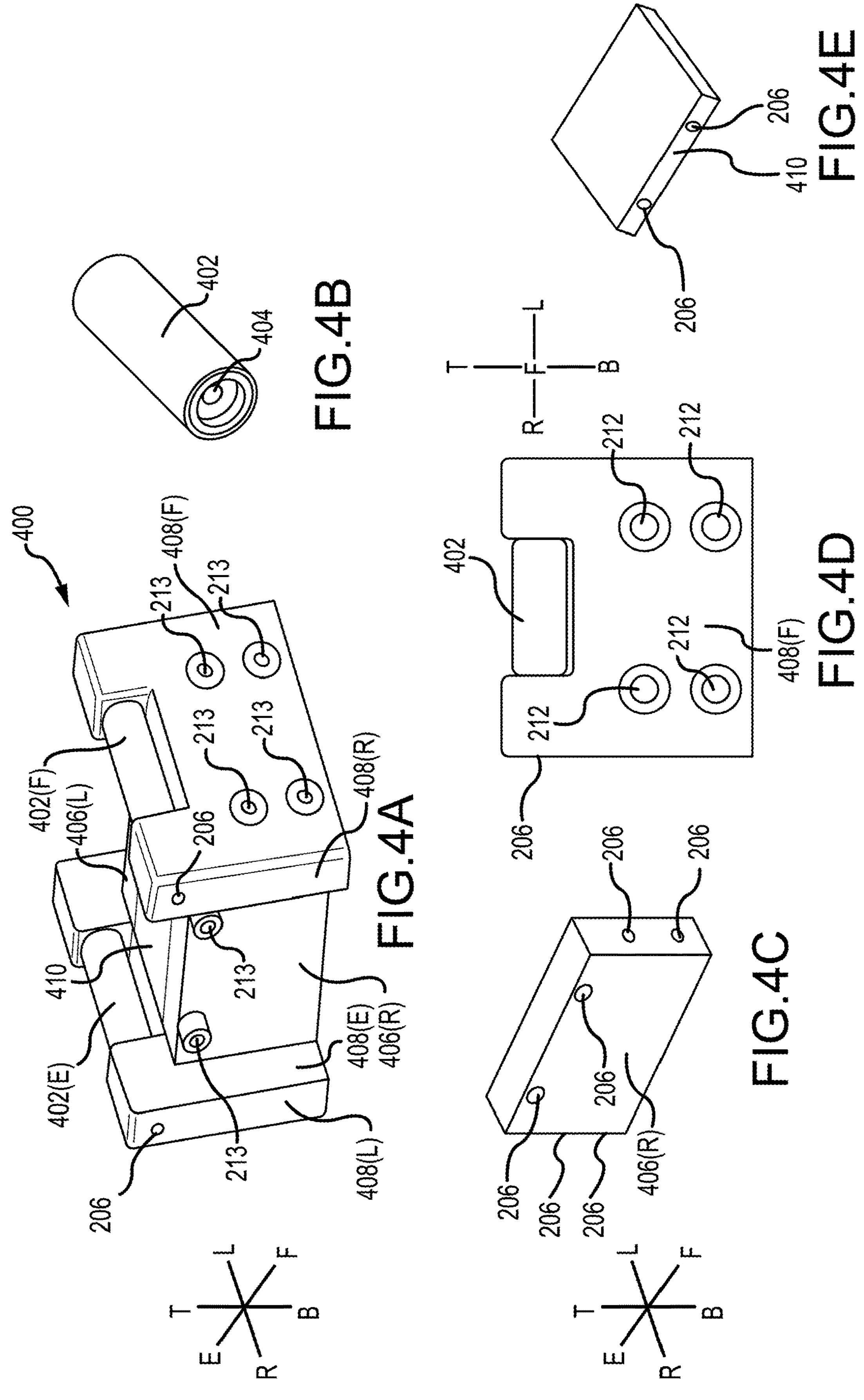

FIG. 4A is an isometric view of the URA implementation shown in FIGS. 3A and 3C.

FIG. 4B is an isometric view of a roller for the URA implementation shown in FIG. 4A.

FIG. 4C is an isometric view of a side block for the URA implementation shown in FIG. 4A.

FIG. 4D is a front plan view of a roller holder for the URA implementation shown in FIG. 4A.

FIG. 4E is an isometric view of top plate for the URA implementation shown in FIG. 4A.

Figures 5A, 5B, 5C, 5D, 5E:
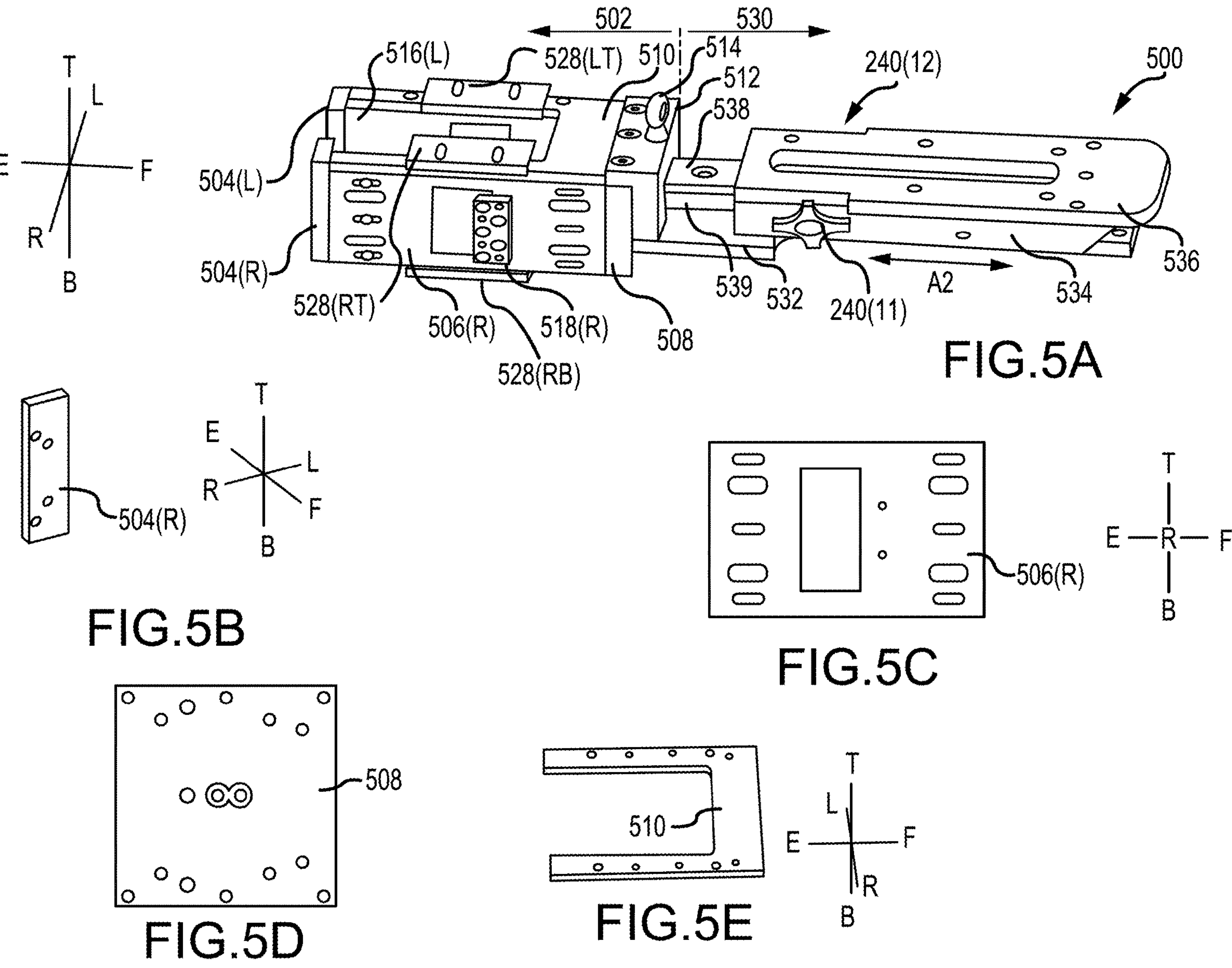

FIG. 5A is an isometric view of the MRA shown in FIGS. 3A and 3B.

FIG. 5B is an isometric view of a roller assembly end plate for the MRA implementation shown in FIG. 5A.

FIG. 5C is an isometric view of a roller assembly side plate for the MRA implementation shown in FIG. 5A.

FIG. 5D is a front plan view of a roller assembly front plate for the MRA implementation shown in FIG. 5A.

FIG. 5E is an isometric view of a roller assembly top plate for the MRA implementation shown in FIG. 5A.

Figure 5H:
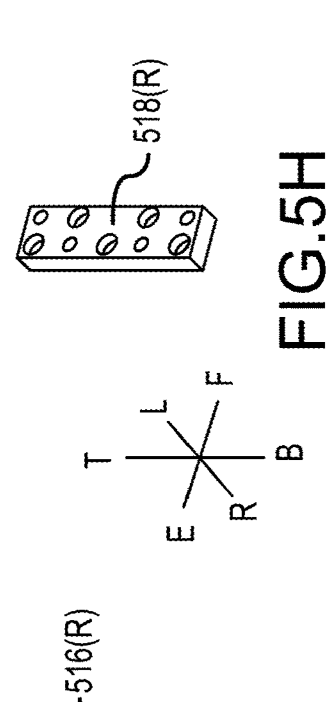
Figure 5K:
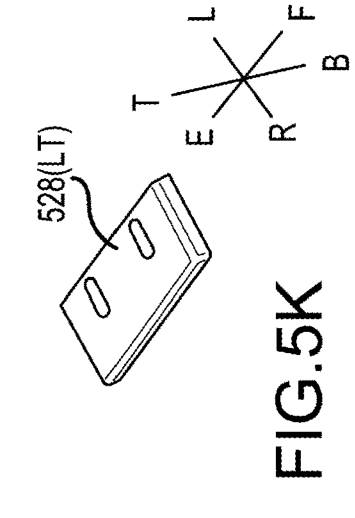
Figure 5G:
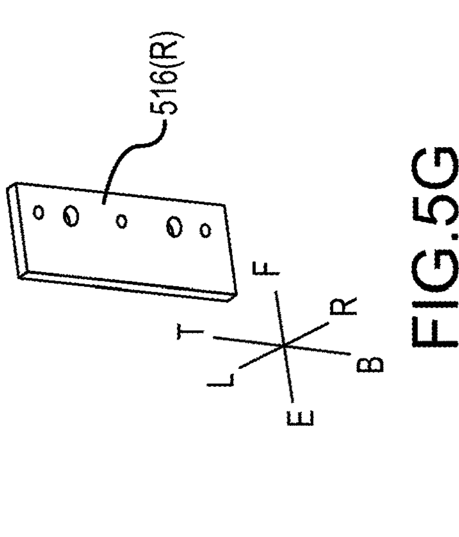
Figure 5J:
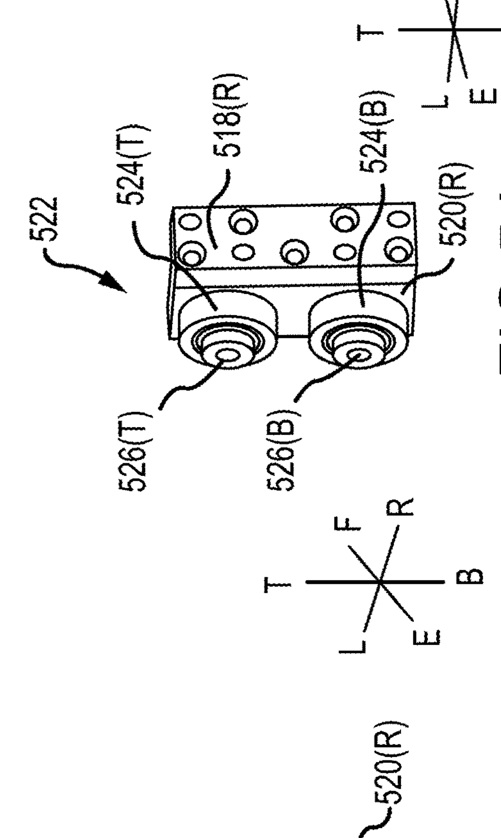
Figure 5F:
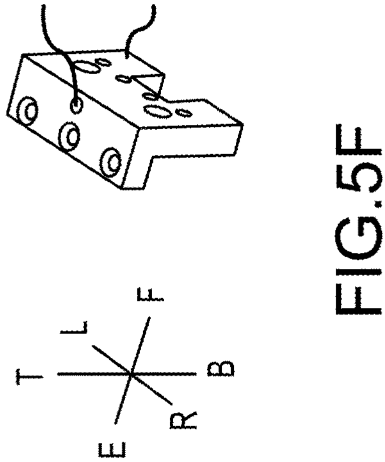

FIG. 5F is an isometric view of a roller assembly hook plate for the MRA implementation shown in FIG. 5A.

FIG. 5G is an isometric view of a roller assembly end bearing holder plate for the MRA implementation shown in FIG. 5A.

FIG. 5H is an isometric view of a roller assembly tie-in plate for the MRA implementation shown in FIG. 5A.

Figure 5I:
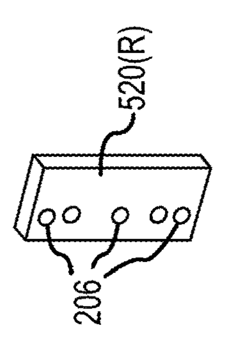

FIG. 5I is an isometric view of a roller assembly side bearing holder plate for the MRA implementation shown in FIG. 5A.

FIG. 5J is an isometric view of a roller assembly side bearing assembly for the MRA implementation shown in FIG. 5A.

FIG. 5K is an isometric view of a roller assembly side guide plate for the MRA implementation shown in FIG. 5A.

Figures 5L, 5M, 5N, 5O:
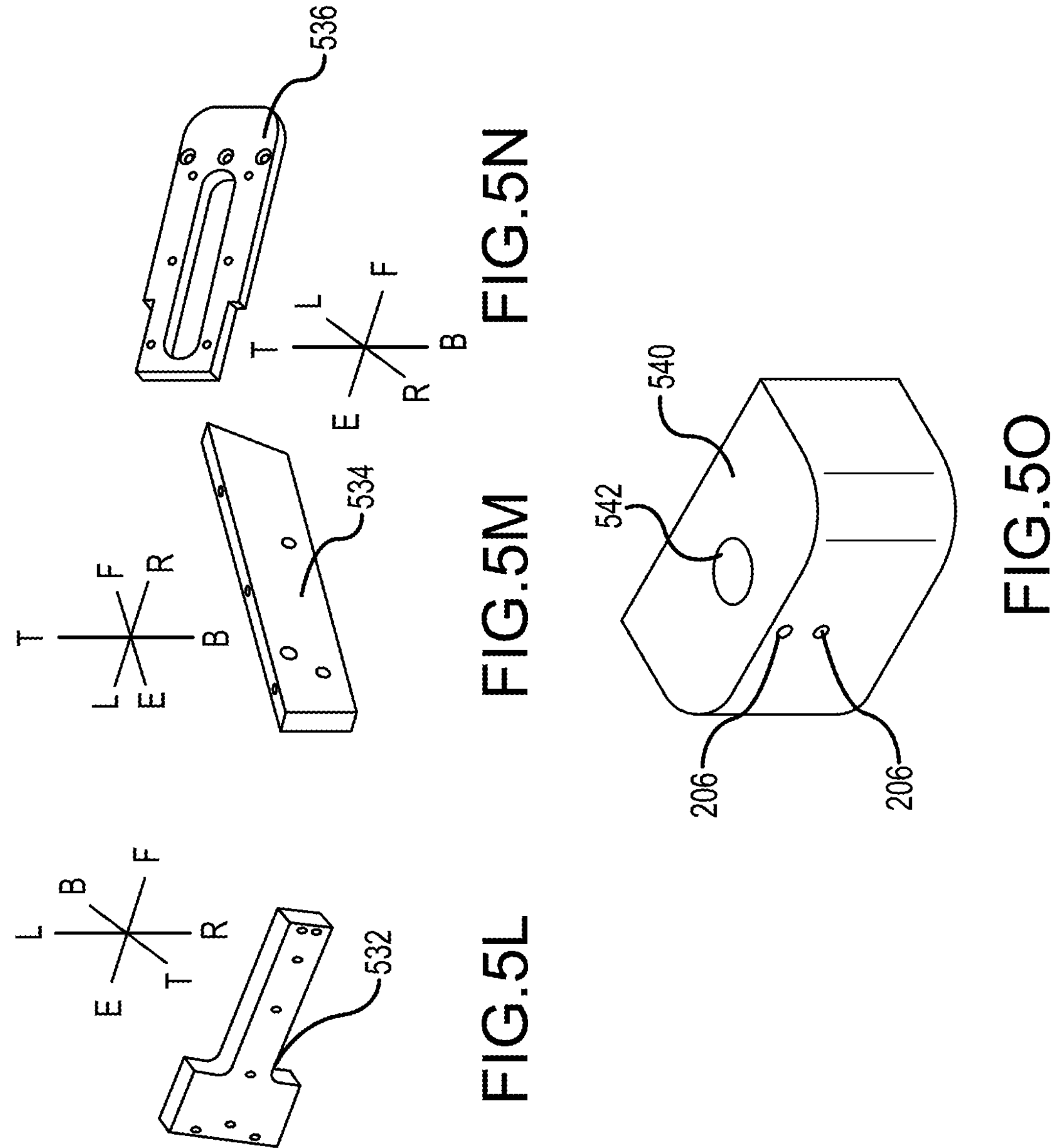

FIG. 5L is an isometric view of an extension assembly bottom plate for the MRA implementation shown in FIG. 5A.

FIG. 5M is an isometric view of an extension assembly side plate for the MRA implementation shown in FIG. 5A.

FIG. 5N is an isometric view of an extension assembly top plate for the MRA implementation shown in FIG. 5A.

FIG. 5O is an isometric view of an extension assembly swivel block for the MRA implementation shown in FIGS. 3B and 3C.

Figure 6A:
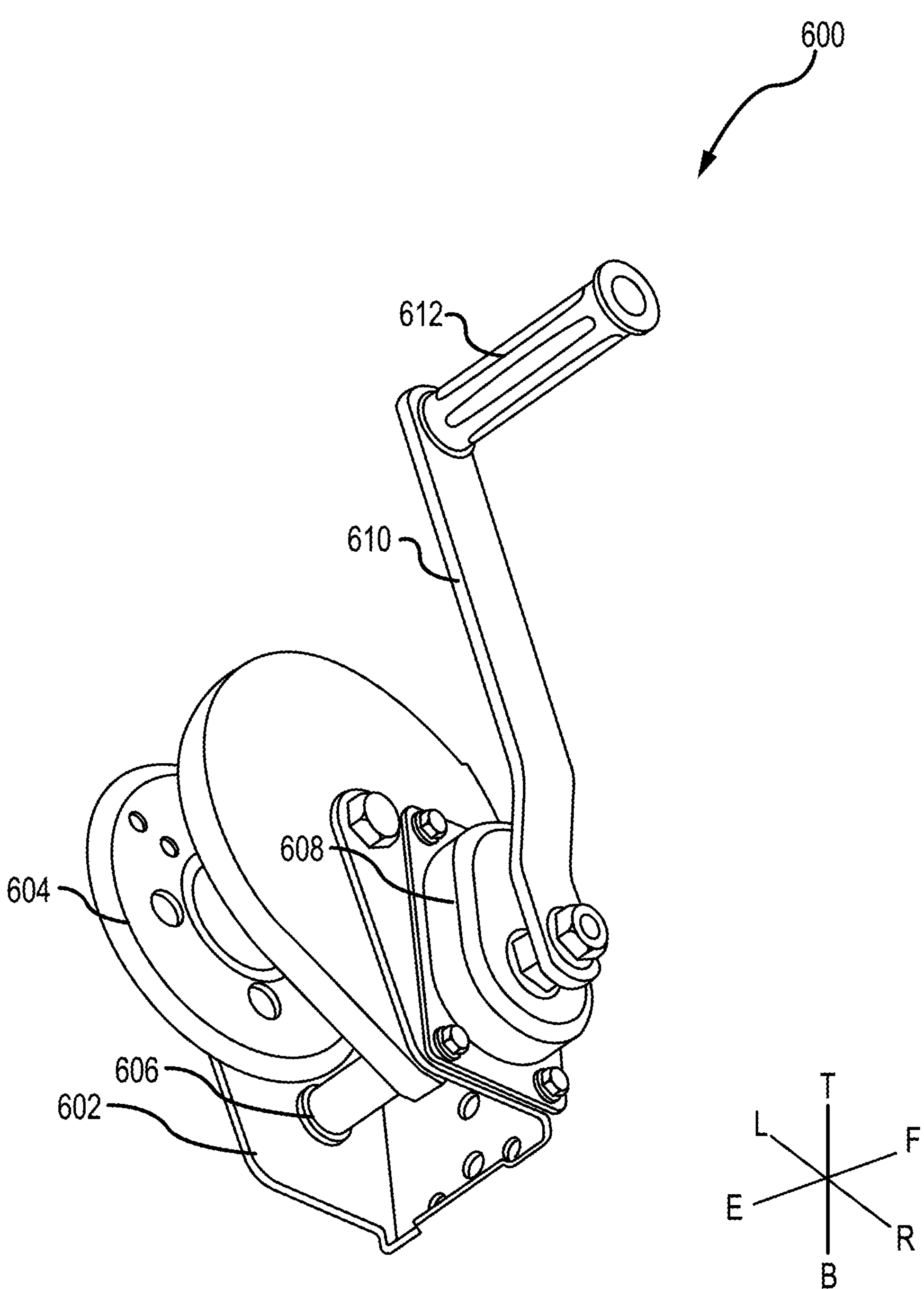

FIG. 6A is an isometric view of a hoist assembly shown in FIG. 3A.

FIG. 6B is an isometric view of the hoist assembly shown in FIG. 6A as attached to the riser assembly shaft shown in FIG. 3A.

FIG. 6C is an isometric view of a riser assembly shaft hoist bracket shown in FIG. 6B.

FIG. 6D is an isometric view of a winch coupler plate shown in FIG. 6B.

Figure 7A:
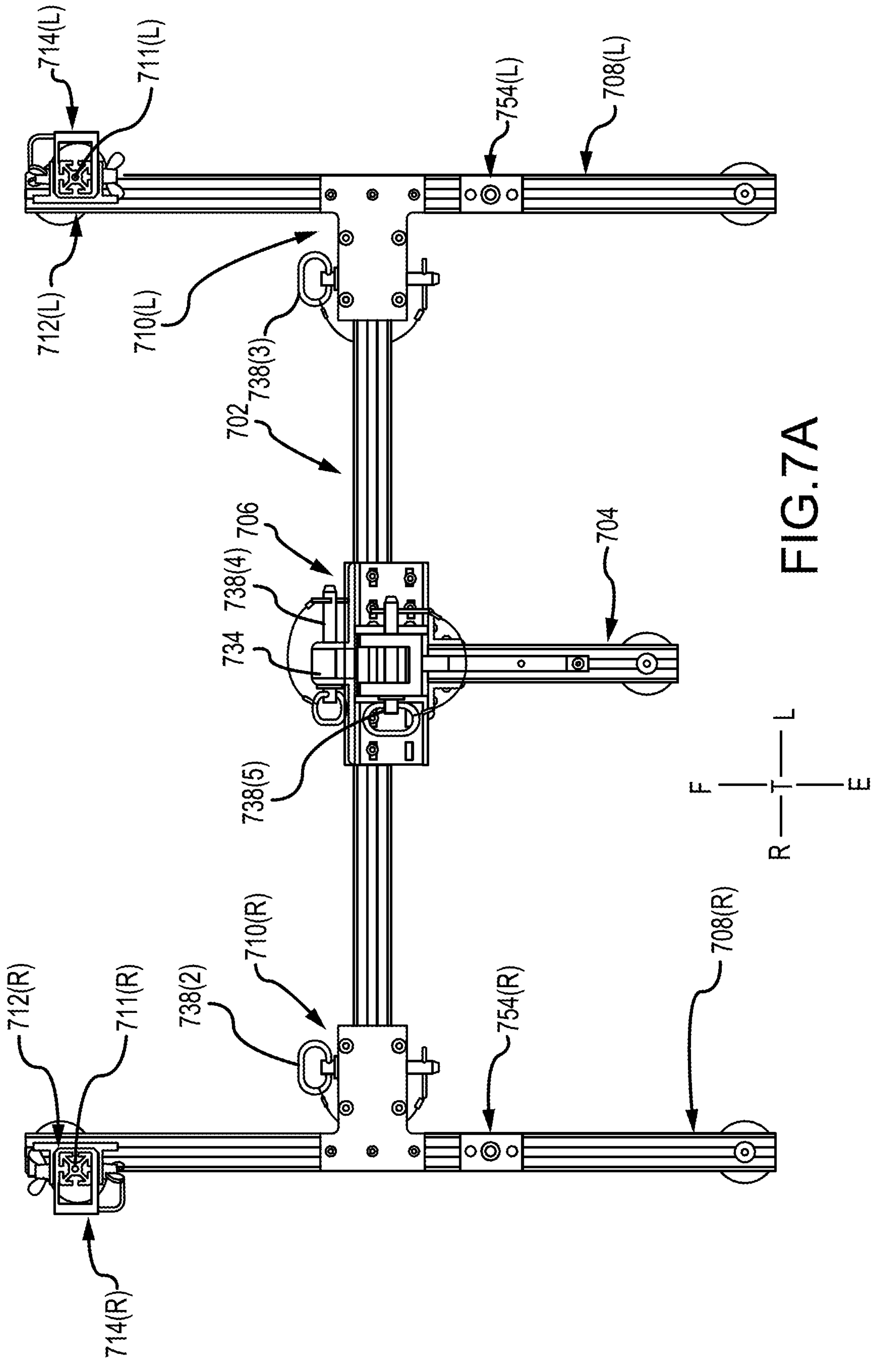

FIG. 7A is a top plan view of a stand assembly for the TV lift assist device implementation shown in FIGS. 1A-1E.

Figure 7B:
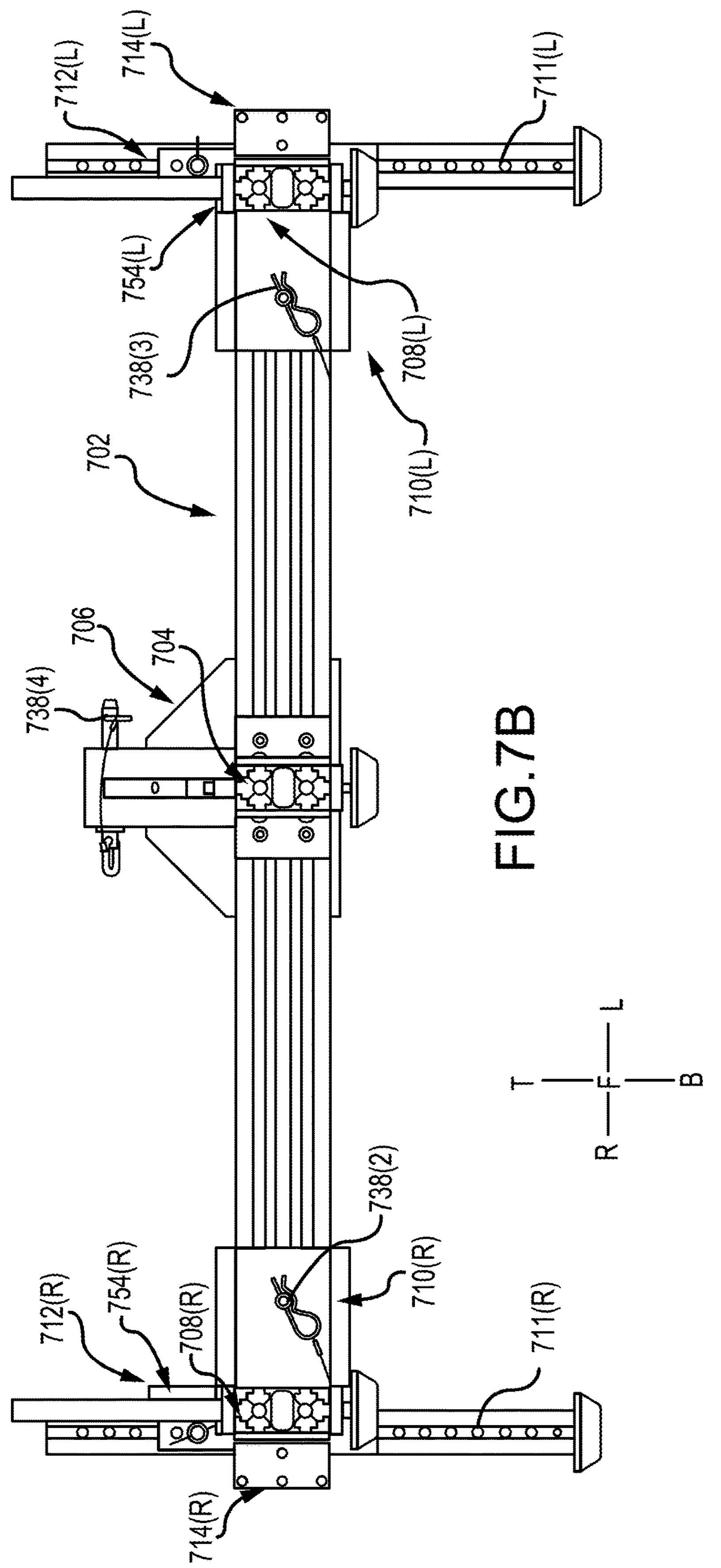

FIG. 7B is a front plan view of the stand assembly shown in FIG. 7A.

Figure 7C:
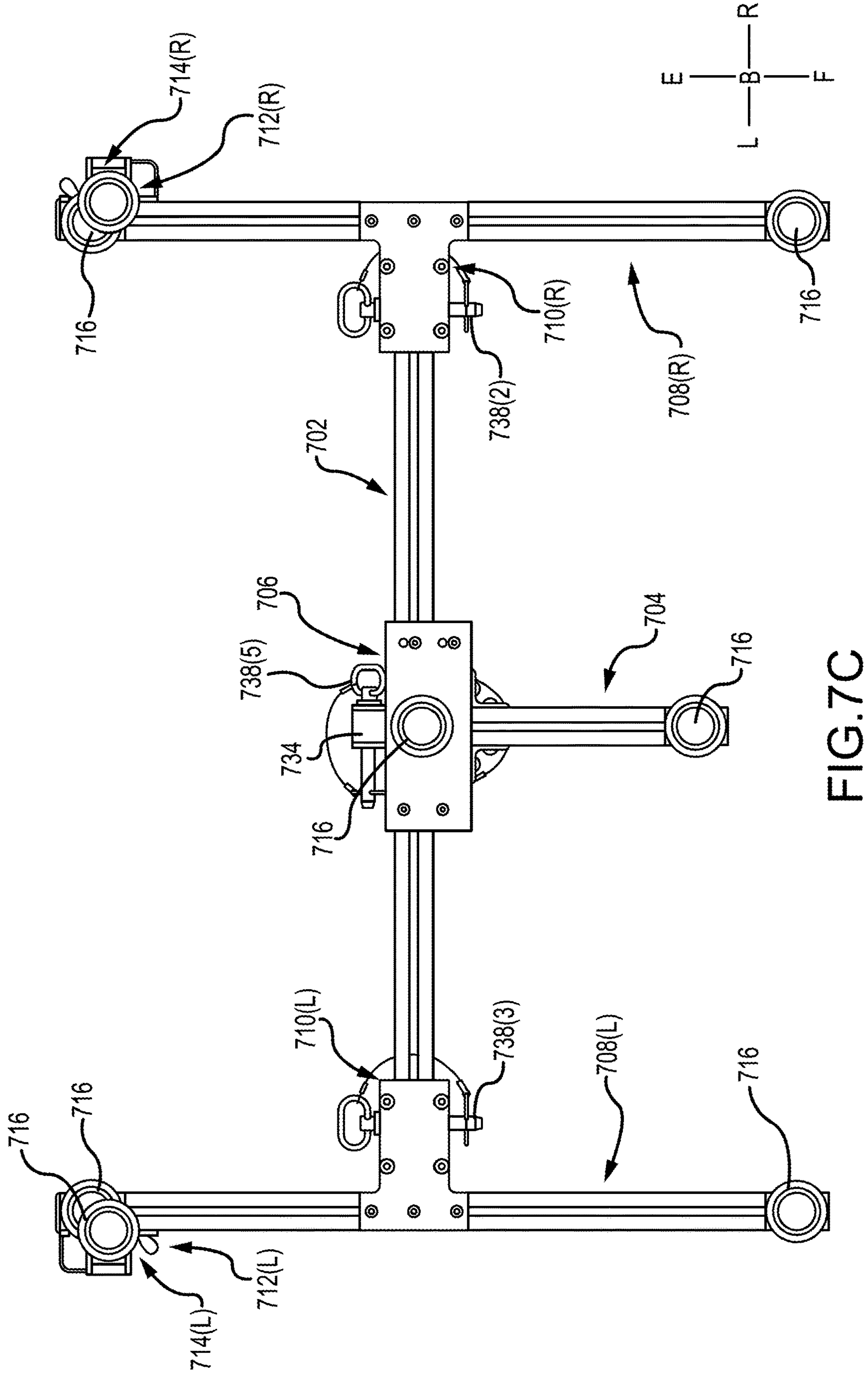

FIG. 7C is a bottom plan view of the stand assembly shown in FIG. 7A.

Figure 7D:
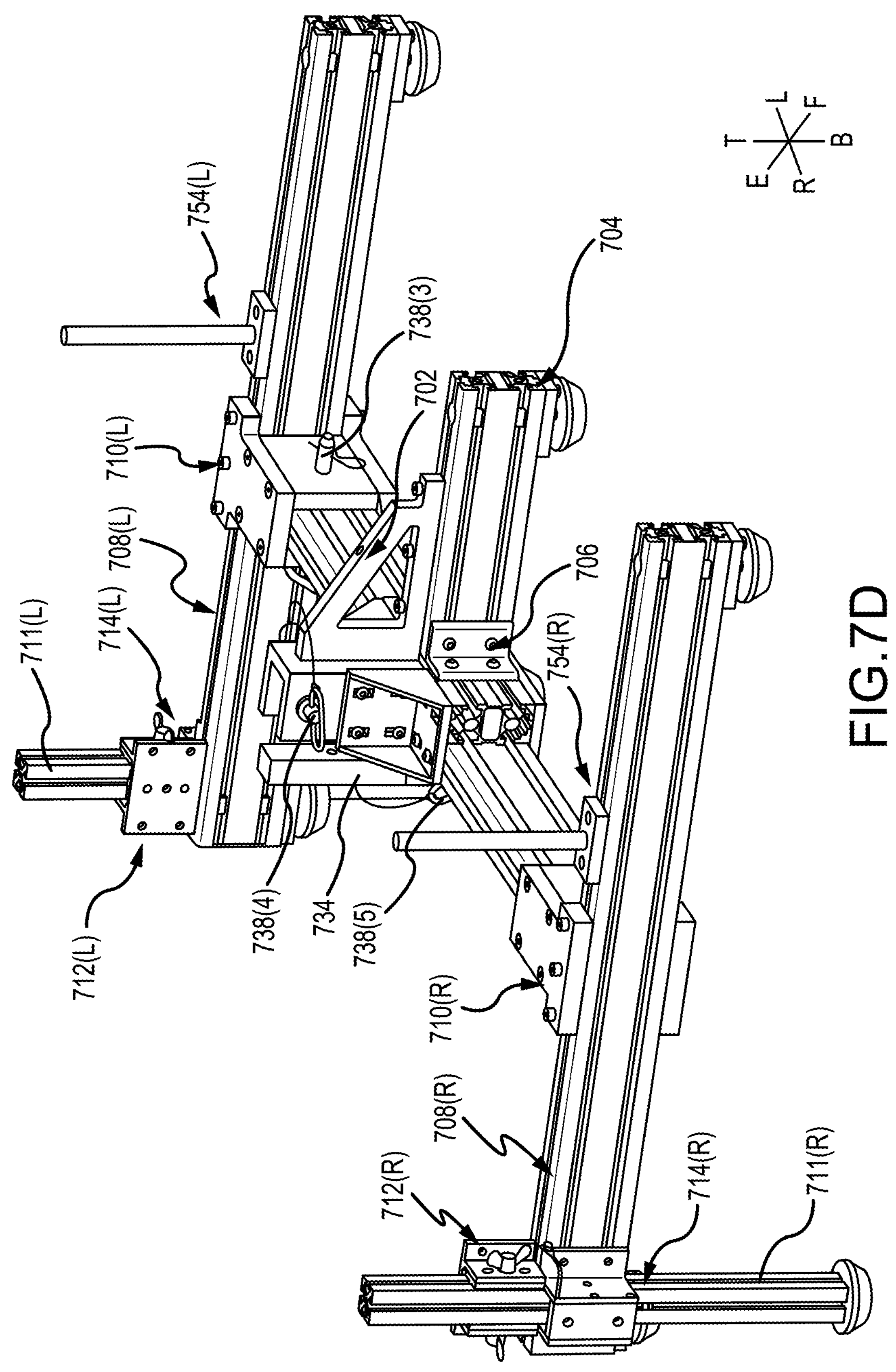

FIG. 7D is a top-front-left isometric view of the stand assembly shown in FIG. 7A.

Figure 7E:
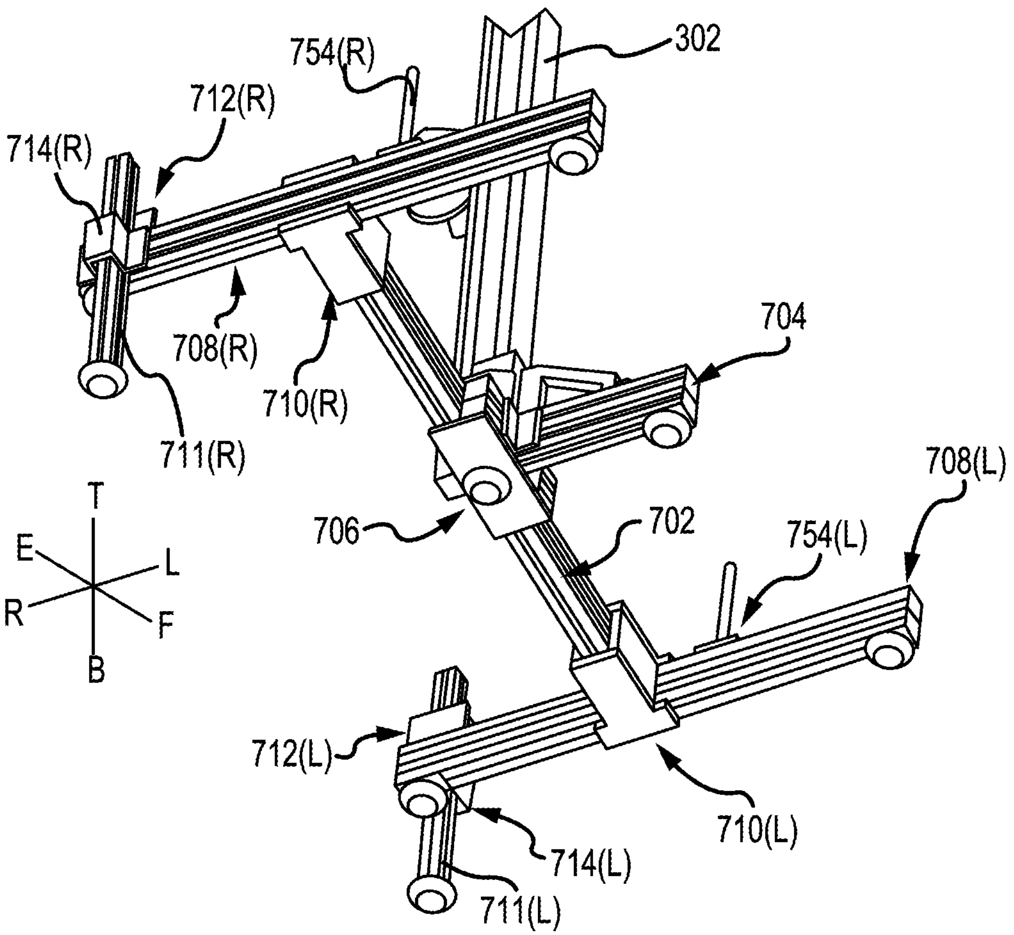

FIG. 7E is a bottom-front-left isometric view of the stand assembly shown in FIG. 7A.

Figures 7F, 7G:
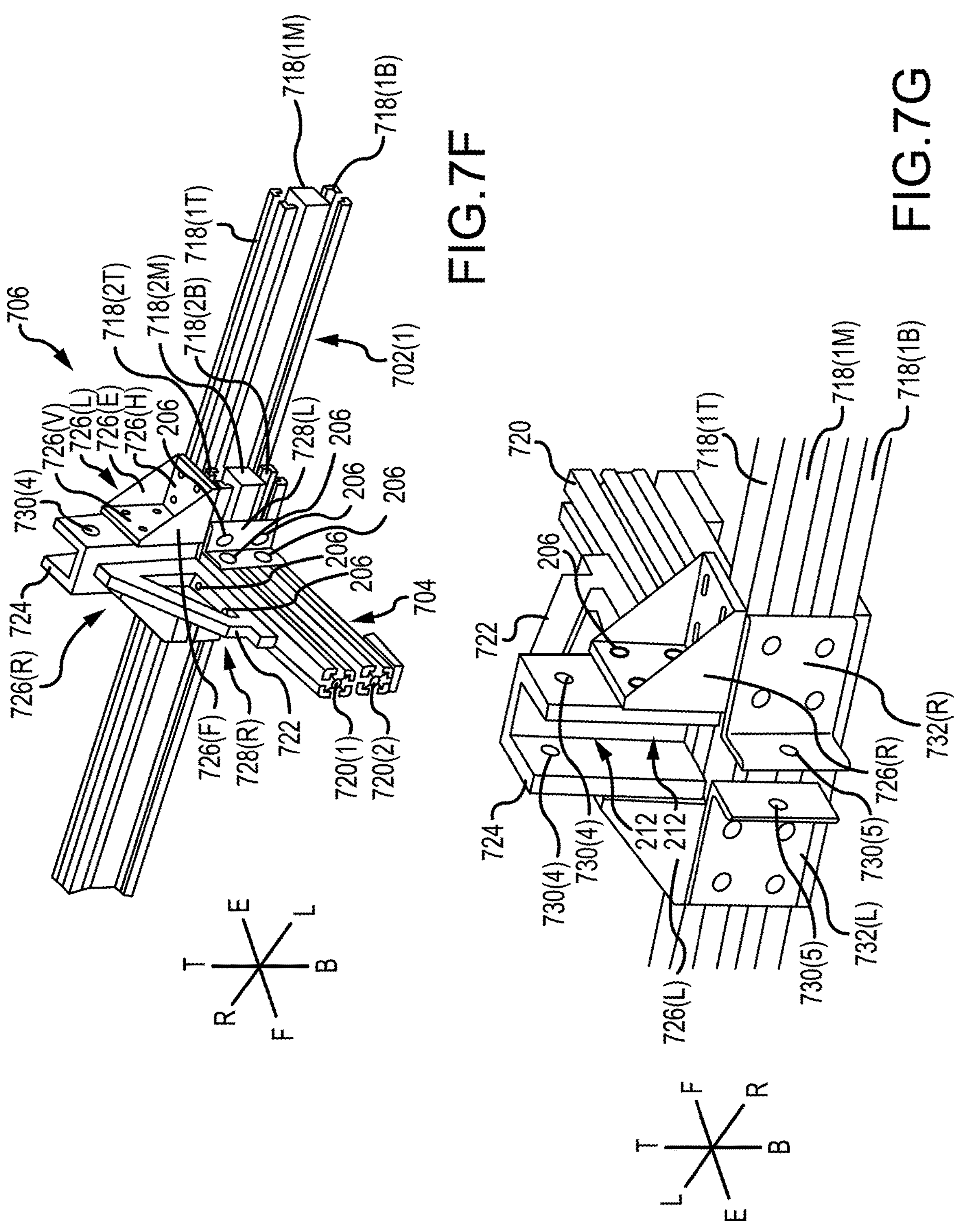

FIG. 7F is an enlarged top-front-right isometric view of a center rail assembly, a front rail assembly, and a riser assembly shaft mating assembly for the stand assembly shown in FIG. 7A.

FIG. 7G is an enlarged top-end-left isometric view of the center rail assembly, front rail assembly and riser assembly shaft mating assembly shown in FIG. 7F.

Figures 7H, 7I, 7J, 7K:
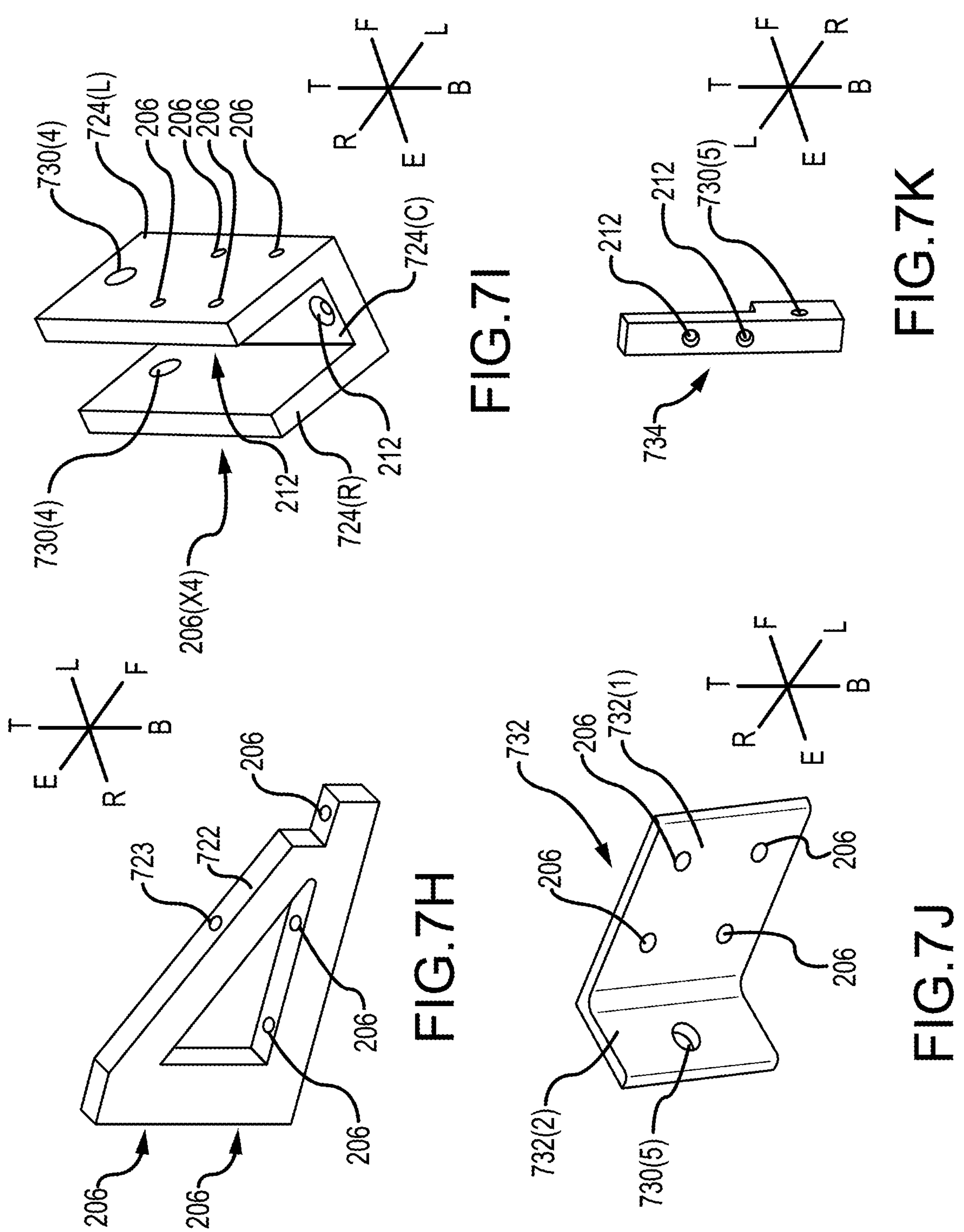

FIG. 7H is an isometric view of an angle bracket for the riser assembly shaft mating assembly shown in FIGS. 7F and 7G.

FIG. 7I is an isometric view of a riser assembly shaft bracket for the riser assembly shaft mating assembly shown in FIGS. 7F and 7G.

FIG. 7J is an isometric view of an end right-angle bracket for the riser assembly shaft mating assembly shown in FIG. 7G.

FIG. 7K is an isometric view of a back brace for the riser assembly shaft mating assembly shown in FIG. 7A.

Figure 7L:
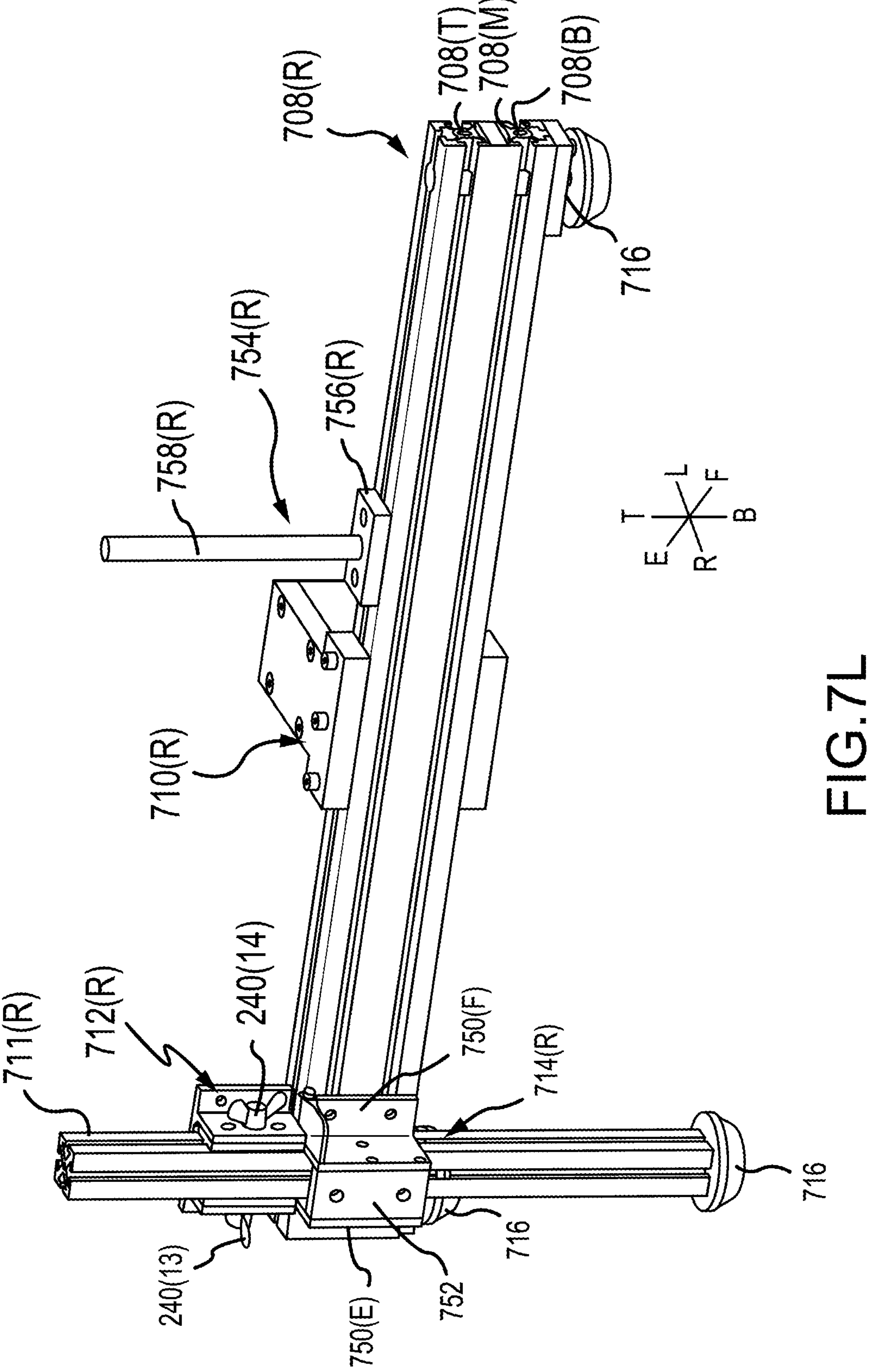

FIG. 7L is an enlarged isometric view of a right outrigger rail assembly, a right outrigger rail mating assembly, a right leg height adjustment assembly, a right leg attachment assembly and a right TVHA stop assembly for the stand assembly shown in FIGS. 7A-7F.

Figures 7M, 7N, 7O, 7P:
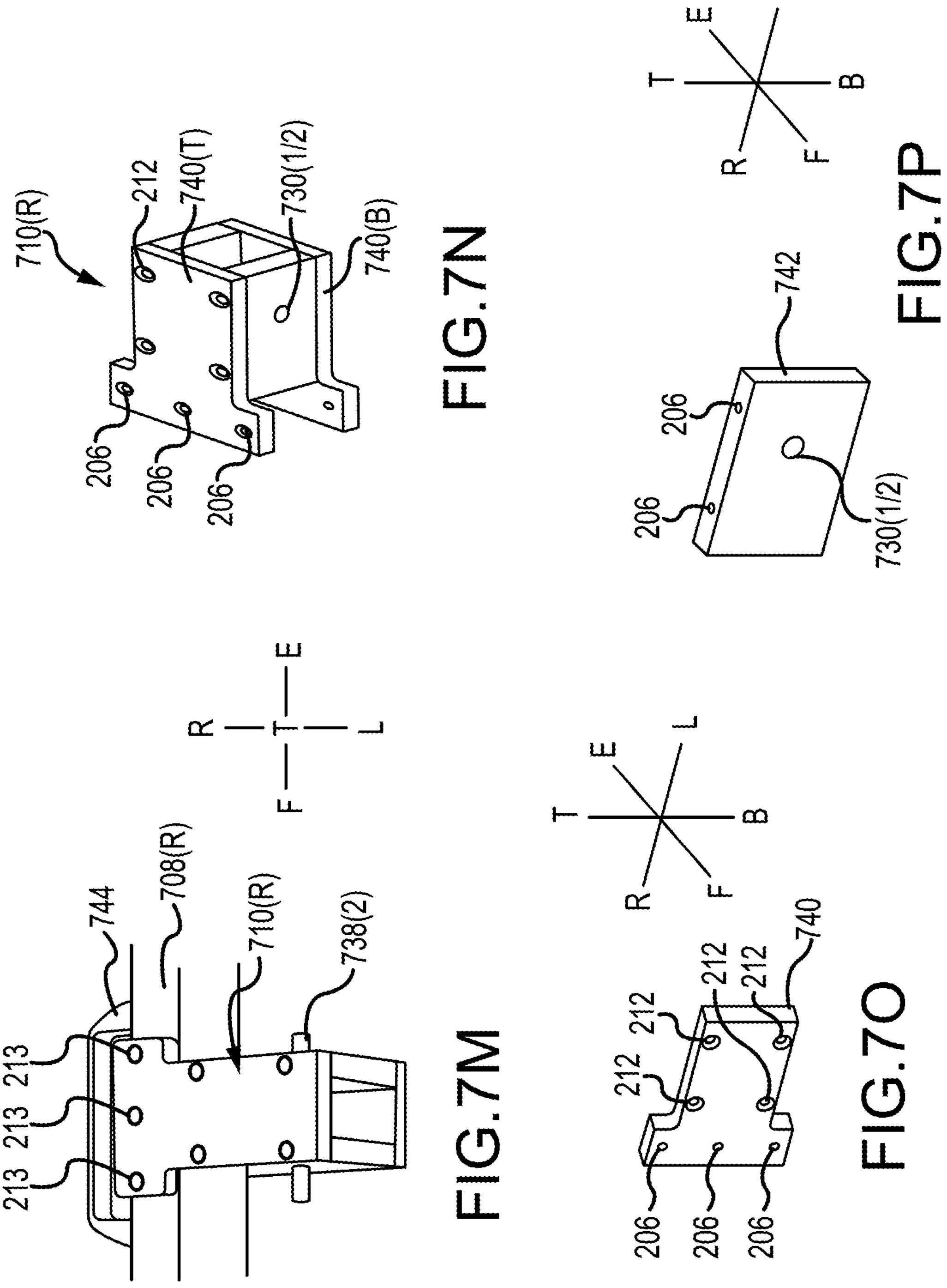

FIG. 7M is an enlarged isometric view of outrigger rail mating assembly for the stand assembly shown in FIG. 7A.

FIG. 7N is a further enlarged isometric view of the outrigger rail mating assembly shown in FIG. 7M.

FIG. 7O is an isometric view of a first plate for the outrigger rail mating assembly shown in FIG. 7M.

FIG. 7P is an isometric view of a second plate for the outrigger rail mating assembly shown in FIG. 7M.

FIG. 7Q is an isometric front-right view of a Leg Height Adjustment Assembly ("LHAA") for the stand assembly shown in FIG. 7A.

FIG. 7R is an isometric left-end view of the LHAA shown in FIG. 7Q.

FIG. 7S is an isometric view of a rail bracket for the LHAA shown in FIGS. 7Q and 7R.

Figure 8:
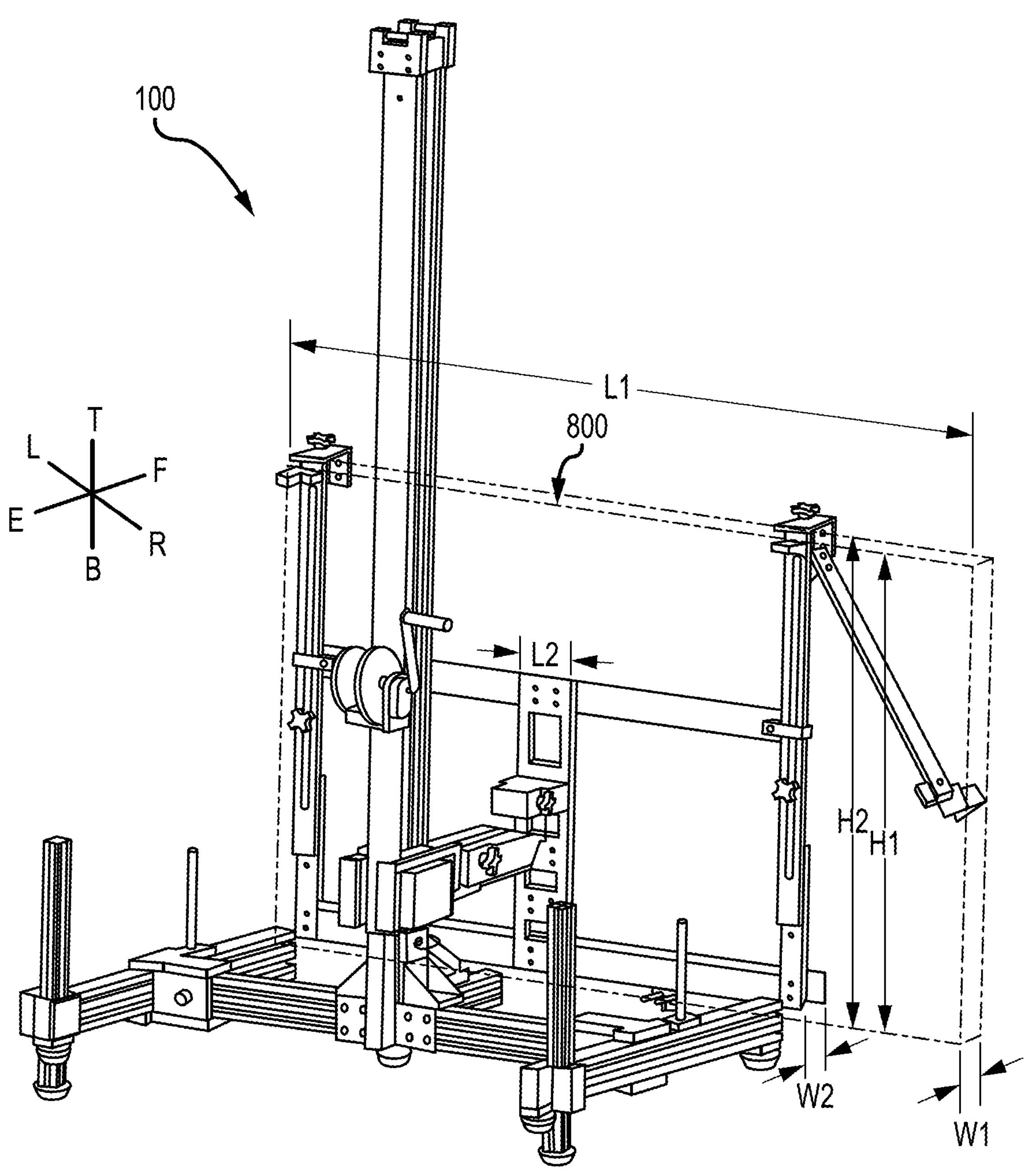

FIG. 8 is an illustration of a TV lift assist device loaded with a television.

Figure 9:
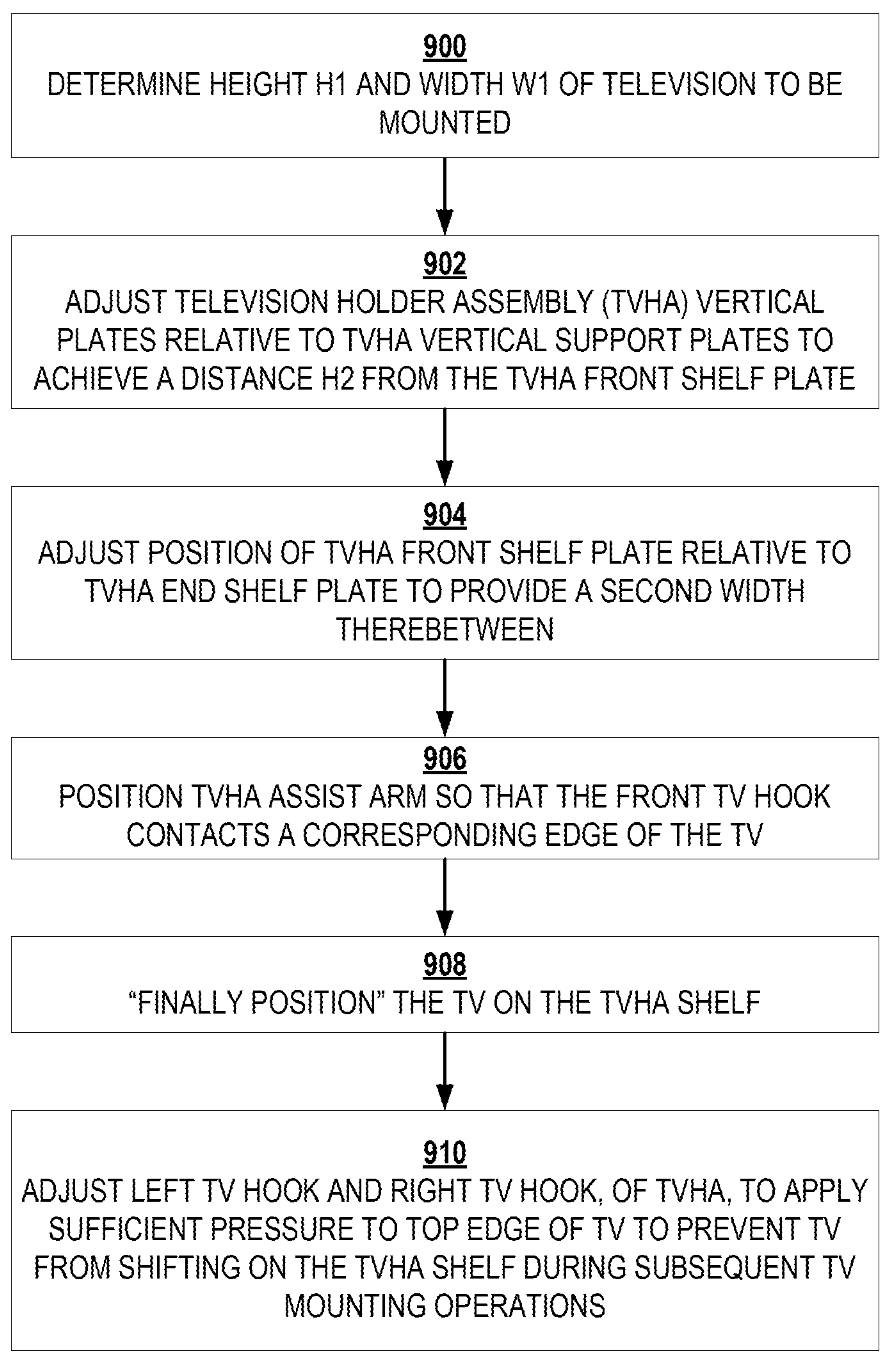

FIG. 9 is a flow diagram of one process for mounting a TV onto the TV lift assist device and in accordance with at least one implementation of the present disclosure.

Figure 10:
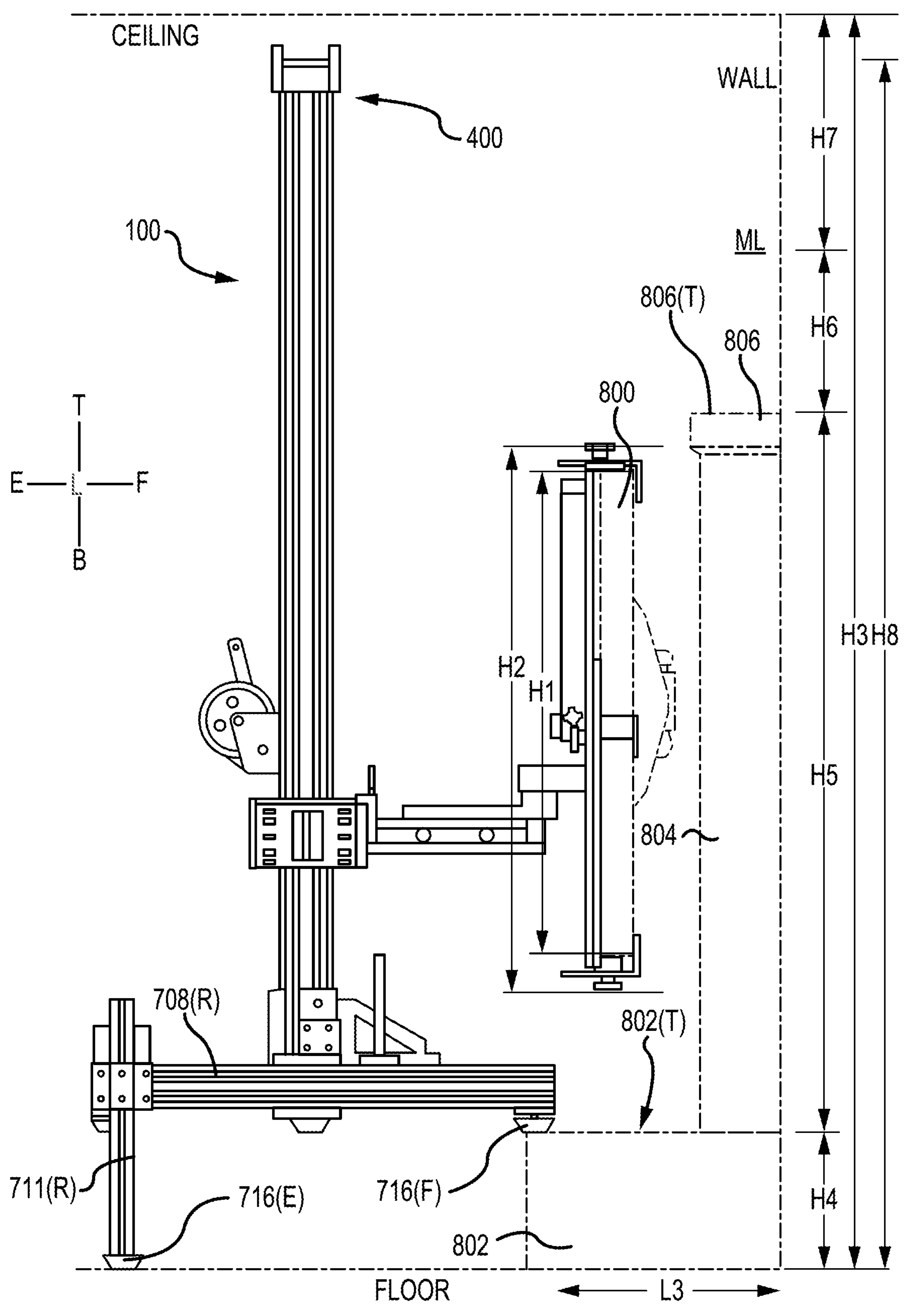

FIG. 10 is an illustration of a TV lift assist device loaded with a television and kneeling on a ledge in front of a fireplace.

Figure 11:
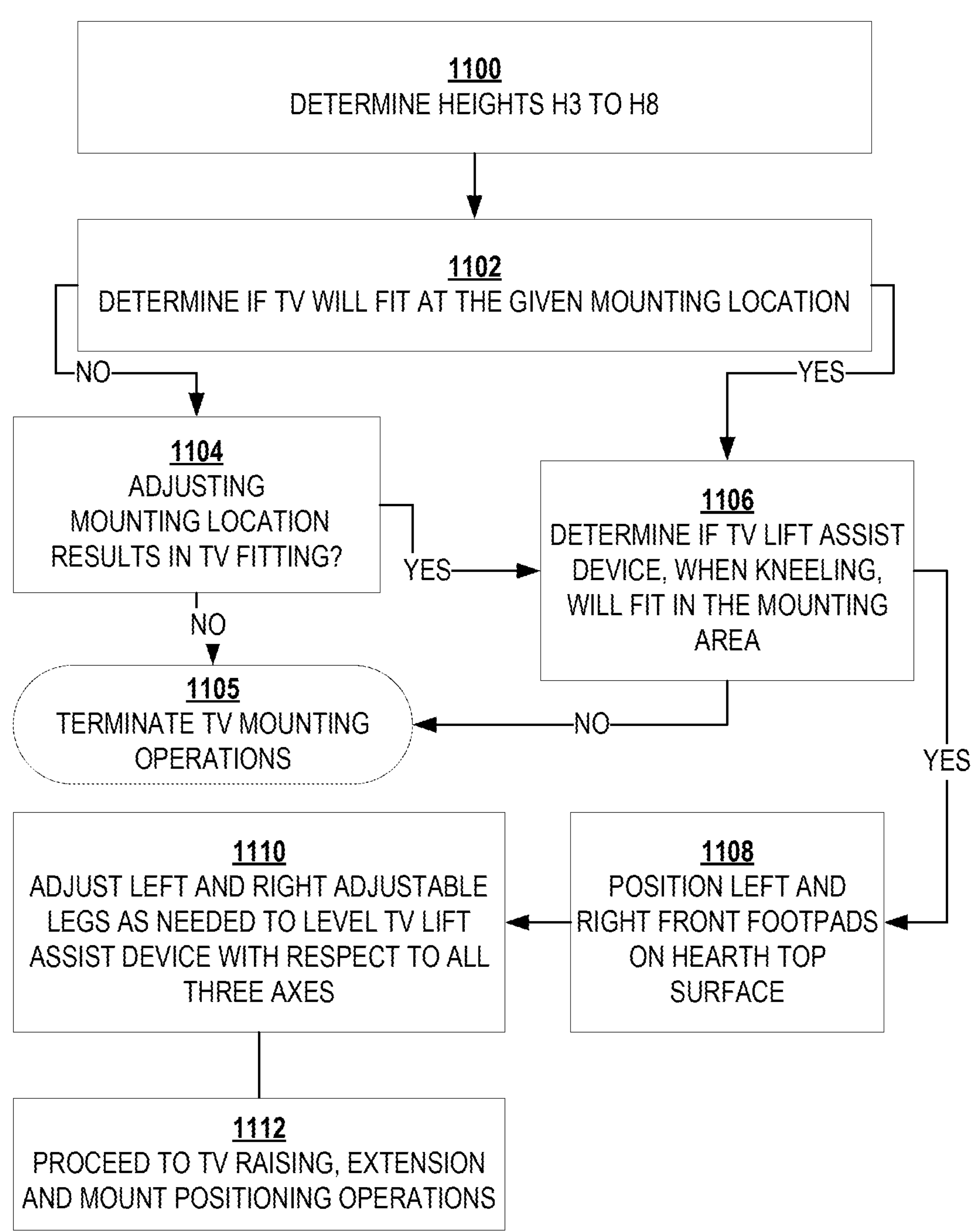

FIG. 11 is a flow diagram of one process for a TV lift assist device and in accordance with at least one implementation of the present disclosure.

Figure 12:
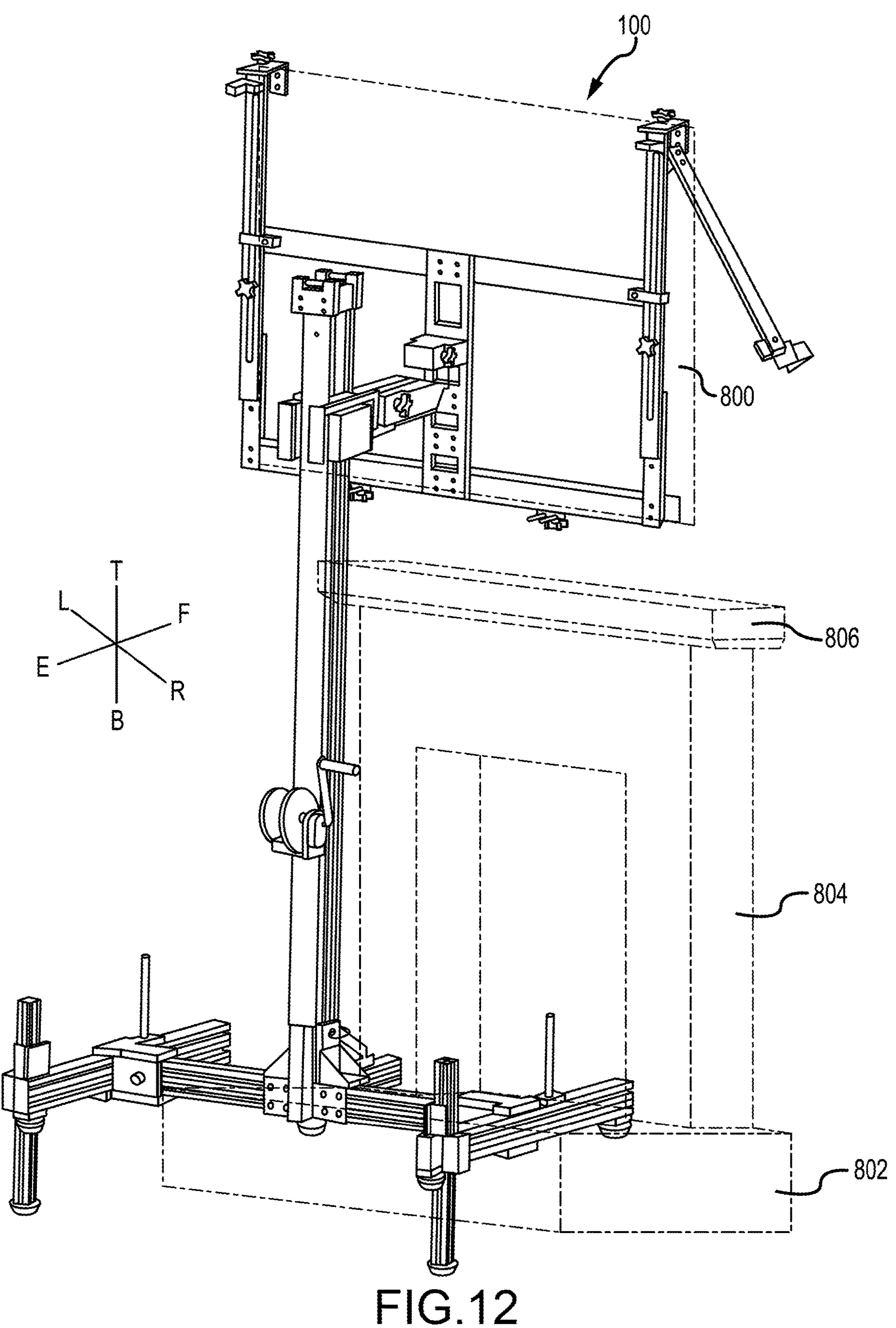

FIG. 12 is an illustration of a TV lift assist device raising a television above a mantel for a fireplace while kneeling on a ledge in front of the fireplace.

Figure 13:
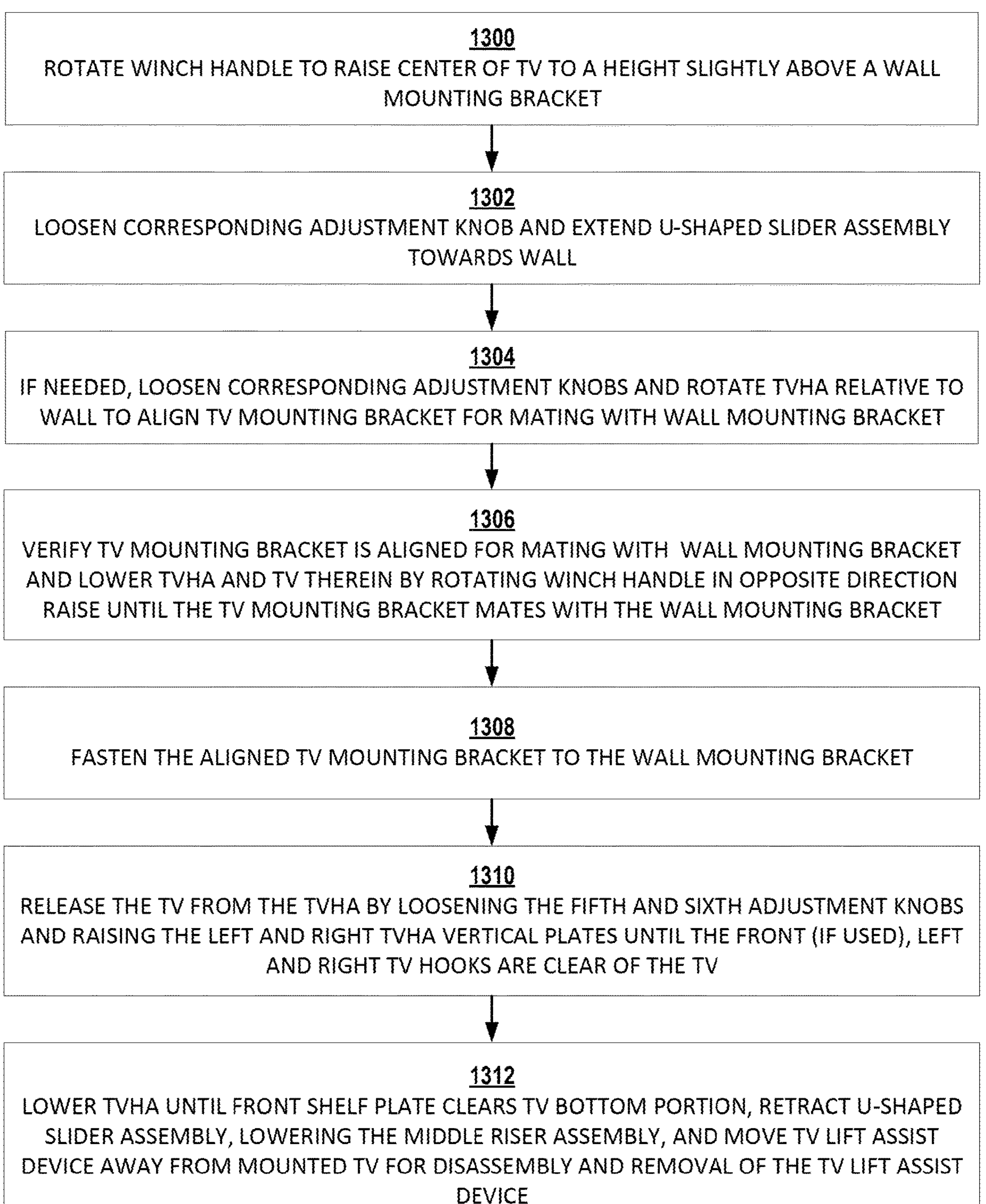

FIG. 13 is a flow diagram of one process for mounting a TV onto a wall at a location above an immovable obstacle such as a fireplace and in accordance with at least one implementation of the present disclosure.

Figure 14:
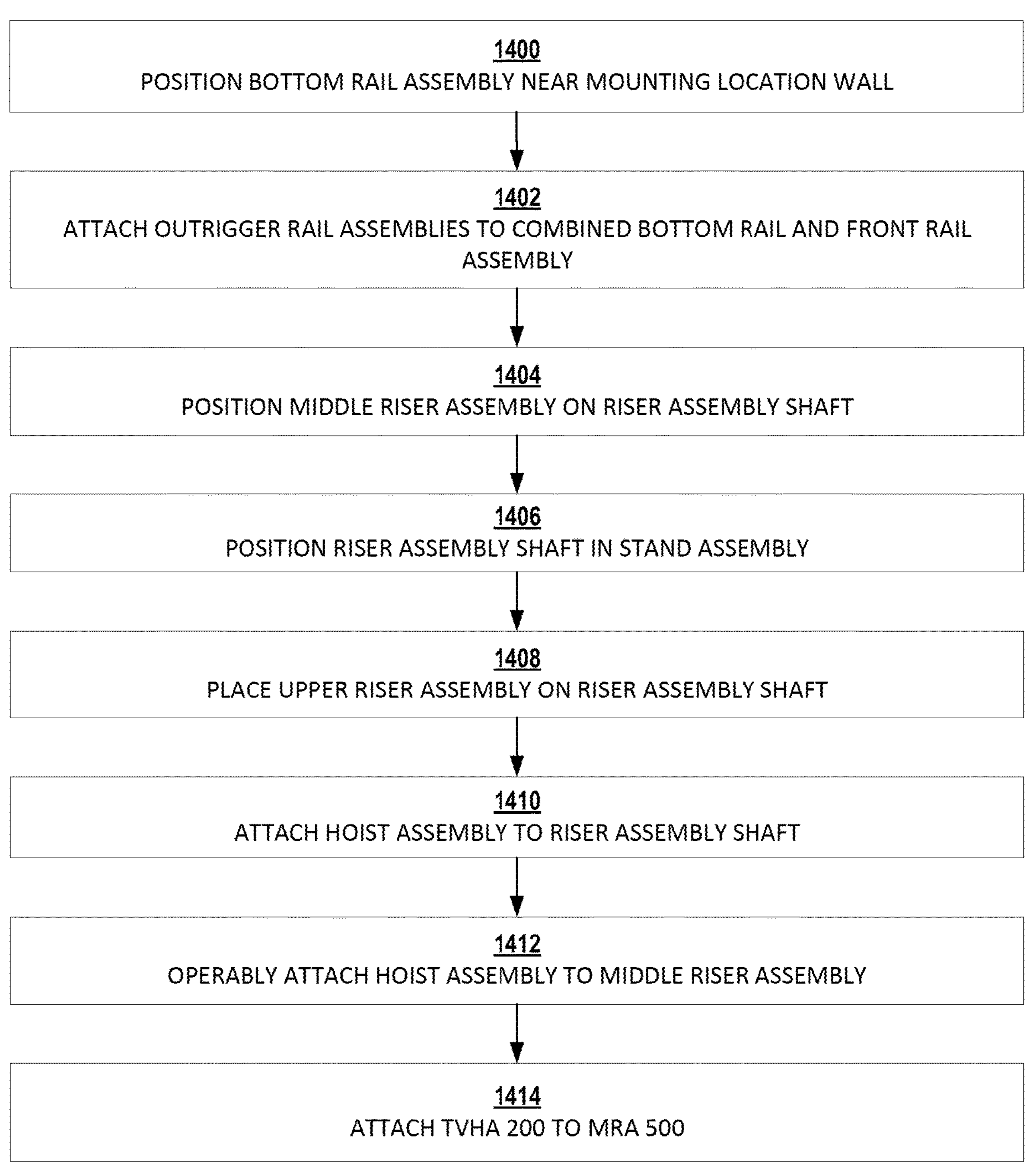

FIG. 14 is a flow diagram of one process for assembling a TV lift assist device and in accordance with at least one implementation of the present disclosure.

DETAILED DESCRIPTION

Various implementations of the present disclosure describe a TV lift assist device which facilitates mounting a TV on a wall. For at least one implementation, a TV lift assist device may facilitate mounting a TV on a wall by a single technician. For at least one implementation, a TV lift assist device may facilitate mounting a TV on a wall for a TV varying between less than ten (10) pounds to over two hundred (200) pounds. For at least one implementation, a TV lift assist device may facilitate mounting a TV on a wall for a TV ranging from a nineteen (19) inches diagonal screen size to over one hundred (100) inches diagonal screen size. For at least one implementation, a TV lift assist device may facilitate mounting a TV on a wall above an obstacle below, to the front of, and/or to one or more sides of a given mounting location on a wall. For at least one implementation, a TV lift assist device may facilitate mounting of a TV on a wall by one or more combinations and/or permutations of the above.

A reference coordinate system of Front ("F"), End ("E"), ("L"), Right ("R"), Top ("T") and Bottom ("B") is used herein to refer to a given orientation of the various elements of a TV lift assist device relative to a given wall on which a given TV is to be mounted. The given TV including a front side having a display surface on which images are presented by the TV. When the TV is mounted on the given wall, the front side faces in the End (E) direction. The given TV also including a backside which mounts to the given wall. When the given TV is mounted on the given wall, the backside faces in the Front (F) direction.

As shown in FIGS. 1A-1E and for a given implementation of the present disclosure, a TV lift assist device 100 may include a TV holder assembly ("TVHA") 200, a riser assembly 300, an upper riser assembly ("URA") 400, a middle riser assembly ("MRA") 500, a hoist assembly 600, and a stand assembly 700. As shown in FIGS. 1A-1E and when the TV lift assist device 100 is configured for operable use, the TVHA 200 is attached to the MRA 500. The combination of the riser assembly 300, URA 400, MRA 500 and hoist assembly 600 facilitate rising and lowering of the TVHA 200 relative to the stand assembly 700. As shown in FIG. 1E, the TVHA 200 is configured to hold a TV 800. The TVHA 200, riser assembly 300, URA 400, MRA 500, hoist assembly 600, and stand assembly 700 are further described herein with respect to at least one implementation of the present disclosure.

Elements of a TV lift assist device 100 may be configured from any material including, but not limited to, steel, aluminum, titanium, carbon fiber, plastic, wood, bamboo or otherwise. For at least one implementation, elements of the TV lift assist device 100 are manufactured from aluminum.

TV Holder Assembly (TVHA) 200

As shown in FIGS. 2A and 2B, where FIG. 2A provides an isometric front view of a TVHA and FIG. 2B provides an isometric end view of a TVHA, and with respect to at least one implementation of the present disclosure, a TV holder assembly (TVHA) 200 may include two or more TVHA vertical plates including a left TVHA vertical plate 202(L) and a right TVHA vertical plate 202(R). For at least one implementation, a TVHA vertical plate 202 may be configured as shown in FIG. 2C and as further described herein.

The TVHA 200 may include a TVHA upper horizontal plate 208. For at least one implementation, the TVHA upper horizontal plate 208 may be configured as shown in FIG. 2D and as further described herein.

The TVHA 200 may include a TVHA middle vertical plate 210. For at least one implementation, the TVHA middle vertical plate 210 may be configured as shown in FIG. 2E and as further described herein.

The TVHA 200 may include two or more TVHA vertical support plates including a left TVHA vertical support plate 216(L) and a right TVHA vertical support plate 216(R). For at least one implementation, the TVHA vertical support plates 216 may be configured as shown in FIG. 2F and as further described herein.

The TVHA 200 may include a TVHA front shelf plate 218. For at least one implementation, the TVHA front shelf plate 218 may be configured as shown in FIG. 2G and as further described herein.

The TVHA 200 may include a TVHA end shelf plate 220. For at least one implementation, the TVHA end shelf plate 220 may be configured as shown in FIG. 2H and as further described herein.

The TVHA 200 may include a TVHA vertical support plate guide 226, including a left TVHA vertical support plate guide 226(L) and a right TVHA vertical support plate guide 226(R). For at least one implementation, the TVHA vertical support plate guides 226 may be configured as shown in FIG. 2I and as further described herein.

The TVHA 200 may include a TVHA assist arm 228. For at least one implementation, the TVHA assist arm 228 may be configured as shown in FIG. 2J and as further described herein.

The TVHA 200 may include a TVHA assist arm block 230. For at least one implementation, the TVHA assist arm block 230 may be configured as shown in FIG. 2K and as further described herein.

The TVHA 200 may include a plurality of TVHA TV hooks 232 including a front assist arm TVHA TV hook 232(F), an end assist arm TVHA TV hook 232(E), a left TVHA TV hook 232(L), a right TVHA TV hook 232(R), a bottom-left TVHA TV hook 232(BL), and a bottom-right TVHA TV hook 232(BR). For at least one implementation, the TVHA TV hooks 232 may be configured as shown in FIG. 2L and as further described herein.

The TVHA 200 may include at least one TVHA top hold down plate 250 including a left TVHA top hold down plate 250(L) and a right TVHA top hold down plate 250(R). For at least one implementation, the TVHA top hold down plate 250 may be configured as shown in FIG. 2M and as further described herein.

The TVHA 200 may include a TVHA riser attachment block 244. For at least one implementation, the TVHA riser attachment block 244 may be configured as shown in FIG. 2N and as further described herein.

The TVHA 200 may include a TVHA dowel 248. For at least one implementation, the TVHA dowel 248 may be configured as shown in FIG. 2O and as further described herein.

The TVHA 200 may include a TVHA bottom block 252. For at least one implementation, the TVHA bottom block 252 may be configured as shown in FIG. 2P and as further described herein.

The TVHA 200 may include a TVHA assist arm bearing block 254. For at least one implementation, the TVHA assist arm bearing block 254 may be configured as shown in FIG. 2Q and as further described herein.

The various elements of a TV lift assist device 100 may be fastened to one or more other elements thereof using one or more fasteners 213 such as screws, bolts and nuts, rivets and other forms of compression, welds or the like. Screws, bolts and the like may have any form of head including Philips, flat, Allen, star, custom or otherwise. As used herein, a permanent attachment and/or fastening is a fastening between two elements of a TV lift assist device 100 that is not configured for release by a technician in the field and a non-permanent attachment and/or fastening is a fastening between two elements of a TV lift assist device 100 that is configured for release by the technician in the field. Fasteners may be utilized in conjunction with non-recessed holes 206 and recessed holes 212. The non-recessed holes 206 and recessed holes 212 may be of any diameter, threaded or unthreaded, and configured to facilitate fastening of two or more elements of a TV lift assist device 100.

TVHA Vertical Plate 202

As shown in FIG. 2C for at least one implementation, a TVHA vertical plate 202 may include a TVHA vertical plate slot 204 and two or more non-recessed holes 206, including two non-recessed holes 206 located on a top (T) portion of the TVHA vertical plate 202. The non-recessed holes 206 are configured to facilitate mating of a TVHA vertical plate 202 with other elements of a TVHA 200 including a TVHA vertical support plate 216 and a TVHA assist arm block 230. The TVHA vertical plate slot 204 may be configured to accept entry of a shaft portion (not shown) of an adjustment knob 240, such as adjustment knobs 240(5) and 240(6). A given adjustment knob 240 may include a handle portion (as shown) and a threaded or unthreaded shaft portion (not shown). The shaft portion is configured to proceed through the TVHA vertical plate slot 204 and into a non-recessed hole 206 provided in another TVHA element in order to fasten such elements together. A given adjustment knob 240 may have any configuration including a doorknob configuration, a hex head configuration, a square configuration, or otherwise. A given adjustment knob 240 may be hand operable, tightened by using specialized tools, or otherwise configured. A given adjustment knob 240 is utilized for non-permanently fastening of two or more elements of a TV lift assist device 100.

TVHA Upper Horizontal Plate 208

As shown in FIG. 2D for at least one implementation, a TVHA upper horizontal plate 208 may include a plurality of non-recessed holes 206 and a plurality of recessed holes 212. The non-recessed holes 206 are configured to facilitate fastening of the TVHA upper horizontal plate 208 respectively with the left TVHA vertical support plate guide 226(L) and the right TVHA vertical support plate guide 226(R). The plurality of recessed holes 212 are configured to facilitate fastening of the TVHA upper horizontal plate 208 with the TVHA middle vertical plate 210, the left TVHA vertical support plate 216(L) and the right TVHA vertical support plate 216(R).

TVHA Middle Vertical Plate 210,

As shown in FIG. 2E for at least one implementation, a TVHA middle vertical plate 210 may include a plurality of cut-out areas 214, non-recessed holes 206 and recessed holes 212. The non-recessed holes 206 are configured to facilitate fastening of the TVHA middle vertical plate 210 with the TVHA upper horizontal plate 208 and the TVHA front shelf plate 218. The recessed holes 212 are configured to facilitate fastening of the TVHA middle vertical plate 210 with the TVHA riser attachment block 244. The implementation shown includes three recessed hole sets 215, with a given recessed hole set 215 being separated by a cut-out area 214. A given recessed hole set 215 may be used to non-permanently fasten the TVHA middle vertical plate 210 to the TVHA riser attachment block 244. Selection of a given recessed hole set 215 may be determined by a technician based upon the dimensions of a room, such as the ceiling height, the height of a mantel over a fireplace, or otherwise. For at least one implementation, a first recessed hole set 215(1) may be used when the given TV is to be mounted in a room with an eight foot (8') ceiling and a top of a mantel is five to six feet (5'-6') above the floor. A second recessed hole set 215(2) may be used when the mantel is between six and seven feet (6'-7') above the floor, and a third recessed hole set 215(3) may be used when the room has ceilings higher than nine feet (9'). For other implementations, the various hole sets may be used as determined by a technician for a given TV mounting operation. For at least one implementation an Allen bolt may be used as a fastener 213 to non-permanently fasten the TVHA middle vertical plate 210 to the TVHA riser attachment block 244.

TVHA Vertical Support Plate 216

As shown in FIG. 2F and for at least one implementation, a TVHA vertical support plate 216 may include a TVHA vertical support plate top portion 217(T), a TVHA vertical support plate middle portion 217(M) and a TVHA vertical support plate bottom portion 217(B). These portions may include a plurality of non-recessed holes 206. The TVHA vertical support plate top portion 217(T) may be configured for attachment with the TVHA upper horizontal plate 208. The TVHA vertical support plate bottom portion 217(B) may be configured for attachment with the TVHA end shelf plate 220. For at least one implementation, the TVHA vertical support plate 216 is permanently fastened to each of the TVHA upper horizontal plate 208 and to the TVHA end shelf plate 220. The TVHA vertical support plate middle portion 217(M) may be configured to receive a shaft of an adjustment knob 240 and to facilitate non-permanent fastening of the TVHA vertical support plate 216 respectively with a left TVHA vertical plate 202(L) and a right TVHA vertical plate 202(R). It is to be appreciated that the TVHA vertical plate slot 204 facilitates slidable adjustments, along the Top (T) to Bottom (B) axis, of the TVHA vertical plate 202 relative to the TVHA vertical support plate 216. Such relative adjustments correspond to adjustments in a height of the TVHA top hold down plates 250 relative to the TVHA end shelf plate 220. It is to be appreciated that the height of the left TVHA top hold down plate 250(L) may be different than the height of the right TVHA top hold down plate 250(R)—such a configuration may occur, for example, when a top portion of a given TV slopes and the TV is not centered in the TVHA during use of the TV lift assist device 100 for a given TV to wall mounting operation.

For at least one implementation, the relative length of the combination of a given TVHA vertical plate 202 and a given TVHA vertical support plate 216 may be adjusted to facilitate securing of TVs having a height (as measured from a bottom of a given TV to a top thereof) varying between twenty four inches (24") and sixty-four inches (64").

TVHA Front Shelf Plate 218

As shown in FIG. 2G and for at least one implementation, a TVHA front shelf plate 218 may be configured to include a plurality of non-recessed holes 206. The non-recessed holes may be utilized to non-permanently fasten the TVHA front shelf plate 218 to a TVHA TV hook 232. At least two TVHA TV hooks 232 are fastened to the TVHA front shelf plate 218 for mounting of a TV weighing less than twenty-five (25) pounds. For TVs weighing more than one hundred and fifty (150) pounds, four TVHA TV hooks 232 are fastened to the TVHA front shelf plate 218. As shown in FIGS. 2A and 2B, a seventh adjustment knob 240(7) and an eighth adjustment knob 240(8) may be utilized to respectively fasten a bottom right TVHA TV hook 232(BR) and a bottom left TVHA TV hook 232(BL) to the TVHA end shelf plate 220.

TVHA End Shelf Plate 220

As shown in FIG. 2H and for at least one implementation, a TVHA end shelf plate 220 includes a TVHA end shelf plate vertical portion 222 having therein a plurality of recessed holes 212 and a TVHA end shelf plate horizontal portion 224 having herein a plurality of non-recessed holes 206. The plurality of recessed holes 212 are configured for non-permanently fastening, via a fastener, the TVHA end shelf plate 220 to the left TVHA vertical support plate 216(L), the TVHA middle vertical plate 210, and the right TVHA vertical support plate 216(R).

TVHA Vertical Support Plate Guide 226

As shown in FIG. 2I and for at least one implementation, a TVHA vertical support plate guide 226 may include a TVHA vertical plate guide channel 227 and at least two recessed holes 212. As shown in FIG. 2B, the TVHA vertical plate guide channel 227 may be configured to receive therein and facilitate slidable adjustments of a given TVHA vertical plate 202 relative to a corresponding TVHA vertical support plate 216. The two recessed holes 212 are configured to facilitate permanent fastening of the TVHA vertical support plate guide 226 with the TVHA upper horizontal plate 208.

TVHA Assist Arm 228

As shown in FIG. 2J and for at least one implementation, a TVHA assist arm 228 may include a plurality of a non-recessed holes 206 with the left most (as shown in FIG. 2J) non-recessed hole being configured to receive a non-permanent fastener (such as adjustment knob 240(1), as shown in FIG. 2A) fastening the TVHA assist arm 228 to a front TVHA TV hook 232(F). A second non-recessed hole 206 is configured to receive a fastener permanently fastening the TVHA assist arm 228 to an end TVHA TV hook 232(E)—as shown in FIG. 2A. The two right non-recessed holes are configured to receive a fastener permanently fastening the TVHA assist arm 228 to a TVHA assist arm bearing block 254 which is configured rotatable fastening of the TVHA assist arm 228 with the TVHA assist arm block 230. The TVHA assist arm 228 and TVHA assist arm bearing block 254 may be attached to a TVHA assist arm block 230 fastened on either the left TVHA vertical plate 202(L) or a right TVHA vertical plate 202(R). For at least one implementation, a TVHA assist arm 228 is not utilized to load a TV 800 onto a TVHA 200. For another implementation, a single TVHA assist arm 228 is utilized to facilitate loading of a TV 800 onto a TVHA 200. The TVHA assist arm 228 may be fastened to either the left TVHA vertical plate 202(L) or the right TVHA vertical plate 202(R), as determined by a technician based upon then occurring TV mounting conditions. For at least one implementation, two TVHA assist arms 228 may be utilized when mounting a given TV to a given wall. The use of two TVHA assist arms 228 may facilitate further stabilizing a large TV that has a base portion that extends beyond the length of the TVHA end shelf plate 220 and/or when stability of the given TV 800 on the TVHA 200 is otherwise of concern to the technician.

TVHA Assist Arm Block 230

As shown in FIG. 2K and for at least one implementation, a TVHA assist arm block 230 may include a TVHA assist arm block channel 231 and a plurality of non-recessed holes 206. As shown in FIG. 2R, the TVHA assist arm block channel 231 is configured to receive a corresponding TVHA asset arm bearing block extension 256 and upon insertion of a fastener, such as a TVHA assist arm pin 260, facilitate fastening of the TVHA assist arm 228 to a given TVHA vertical plate 202 and rotation of the TVHA assist arm 228 relative to the given TVHA vertical plate 202. The plurality of non-recessed holes 206 are configured for receiving a TVHA assist arm pin 260 (as shown in FIG. 2R) and fastening the TVHA assist arm block 230 to top portion of a given TVHA vertical plate 202.

TVHA TV Hook 232

As shown in FIG. 2L and for at least one implementation, a TVHA TV hook 232 includes a TVHA TV hook horizontal portion 234 having therein a TVHA TV hook slot 238, and a TVHA TV hook vertical portion 236 having therein at least two non-recessed holes 206 configured for receiving two fasteners (not shown) fastening a given TVHA TV hook 232 to the TVHA front shelf plate 218 at a given location thereon. As shown in FIGS. 2A and 2B and for at least one implementation, a TVHA may utilize a front TVHA TV hook 232(F), an end TVHA TV hook 232(E), a left TVHA TV hook 232(L), a right TVHA TV hook 232(R), a bottom left TVHA TV hook 232(BL) and a bottom right TVHA TV hook 232(BR).

TVHA Top Hold Down Plate 250

As shown in FIG. 2M and for at least one implementation, a TVHA top hold down plate 250 includes a plurality of non-recessed holes 206 and a plurality of recessed holes 212. The non-recessed holes 206 may be configured to receive an adjustment knob used to fasten a left or right TVHA TV hook 232 to the TVHA top hold down plate 250. The recessed holes 212 may be configured to fasten the TVHA top hold down plate 250 to the corresponding top portion of a TVHA vertical plate 202.

TVHA Riser Attachment Block 244 and TVHA Dowel 248

As shown in FIG. 2N and for at least one implementation, a TVHA riser attachment block 244 may include a TVHA attachment block opening 246 that is configured to accept a TVHA dowel 248, as further shown in FIG. 2O. The TVHA dowel 248 may be configured for mating of the TVHA 200 with the riser assembly by insertion into an opening in a riser assembly swivel block 304—as shown in FIGS. 3A-3C and 3G and as further described herein. A ninth adjustment knob 240(9) and a tenth adjustment knob 240(10) may be inserted into the TVHA riser attachment block 244 and, when tightened, inhibit rotation of the TVHA 200 about the vertical axis formed by the TVHA dowel 248. The TVHA riser attachment block 244 further includes four non-recessed holes (not shown), on a front face thereof, that are configured for non-permanently fastening the TVHA middle vertical plate 210 to the TVHA riser attachment block 244, as described above.

TVHA Bottom Block 252

As shown in FIG. 2P and for at least one implementation, a TVHA bottom block 252 may include a set of TVHA bottom block ridges 253 configured to guide a TVHA TV hook horizontal portion 234 in-between the ridges and (as shown on the drawing figure) left and right non-recessed holes 206 configured for fastening the TVHA bottom block 252 to a bottom portion of a TVHA end shelf plate 220 and a center non-recessed hole 206 configured for receiving an adjustment knob such as one of a seventh adjustment knob 240(7) and an eighth adjustment knob 240(8) (as shown in FIGS. 2A and 2B).

TVHA Assist Arm Bearing Block 254

As shown in FIG. 2Q and for at least one implementation, a TVHA assist arm bearing block 254 includes a TVHA assist arm bearing block extension 256 having therein a TVHA assist arm bearing block channel 258. As discussed above, the TVHA assist arm bearing block extension 256 is configured for insertion into the TVHA assist arm block channel 231, such insertion being further shown in FIG. 2R. The TVHA assist arm bearing block 254 includes a plurality of non-recessed holes 206 configured for receiving a fastener permanently fastening the TVHA assist arm bearing block 254 to a TVHA assist arm 228.

Riser Assembly 300

As shown in FIGS. 3A-3C and for at least one implementation, a TV lift assist device 100 may include a riser assembly 300. The riser assembly 300 includes elements which facilitate raising and lowering of a TV 800 located in a TVHA 200 between a first level, such as a ground level, to one more second levels, such as an elevated TV mounting level. To facilitate such raising (and lowering) of the TV 800 located in the TVHA 200 and for at least one implementation, the riser assembly 300 includes a riser assembly shaft 302, a strap 304, a riser assembly first extender plate 306, a riser assembly second extender plate 308, a URA 400, and an MRA 500.

Riser Assembly Shaft 302

As shown in FIGS. 3D-3F and for at least one implementation, a riser assembly shaft 302 may be configured in a T-slotted configuration and include a riser assembly shaft front recess 303(F), a riser assembly shaft end recess 303(E), and a plurality of non-recessed holes 206 extending from the therethrough. As shown in FIG. 3A, a first cotter pin 738(1) may be inserted in the riser assembly shaft 302 during assembly/disassembly of the TV lift assist device 100, as described below. The first cotter pin 738(1) is not utilized during TV mounting operations.

Riser Assembly First Extender Plate 306

As shown in FIG. 3G and for at least one implementation, a riser assembly first extender plate 306 may include a plurality of recessed holes 312 and a protrusion 307 configured for insertion into the riser assembly shaft front recess 303(F). For at least one implementation, the riser assembly first extender plate 306 is fabricated from one-quarter (¼) gauge Aluminum.

Riser Assembly Second Extender Plate 308

As shown in FIG. 3H and for at least one implementation, a riser assembly second extender plate 308 includes a plurality of recessed hole 212 configured to receive a fastener (not shown). For at least one implementation, the riser assembly second extender plate 308 is fabricated from one-quarter (¼) gauge Aluminum.

When fastened together by the insertion of non-permanent fasteners (not shown) into and partially through the riser assembly first extender plate 306, the riser assembly shaft 302, and into the riser assembly second extender plate 308, the combination of the riser assembly first extender plate 306, riser assembly shaft 302 and riser assembly second extender plate 308 strengthen the structural integrity of the riser assembly 300.

Upper Riser Assembly (URA) 400

As shown in FIGS. 3A-3C and as further shown in FIG. 4A, the riser assembly 300 includes an URA 400. For at least one implementation, the URA 400 is configured for removable placement on a top (T) end of the riser assembly shaft 302. When placed on top of the riser assembly shaft 302 it is to be appreciated that the weight of the URA 400 initially and then the TV 800 (when loaded into the TVHA 200) secures placement of the URA 400 on top of the riser assembly shaft 302. It is to be appreciated that for other implementations, one or more fasteners (not shown) may be used to non-permanently fasten a URA 400 on top of a riser assembly shaft 302.

For at least one implementation, the URA 400 includes a front URA roller 402(F), an end URA roller 402(E), a bearing channel 404, a left URA side block 406(L), a right URA side block 406(R), a front URA roller holder 408(F), an end URA roller holder 408(E), and a URA top plate 410.

URA Roller 402

As shown in FIG. 4B and for at least one implementation, a URA roller 402 includes an outer cylinder that surrounds a bearing channel 404 into which a bearing pin (not shown) is inserted. A URA roller 402 may include a limited slip surface on the outside of the outer cylinder that engage with the strap 304, when it is positioned over a URA roller 402.

URA Side Block 406

As shown in FIG. 4C and for at least one implementation, a right URA side block 406(R) includes a plurality of non-recessed holes 206 configured for fastening the right URA side block 406(R) to the front URA roller holder 408(F), the end URA roller holder 408(E), and the URA top plate 410. The left URA side block 406(L) has a mirror image configuration to the right URA side block 406(R).

URA Roller Holder 408

As shown in FIGS. 4A and 4D and for at least one implementation, a URA roller holder 408 includes a plurality of recessed holes 212 extending from a front URA roller holder portion 408(F) through to an end URA roller holder portion 408(E) and configured for insertion of a fastener (not shown) therein which, when tightened, permanently fastens the URA roller holder 408, respectively, to the right URA side block 406(R) and the left URA side block 406(L). The URA roller holder 408 also secures the URA roller 402 by insertion of the bearing pin (not shown) into a non-recessed hole 206 in a right URA roller holder portion 408(R) of a URA roller holder 408. The bearing pin holding a URA roller 402 in place in a given URA roller holder 408. As shown in FIG. 4A, two URA roller holders 408 are shown with the end URA roller holder 408(E) having a mirror image configuration to the front URA roller holder 408(F), which is further shown in FIG. 4D.

URA Top Plate 410

As shown in FIG. 4E and for at least one implementation, a URA top plate 410 includes a plurality of non-recessed holes 206 configured for receiving fasteners (not shown) that permanently fasten the URA top plate 410 to the left URA side block 406(L) and the right URA side block 406(R).

Middle Riser Assembly (MRA) 500

As shown in FIGS. 3A-3C and 5A-5N and for at least one implementation, the MRA 500 includes an MRA roller assembly 502 fastened to an MRA extension assembly 530.

MRA Roller Assembly 502

The MRA roller assembly 502 is configured to facilitate coupling of the MRA 500 to the riser assembly shaft 302 and movement of the MRA 500 up/down the riser assembly shaft 302—along the top (T) to bottom (B) axis, as shown by directional arrow A1 in FIG. 3A.

For at least one implementation the MRA roller assembly is formed in a permanent fastened U-shape configuration formed by left and right MRA roller assembly end plates 504(L/R) (as shown in FIG. 5B and for at least one implementation) that are respectively and permanently fastened to left and right MRA roller assembly side plates 506(L/R) (as shown in FIG. 5C and for at least one implementation). The MRA roller assembly side plates 506(L/R) are further permanently fastened to an MRA roller assembly front plate 508 (as shown in FIG. 5D and for at least one implementation). The MRA roller assembly end plates 504(L/R) and MRA roller assembly side plates 506(L/R) are further permanently fastened to an MRA roller assembly top plate 510 (as shown in FIG. 5E and for at least one implementation).

The MRA roller assembly front plate 508 is permanently fastened to an MRA roller assembly hook plate 512 (as shown in FIG. 5F and for at least one implementation). A MRA hook 514 is fastened to the MRA roller assembly hook plate 512.

The MRA roller assembly side plates 506(L/R) are permanently fastened to a respective MRA roller assembly side bearing holder 516(L/R) (as shown in FIG. 5G and for at least one implementation) which hold two end rollers (not shown). The end rollers are configured to engage with either the end portion of the riser assembly shaft 302 or, when installed, the riser assembly second extender plate 308. When the MRA is positioned on the riser assembly shaft 302, the end rollers inhibit movement of the MRA in the front (F) direction.

The MRA roller assembly side plates 506(L/R) are non-permanently fastened to a respective MRA roller assembly tie-in plate 518(L/R) (as shown in FIG. 5H and for at least one implementation), which are further fastened to respective MRA roller assembly side bearing holder plates 520 (L/R) (as shown in FIG. 5I and for at least one implementation). As shown in FIG. 5J and for at least one implementation, an MRA roller assembly side bearing assembly 522 is formed from the combination of an MRA roller assembly tie-in plate 518, an MRA roller assembly side bearing holder plate 520, a top roller 524(T), a top roller axel 526(T), a bottom roller 524(B), and a bottom roller axel 526(B).

As shown in FIG. 5K and for at least one implementation, the MRA roller assembly 502 includes opposing pairs of top and bottom MRA roller assembly side guide plates 528 including a top set of guide plates including a left top MRA roller assembly side guide plate 528(LT) (a right top MRA roller assembly side guide plate 528(RT) may be configured as a mirror image of the left top MRA roller assembly side guide plate 528(LT) and is not shown) that are non-permanently fastened to the MRA roller assembly top plate 510 and a bottom set of guide plates including a left bottom MRA roller assembly side guide plate 528(LB) and a right bottom MRA roller assembly side guide plate 528(RB) that are non-permanently and respectively fastened to a bottom portion of the MRA roller assembly side plates 506(L/R). The side guide plates may be adjusted by a technician, as needed, to facilitate movement of the MRA roller assembly 502 in an up/down direction and without rotation of the MRA roller assembly 502 relative to the riser assembly shaft 302.

MRA Extension Assembly 530

The MRA extension assembly 530 is configured to: couple with the TVHA 200; extend the TVHA 200 to and from the riser assembly shaft 302 along the front (F) to end (E) axis, as shown by directional arrow A2 in FIGS. 3A and 5A; and facilitate rotation of the TVHA 200 relative to the MRA extension assembly 530, about the top (T) to bottom (B) axis, as shown by directional arrow A3 in FIG. 3A.

For at least one implementation, the MRA extension assembly 530 includes an MRA extension assembly bottom plate 532 (as shown in FIG. 5L and for at least one implementation). Permanently fastened to the MRA extension assembly bottom plate 532 are an MRA extension assembly center guide plate 538 and an MRA extension assembly middle guide plate 539. For at least one implementation, MRA extension assembly bottom plate 532, the MRA extension assembly center guide plate 538, and the MRA extension assembly middle guide plate 539 have substantially equivalent lengths.

The MRA extension assembly 530 also includes a sliding portion including a left and right MRA extension assembly side plate 534 (L/R) (as shown in FIG. 5K for at least one implementation) that are respectively permanently fastened along the edges and to a bottom surface of an MRA extension assembly top plate 536 (as shown in FIG. 5L and for at least one implementation). The combination of the MRA extension assembly side plates 534 and MRA extension assembly top plate 536 form a U-shaped slider assembly which extends above the combination of the MRA extension assembly center guide plate 538 and the MRA extension assembly middle guide plate 539 while resting on a top surface of the MRA extension assembly bottom plate 532. When an eleventh adjustment knob 240(11) and a twelfth adjustment knob 240(12) are loosened, the U-shaped extension may be extended to or away from (as the case may be) the MRA roller assembly hook plate 512.

As shown in FIGS. 3A-3C, an MRA extension assembly further includes an MRA extension assembly swivel block 540 (as shown in FIG. 5O and for at least one implementation). The MRA extension assembly swivel block 540 may be non-permanently fastened to the MRA extension assembly top plate 536. The MRA extension assembly swivel block 540 may come in varying thickness and be configured of varying materials, as a technician may decide to use to support the weight of a given TV 800. The MRA extension assembly swivel block 540 further includes an MRA extension assembly swivel block hole 542 into which the TVHA dowel 248 is inserted and fastened to the MRA extension assembly swivel block 540 by the tightening of fasteners inserted into the non-recessed holes 206 in the MRA extension assembly swivel block 540.

Hoist Assembly 600

As shown in FIG. 6A and for at least one implementation, the hoist assembly 600 may be configured as a winch that includes a winch base 602, which is non-permanently mounted to the riser assembly shaft 302, a winch drum 604, a winch guide roller 606, a winch ratchet gear box 608, a winch arm 610, and a winch handle 612.

In at least one implementation, the winch ratchet gear box 608, winch arm 610 and winch handle 612 may be replaced by a motor (not shown). A person having ordinary skill in the art will appreciate that the strap 304 may be wound around the winch drum 604, routed down and around the winch guide roller 606, then up to the URA 400, and then down to the MRA hook 514. A c-clamp, knot or other fastening means may be used to fasten the strap 304 to the MRA hook 514.

As shown in FIGS. 6B, 6C and 6D, the hoist assembly 600 is fastened to the riser assembly shaft 302 via a riser assembly shaft hoist bracket 614, a winch coupler plate 616, a sixth cotter pin 738(6) and a seventh cotter pin 738(7). For at least one implementation, the riser assembly shaft hoist bracket 614 is permanently attached to the riser assembly second extender plate 308 via a plurality of fasteners 213 (not shown) inserted into non-recessed holes 206. For at least one implementation, the winch coupler plate 616 is permanently fastened to the winch base 602 (as shown in FIG. 6A) using fasteners 213 (not shown) inserted into corresponding non-recessed holes 206 in the winch base 602 (not shown) that correspond to non-recessed holes 206 provided in the winch coupler plate 616. The sixth cotter pin 738(6) and seventh cotter pin 738(7), when inserted through aligned cotter pin holes 730 in the riser assembly shaft hoist bracket 614 and the winch coupler plate 616, fasten the hoist assembly 600 to the riser assembly 300.

Stand Assembly 700

As shown in FIGS. 7A-7R and for at least one implementation, a stand assembly 700 includes a center rail assembly 702, a front rail assembly 704, a riser assembly shaft mating assembly ("RSMA") 706, a left outrigger rail assembly 708(L), a right outrigger rail assembly 708(R), a left outrigger rail mating assembly ("ORMA") 708(L), a right ORMA 708(R), a left leg height adjustment assembly ("LHAA") 712(L), a right LHAA 712(R), a left leg attachment assembly ("LAA") 714(L), a right LAA 714(R), a left TVHA stop assembly 754(L), a right TVHA stop assembly 754(R), a plurality of footpads 716, and a plurality of cotter pins 738.

Center Rail Assembly 702

As shown in FIGS. 7F and 7G and for at least one implementation, a center rail assembly 702 includes two rails with a given center rail 718(1/2) having a center rail assembly top portion 718(T), a center rail assembly middle portion 718(M), and center rail assembly bottom portion 718(B). For at least one implementation, a center rail assembly rail portion 718 has a T-slotted configuration and have the same length.

Front Rail Assembly 704 and Front Rails 720

As further shown in FIGS. 7F and 7G and for a least one implementation, a front rail assembly 704 includes a first front rail 720(1) and a second front rail 720(2). For at least one implementation, the first front rail 720(1) and the second front rail 720(2) have a T-slotted rail configuration.

Riser Assembly Shaft Mating Assembly (RSMA) 706

As further shown in FIGS. 7F and 7G and for at least one implementation, a riser assembly shaft mating assembly (RSMA) 706 includes a RSMA center angle bracket 722, a RSMA riser assembly shaft bracket 724, a left RSMA angle bracket 726(L), a right RSMA angle bracket 726(R), a left front RSMA right-angle rail bracket 728(L), right front RSMA right front angle bracket 728(R), a left end RSMA right-angle bracket 732(L), and a right end RSMA right-angle bracket 732(R).

RSMA Center Angle Bracket 722

As shown in FIGS. 7F, 7G and 7H and for at least one implementation, the RSMA center angle bracket 722 includes a plurality of non-recessed holes 206 for insertion of fasteners 213 (not shown) that can be permanently fastened to a top portion of the top front rail 720(1) of the front rail assembly 704 and to the RSMA riser assembly shaft bracket 724. A tool access hole 723 provides access, by a tool insert therethrough, to tighten of a corresponding fastener (not shown) seated in the non-recessed hole 206 immediately there below.

RSMA Riser Assembly Shaft Bracket 724

As shown in FIGS. 7F, 7G and 7I and for at least one implementation, the RSMA riser assembly shaft bracket 722 has a U-shape configuration including a RSMA riser assembly shaft bracket right portion 724(R), a RSMA riser assembly shaft bracket center portion 724(C), and a RSMA riser assembly shaft bracket left portion 724(L). The RSMA riser assembly shaft bracket right portion 724(R) and the RSMA riser assembly shaft bracket left portion 724(L) include a plurality of non-recessed holes 206 for permanently and respectively fastening the RSMA riser assembly shaft bracket 724 to the left RSMA angle bracket 726(L) and to the right RSMA angle bracket 726(R). A plurality of recessed holes 212 are included for inserting fasteners (not shown) therein and permanently fasten the RSMA riser assembly shaft bracket 724 to the RSMA cent angle bracket 722. A pair of cotter pin holes 730(L/R) are included for insertion of a third cotter pin 738(3) therein. When the riser assembly shaft 302 is inserted into the U-shaped cavity provided in the RSMA riser assembly shaft bracket 724 and the third cotter pin 738(3) is inserted therein, the third cotter pin 738(3) secures the stand assembly 700 to the riser assembly 300 and prevents separation therefrom during TV mounting operations.

RSMA Angle Brackets 726

As shown in FIGS. 7F and 7G and for at least one implementation, the left RSMA angle bracket 726(L) and the right RSMA angle bracket 726(R) include a RSMA angle bracket vertical portion 726(V), a RSMA angle bracket horizontal portion 726(H), a RSMA angle bracket front portion 726(F), and a RSMA angle bracket end portion 726(E) (for purposes of drawing simplicity, portions of the left RSMA angle bracket 726(L) are annotated in FIG. 7G; corresponding portions exist for the right RSMA angle bracket 726(R), as rotated 180 degrees about the top (T) to bottom (B) axis).

Left Front and Right Front RSMA Right-Angle Brackets 728

As shown in FIG. 7F and for at least one implementation, the left RSMA front right-angle bracket 728(L) and the right RSMA front right-angle bracket 728(R) includes a plurality of non-recessed holes 206 for insertion of a fastener (not shown) therein and permanent fastening of the front rail assembly 704 with the center rail assembly 702.

Left End and Right End RSMA Right-Angle Brackets 732

As shown in FIGS. 7G and 7J and for at least one implementation, the left end RSMA right-angle bracket 732(L) and the right end RSMA right-angle bracket 732(R) includes a RSMA right-angle bracket first portion 732(1) and a RSMA right-angle bracket second portion 732(2). The RSMA right-angle bracket first portion 732(1) includes a plurality of non-recessed holes 206 receiving a fastener which permanently fastens the respective left end/right end RSMA right-angle bracket 732 to the center rail assembly 702. A left end/right end RSMA right-angle bracket second portion 732(2) includes a cotter pin hole 730 for insertion of a fifth cotter pin 738(5) (as shown in FIGS. 7A and 7C) which secures an RSMA back brace 734 to the stand assembly 700 and thereby provides additional vertical support to the riser assembly shaft 302 when the riser assembly shaft 302 is seated in the RSMA riser assembly shaft bracket 724.

RSMA Back Brace 734

As shown in FIGS. 7A, 7C, 7D and 7K and for at least one implementation, the RSMA back brace 734 is configured for insertion between the left end RSMA right-angle bracket 732(L) and right end RSMA right-angle bracket 732(R). The RSMA back brace 734 includes a cotter pin hole 730 for receiving the fifth cotter pin 738(5) and a plurality of recessed holes 212 which may be used to fasten the RSMA back brace 734 to the riser assembly second extender plate 308, when it is fastened to the riser assembly shaft 302. For at least one implementation, the RSMA back brace 734 is optional for mounting operations of TVs of less than one hundred and twenty five (125) pounds.

Outrigger Rail Assembly 708

As shown in FIGS. 7D and 7L and for at least one implementation, the right outrigger rail assembly 708(R) (the left outrigger rail assembly 708(L) being a mirror image of the right outrigger rail assembly 708(R)) includes an outrigger rail assembly top portion 708(T), an outrigger rail assembly middle portion 708(M), and an outrigger rail assembly bottom portion 708(B). For at least one implementation, the outrigger rail assembly 708 has the same configuration, but may be of different length, as the front rail assembly 704.

Outrigger Rail Mating Assembly (ORMA) 710

As shown in FIGS. 7A, 7D, 7E, 7L, 7M, 7N, 7O and 7P and for at least one implementation, a right ORMA 710(R) (the left ORMA 710(L) having a mirror image configuration) includes a top ORMA first plate 740(T), a bottom ORMA first plate 740(B) (which is a mirror image of the top ORMA first plate 740(T)), a front ORMA second plate 742(F), and an end ORMA second plate 742(E) (which is a mirror image of the front ORMA second plate 742(F)). The first plates and second plates are permanently fastened together using fasteners inserted into the recessed holes 212 in the ORMA first plates 740 and into the non-recessed holes 206 in the ORMA second plates 742. The recessed holes 212 in the ORMA first plates are configured to receive permanent fasteners for insertion therein and fastening of a given ORMA 710 to a given outrigger rail assembly 708, as shown by the fasteners 213 in FIG. 7M.

Also shown in FIG. 7M is a handle 744 which may be attached to one or more of the outrigger rail assemblies 708.

Leg Height Adjustment Assembly (LHAA) 712

As shown in FIGS. 7Q, 7R and 7S and for at least one implementation, a right LHAA 712(R) includes an LHAA rail bracket 746, a front facing LHAA leg bracket 748(F), and an end facing LHAA leg bracket 748(E) thereby forming a channel within which the adjustable leg 711 may be raised and lowered. A left LHAA 712(L) (not shown) has a mirror image configuration to the right LHAA 712(R).

A vertical portion of the LHAA rail bracket 746 includes a plurality of non-recessed holes 206 for insertion of fasteners 213 therein and upon tightening thereof permanently fastening the LHAA rail bracket 746 to the respective LHAA rail brackets 746.

The horizontal portion of the LHAA rail bracket 746 includes a plurality of non-recessed holes 206 for insertion of fasteners therein and upon tightening thereof permanently fastening the LHAA rail bracket 746 to a given outrigger rail assembly 708.

For the right adjustable leg 711(R) a thirteenth adjustment knob 240(13) and a fourteenth adjustment knob 240(14) may be tightened to non-permanently fasten the respective right LHAA leg brackets 748 to the right adjustable leg 711(R).

For the left adjustable leg (not shown in FIGS. 7Q-7S), a fifteenth adjustment knob 240(15) and a sixteenth adjustment knob 240(16) may be tightened to non-permanently fasten the left LHAA leg brackets 748 to the left adjustable leg 711(L).

For at least one implementation, the LHAA leg brackets 748 may be permanently fastened to a given adjustable leg 711 by inserting and tightening fasteners 213 into the corresponding non-recessed holes 206 in the LHAA leg brackets 748.

For an implementation, an eighth cotter pin 738(8) may be inserted into the right adjustable leg 711(R) to prevent slippage of the right outrigger rail assembly 708(R) relative to the right adjustable leg 711(R) while the thirteenth and fourteenth adjustment knobs 240(13/14) are being tightened during assembly of the TV lift assist device 100 or loosened during disassembly thereof.

A ninth cotter pin 738(9) (not shown) may be similarly used to prevent slippage of the left outrigger rail assembly 708(L) relative to the left adjustable leg 711(L) while the fifteenth and sixteenth adjustment knobs 240(15/16) are being tightened during assembly of the TV lift assist device 100 or loosened during disassembly thereof.

Leg Attachment Assembly (LAA) 714

As shown in FIGS. 7A, 7B, 7C, 7D, 7E and 7L and for at least one implementation, a right LAA 714(R) includes a front LAA bracket 750(F), coupled by an LAA plate 752 to a mirror image configured end LAA bracket 750(E). The LAA brackets 750 include a plurality of holes for fastening to a given outrigger rail assembly 708 and to the LAA plate 752 and the LAA plate includes a plurality of non-recessed holes for fastening the LAA plate 752 to a given adjustable leg 711, such fastening may be utilized when an LHAA 712 is not utilized for a given implementation to adjust a height of an adjustable leg 711.

TVHA Stop Assembly 754

As shown in FIGS. 7A, 7B, 7D, 7E and 7L and for at least one implementation, one or more TVHA stop assemblies 754, such as a right TVHA stop assembly 754(R) and/or a left TVHA stop assembly 754(L) may be utilized to prevent movement of a TVHA 200 towards the En portion of the TV lift assist device 100. Such movement may be undesired, for example, when the TV lift assist device 100 is in a "kneeling configuration" (as described below). For at least one implementation, a TVHA stop assembly 754 includes a TVHA stop assembly mounting plate 756 (such as the right TVHA stop assembly mounting plate 756(R) shown in FIG. 7L) and a TVHA stop assembly pole 758 (such as the right TVHA stop assembly pole 758(R) shown in FIG. 7L). The TVHA stop assembly mounting plate 756 may be positioned at a given location along, and fastened thereto, an outrigger rail assembly 708 where the position is located along a span of the outrigger rail assembly 708 that extends from a given ORMA 710 towards a front end of the given outrigger rail assembly 708. The TVHA stop assembly pole 758 may be fastened to a TVHA stop assembly mounting plate 756.

Securing TV to TVHA Operations

As shown in FIG. 8 and FIG. 9 and for at least one implementation, a TV 800 may be secured in the TVHA 200 prior to being raised for mounting on a given wall. In accordance with at least implementation, a process of securing a TV 800 in the TVHA 200 may include, as per Operation 900, determining a height H1 and a width W1 of the TV 800.

As per Operation 902, the process may include adjusting at least one of the TVHA vertical plates 202 relative to the TVHA vertical support plates 216 such that a distance H2 from the TVHA front shelf plate 218 to the left TVHA TV hook 232(L) and right TVHA TV hook 232(R) has a height offset ("H3") of ten (10) millimeters greater than the height H1 of the TV 800 such that H2≈H1+H3.

As per Operation 904, the process may include adjusting the position of the TVHA front shelf plate 218 relative to the TVHA end shelf plate 220 such that a second width ("W2") is provided therebetween and wherein W2 includes width offset ("W3") of three (3) millimeters greater than the width W1 of the TV 800 such that W2≈W1+W3.

It is to be appreciated that HO and WO may vary by technician preferences and generally provide clearance, as a person having ordinary skill in the art could determine based on trial and error, experience, common sense, or otherwise, for the TV 800 to be slid (or otherwise positioned) on the combination of the TVHA front shelf plate 218 and the TVHA end shelf plate 220 (herein in combination the "TVHA shelf") and retained by the left TVHA TV hook 232(L) and right TVHA TV hook 232(R) during positioning of the TV 800 on the TVHA 200.

As per Operation 906, the process may include positioning the TVHA assist arm 228 such that the front TVHA TV hook 232(F) contacts a corresponding edge of the TV 800 (which may be either a right edge of the TV 800 when the TVHA assist arm 228 is coupled to the right TVHA vertical plate 202(R) or the left edge of the TV 800 when the TVHA assist arm 228 is coupled to the left TVHA vertical plate 202(L)).

For at least one implementation, the TVHA assist arm 228 may be utilized by a technician to stabilize a TV 800 when it is positioned on a corresponding left or right edge of the TVHA shelf and while it is being "finally positioned" onto the TVHA shelf. Herein, a TV 800 is "finally positioned" on the TVHA shelf when a center of the TV 800 (as determined along a length L1 of the TV 800) is positioned within a center offset ("L3") of five (5) millimeters from a center of a length L2 of the TVHA middle vertical plate 210 such that L2≈L1+L3.

As per Operation 908, the process may include finally positioning the TV 800 on the TVHA shelf.

As per Operation 910, the process may include adjusting the left TVHA TV hook 232(L) and right TVHA TV hook 232(R) such that pressure is applied to the top edge of the TV 800 to prevent the TV 800 from shifting on the TVHA shelf during one or more TV mounting operations. As used herein, the "pressure" applied may be a hand-tightened pressure and typically ranges between five (5) and ten (10) newtons-meters that is applied by a given TVHA TV Hook 232 onto an edge of the TV. It is to be appreciated that a larger TV will commonly need more pressure on it than a smaller TV to prevent shifting of the TV on the TVHA shelf during mounting operations. For at least one implementation, the "pressure" to apply may be specified in operating manuals for a given television, determined by a technician based upon then arising conditions including type of TV display to be mounted, dimensions of the TV, weight of the TV, the mounting height of the TV, and the like.

TV Lift Assist Device Positioning Operations

As shown in FIGS. 10 and 11 and for at least one implementation, a TV lift assist device 100 may be positioned for mounting of a given TV 800 at a given wall mounting location in view of then arising conditions, such as the presence of immovable objects, including hearths, or the like that may interfere with the TV mounting (herein, an "interfering mounting condition"). As shown for one non-limiting example of a mounting operation where an interfering mounting condition exists, a room may include a hearth 802, a fireplace 804, and a mantel 806 that are located below a given mounting location ("ML") for the TV 800. To accommodate such an interfering mounting condition, the TV lift assist device 100 may be configured to "kneel on the hearth" (herein, the TV lift assist device 100 being in a "kneeling configuration") such that the left and right front footpads 716(F) contact the hearth top surface 802(T), while the left and right end footpads 716(E) contact the floor.

For at least one implementation and as per Operation 1100, a process for positioning a TV lift assist device when an interfering mounting condition exists may include determining the following distance: a ceiling/third height ("H3") indicative of a floor to ceiling height in the area at which the TV is to be mounted, a hearth/fourth height ("H4") indicative of the height of the hearth top surface 802(T) above the floor, a mantel/fifth height ("H5") indicative of the height of the mantel above the hearth top surface 802(T), a mounting location/sixth height ("H6") indicative of the height of the mounting location (ML) for the TV 800 above a mantel top surface 806(T) (the mounting location typically corresponds to the vertical center of the TV 800), a seventh height ("H7"), indicative of the distance from the mounting location (ML) to the ceiling, and an eighth height ("H8") indicative of the height of the URA 400 above the floor when the TV lift assist device 100 is in a kneeling configuration.

As per Operation 1102, the process may include determining whether the given TV 800 clears the ceiling when positioned above the mantel top surface 806(T) to be mounted at the mounting location (ML). For at least one implementation, the operation may include determining if: $H6+H7 \geq H1$; $H6 \geq (1/2)H1$; and $H7 \geq (1/2)H1$. If these determinations are true, the process proceeds to Operation 1106. If any of these determinations yield a false result, the process proceeds to Operation 1104.

As per Operation 1104, the process may include determining whether an upwards of downwards adjustment in the mounting location (ML) will result in a revised mounting location that satisfies the determinations made per Operation 1104. If "yes", the mounting location is adjusted, and the process proceeds to Operation 1106. If "no," the process ends, as per Operation 1105, with the TV 800 not being mounted at the given mounting location (ML).

As per Operation 1106, the process may include determining if the TV lift assist device, when in the kneeling configuration for the given mounting, will fit in the mounting area. For at least one implementation, Operation 1106 includes determining if: $H8 < H3$. If "yes," the process continues with Operation 1108. If "no," the proceed proceeds to Operation 1105.

As per Operation 1108, the process may include positioning the left and right front footpads 716(F) on the hearth top surface 802(T). For at least one implementation, the left and right front footpads 716(F) are positioned six (6) to eight (8) inches away from the mounting location wall (or other surface). Depending on the size and weight of the TV 800 to be mounted, Operation 1108 may occur or after the TV 800 has been loaded onto the TVHA, as per the operations of FIG. 10. For mounting operations where the combined weight of the given TV 800 and the TV lift assist device 100 is greater than one hundred and twenty-five (125) pounds, technician safety protocols may specify that Operation 1108 occurs before the FIG. 10 Operations. For other mounting operations, Operation 1108 may occur before or after the FIG. 10 Operations, as determined by a technician at that given time.

As per Operation 1110, the process may include adjusting the length of the left and right adjustable legs 711 so that the adjustable legs 711 extend below the corresponding front footpad 716(F) by the distance of the fourth height (H4) and the left and right ORMAs 710 are level to a ground plane. It is to be appreciated that the floor may or may not be level to the ground at one more locations and/or in one more directions such as directions along the end (E) to front (F) axis, along the right (R) to left (L) axis and/or along the top (T) to bottom (B) axis. For at least one implementation, Operation 1110 includes adjusting one or both of the left and right adjustable legs 711 until the TV lift assist device 100 is level with respect to the three axes, tightening the adjustment knobs 240 and inserting the cotter pins 738 into the respective (left/right) LHAA 712.

As per Operation 1112, the process then proceeds to the TV raising, extension, and mount positioning operations as illustrated in FIGS. 12 and 13.

TV Lift Assist Device TV Mounting Operations

As shown in FIGS. 12 and 13 and for at least one implementation, TV raising, extension and mount positioning operations ("REM") may commence once the TV lift assist device 100 is positioned relative to a given TV mounting location (ML) and the TV lift assist device has been leveled across the three axes.

For at least one implementation and as per Operation 1300, the REM process may include rotating the winch handle 612 a first direction (e.g., clockwise) until a center of the TV 800 (as held in the TVHA 200) reaches a height slightly above a wall mounting bracket fastened to the mounting location ML wall. For at least one implementation, the TVHA (and TV 800 secured therein) is raised to a height sufficiently above, as determined based on actual use and for a given TV and mounting bracket combination, the ML so that a TV mounting bracket (not shown and separately provided) can mate with a corresponding wall mounting bracket already fastened to the wall (or other surface) at the mounting location ML.

As per Operation 1302, the REM process may include loosening the eleventh adjustment knob 240(11) and twelfth adjustment knob 240(12) and extending the U-shaped slider assembly towards the mounting location ML wall and thereby positioning the TV 800 above the ML and within an inch of the wall. The eleventh adjustment knob 240(11) and the twelfth adjustment knob 240(12) are then tightened.

As per Operation 1304, the REM process may include loosening the ninth adjustment knob 240(9) and tenth adjustment knob 240(10) which fasten the TVHA riser attachment block 244 to TVHA dowel 248 which is further fastened to the MRA extension assembly swivel block 540 attached to the U-shaped slider assembly of the MRA extension assembly 530. Upon loosening the adjustment knobs, the TVHA 200 (and thereby the TV 800 secured therein) may be rotated about the top (T) to bottom (B) axis so that the TV mounting bracket and the wall mounting bracket may align for mating. It is to be noted that such rotating of the TVHA 200 relative to the mounting location ML wall and the wall mounting bracket fastened thereon may be needed with the TV lift assist device 100 is not aligned perpendicular to the mounting location ML wall.

As per Operation 1306, the REM process may include verifying the TV mounting bracket are aligned for mating and mating the brackets by lowering the TVHA 200 (and the TV 800 secured therein) by cranking the winch arm 610 in the opposite direction until the TV mounting bracket mates with the wall mounting bracket.

As per Operation 1308, the REM process may include fastening the as aligned TV mounting bracket with the wall mounting bracket.

As per Operation 1310, the REM process may include loosening the fifth adjustment knob 240(5), loosening the sixth adjustment knob 240(6), raising the left TVHA vertical plate 202(L), and raising the right TVHA vertical plate 202(R) until the left TVHA TV hook 232(L) and right TVHA TV hook 232(R) are clear of a top portion of the TV 800. Operation 1310 may also include loosening the front TVHA TV hook 232(F) when the TVHA assist arm 228 is used to secure the TV 800 to the TVHA 200 during TV mounting operations.

As per Operation 1312, the REM process may include further lowering the TVHA until the TVHA front shelf plate 218 clears a bottom portion of the TV 800, retracting the U-shaped slider assembly back towards the riser assembly shaft 302, lowering the MRA 500 to its lowest position and moving the TV lift assist device 100 away from the as mounted TV 800 for disassembly and removal of the TV lift assist device 100.

TV Lift Assist Device Assembly Operations

For at least one implementation, the TV lift assist device 100 may be transported to a TV mounting location in a disassembled state and assembled on-site. For at least one implementation, assembly of a TV lift assist device 100 may include one or more of the operations of FIG. 14.

As per Operation 1400, a process for assembling a TV lift assist device 100 for operative use thereof may include positioning the center rail assembly 702 (which is permanently fastened to the front rail assembly 704) near, e.g., within a given distance of the mounting location ML wall. For at least one implementation, the given distance is approximately twelve inches (12"). For other implementations, the given distance depends upon the length of the outrigger rail assemblies 708 used, and a maximum extension length supported by a given MRA extension assembly 530.

As per Operation 1402, the process may include attaching the outrigger rail assemblies to an already combined center rail assembly and front rail assembly. Such operation may include attaching the left and right ORMAs 710(L/R) to the center rail assembly 702, inserting the center rail assembly 702 into the ORMA 710, with the ORMA already being permanently fastened to the given outrigger rail assembly 708 and the adjustable legs 711(L/R) being positioned in their down position, and securing the center rail assembly 702 in the ORMA 710 by inserting and securing one of the second cotter pin 738(2) or the third cotter pin 738(3).

As per Operation 1404, the process may include positioning the MRA 500 on the riser assembly shaft 302. For at least one implementation, this operation may include inserting the first cotter pin 738(1) into the riser assembly shaft 302. The first cotter pin 738(1) is utilized to inhibit the MRA 500 from sliding below the hoist assembly 600 during assembly of the TV lift assist device. The operation further includes sliding the MRA 500 onto the riser assembly shaft 302 until it contacts the first cotter pin 738(1).

As per Operation 1406, the process may include positioning the riser assembly shaft 302 (as combined with the MRA per operation 1404) in the stand assembly 700. For at least one implementation, this operation may include placing the riser assembly shaft 302 into the riser assembly shaft mating assembly (RSMA) 706 and securing the assembly by inserting the fourth cotter pin 738(4) and the fifth cotter pin 738(5) into their corresponding cotter pin holes 730(4) and 738(5).

As per Operation 1408, the process may include placing the upper riser assembly (URA) 400 on top of the riser assembly shaft 302.

As per Operation 1410, the process may include attaching the hoist assembly 600 to the riser assembly shaft 302. For at least one implementation, this operation may include mating the riser assembly shaft hoist bracket 614 (which has previously been permanently fastened to the riser assembly shaft 302) with the winch coupler plate 616 (which has been previously permanently fastened to the winch base 602) and securing the mating by inserting the sixth cotter pin 738(6) and seventh cotter pin 738(7) into their corresponding cotter sixth cotter pin hole 730(6) and seventh cotter pin hole 730(7).

As per Operation 1412, the process may include operably attaching the hoist assembly 600 to the MRA 500 such that when attached use of the hoist assembly 600 results in a raising or lowering of the MRA 500. For at least one implementation, such operable attaching may include routing the strap 304 from the hoist assembly 600, over the URA 400 and down to the MRA 500 and securing the strap 304 to the MRA hook 514. For at least one implementation, a carabiner (not shown) or similar springlock or screw lock type clip may be used to fasten the strap 304 to the MRA hook 514. Upon securing the strap 304 to the MRA 500, the first cotter pin 738(1) may be removed from the riser assembly shaft 302.

As per Operation 1414, the process may include attaching the TVHA 200 to the MRA 500 by inserting the TVHA riser attachment block 244 on the TVHA dowel 248 (where the TVHA dowel 244 has been previously permanently fastened to the MRA extension assembly swivel block 540) and tightening the ninth and tenth adjustment knobs 240(9/10). Upon completing Operation 1416, the TV lift assist device 100 is configured to perform TV mounting operations, as described herein for at least one implementation with respect to FIGS. 8-13.

It is to be appreciated that a fully configured TV lift assist device 100 may be disassembled by performing Operations 1400-1416 in a reverse order.

Based on design considerations, the components described above may be of substantially different shape than depicted in the figures, while still operating in the same or an equivalent manner. For example, an implementation of a lock adapter may be taller, shorter, wider, thinner, or of different cross-sectional shape than depicted herein. Variations of the examples and implementations described above are possible. In at least one implementation, one or more fasteners may be eliminated by combining given components as single units. Directional references e.g., upper, lower, inner, outer, upward, downward, left, right, lateral, front, back, top, bottom, above, below, vertical, horizontal, clockwise, counterclockwise, proximal, and distal are used for identification purposes to aid the reader's understanding of the claimed subject matter, and do not create limitations, particularly as to the position, orientation, or use of the lock adapter. Connection references, e.g., attached, coupled, connected, and joined are to be construed broadly and may include intermediate members between a collection of elements and relative movement between elements unless otherwise indicated. As such, connection references do not imply that two elements are directly connected and in a fixed relation. The term "or" shall be interpreted to mean "and/or" rather than "exclusive or." Unless otherwise noted in the claims, stated values shall be interpreted as illustrative and shall not be taken to be limiting.

The above specification, examples and drawings provide a complete description of the structure and use of one or more non-limiting implementations of present disclosure as defined in the claims. Although various implementations of the claimed subject matter have been described above with a given degree of particularity, or with reference to one or more individual implementations, those skilled in the art could make alterations to the disclosed implementations without departing from the spirit or scope of the claimed subject matter. For example, components may be made of varied materials, and may be colored or patterned for aesthetic purposes or for ease of assembly. Still other implementations are contemplated. It is intended that matter contained in the above description and shown in the accompanying drawings shall be interpreted as illustrative of particular implementations and not limiting. Changes in detail or structure may be made without departing from the basic elements of the subject matter as defined in the following claims.

What is claimed is:

1. A TV lift assist device, comprising:

a TV Holder Assembly ("TVHA") configured for holding a television ("TV") during at least one TV mounting operation;

a riser assembly, coupled to the TVHA; and a stand assembly, coupled to the riser assembly, comprising:

a center rail assembly; and a first outrigger rail assembly coupled to the center rail assembly:

wherein the first outrigger rail assembly extends from a front to an end of the first outrigger rail assembly, and includes a top surface and a bottom surface;

wherein the first outrigger rail assembly comprises:

a first front foot pad coupled to the bottom surface and at a first location proximate to the first outrigger rail assembly:

a first Leg Height Adjustment Assembly ("LHAA") coupled to the first outrigger rail assembly at a second location proximate to the end of the first outrigger rail assembly:

a first adjustable leg coupled to the first LHAA; and a first end foot pad coupled to a bottom surface of the first adjustable leg; and wherein the first LHAA facilitates levelling of the stand assembly by extensions or retractions of the first adjustable leg within the first LHAA when the first front foot pad is resting on a first surface at a first elevation and the first end foot pad is resting on a second surface at a second elevation;

wherein the first LHAA further comprises:

a front facing LHAA leg bracket, coupled the first outrigger rail assembly; and an end facing LHAA leg bracket, coupled to first outrigger rail assembly; and wherein, to level the stand assembly, the first adjustable leg is configured to be raised and lowered within a first channel formed by the front facing LHAA leg bracket and the end facing LHAA leg bracket.

2. The TV lift assist device of claim 1, wherein the stand assembly further comprises:

a cotter pin; and wherein the adjustable leg includes at least two cotter pin holes; and wherein the height of the second location above the second foot pad is configured by inserting the cotter pin through a given cotter pin hole, selected from the at least two cotter pin holes, then located below a bottom of the channel formed by the front facing LHAA leg bracket and the end facing LHAA leg bracket.

3. The TV lift assist device of claim 1, wherein the first LHAA further comprises:

a first LHAA rail bracket coupled to the top surface of the first outrigger rail assembly; and a first adjustment knob; and wherein the first LHAA rail bracket is further coupled to each of the front facing LHAA leg bracket and to the end facing LHAA leg bracket;

wherein the front facing LHAA leg bracket includes a first hole for receiving the first adjustment knob; and wherein upon tightening of the first adjustment knob, the adjustable leg is fastened to the outrigger rail assembly.

4. The TV lift assist device of claim 3, wherein the outrigger rail assembly further comprises:

a top rail portion;

a middle rail portion; and a center rail portion; and wherein at least one of the top rail portion, the middle rail portion and the center rail portion have a T-slotted configuration.

5. The TV lift assist device of claim 4 further comprising:

a second outrigger rail assembly configured as a mirror image of the first outrigger rail assembly.

6. The TV lift assist device of claim 1, wherein the first elevation is higher than the second elevation.

7. A TV lift assist device, comprising:

a TV Holder Assembly ("TVHA") configured for holding a television ("TV") during at least one TV mounting operation;

a riser assembly, coupled to the TVHA; and a stand assembly, coupled to the riser assembly, comprising:

a center rail assembly; and a first outrigger rail assembly coupled to the center rail assembly;

wherein the first outrigger rail assembly extends from a front to an end of the first outrigger rail assembly, and includes a top surface and a bottom surface;

wherein the first outrigger rail assembly comprises:

a first front foot pad coupled to the bottom surface and at a first location proximate to the first outrigger rail assembly;

a first Leg Height Adjustment Assembly ("LHAA") coupled to the first outrigger rail assembly at a second location proximate to the end of the first outrigger rail assembly;

a first adjustable leg coupled to the first LHAA; and a first end foot pad coupled to a bottom surface of the first adjustable leg; and wherein the first LHAA facilitates levelling of the stand assembly by extensions or retractions of the first adjustable leg within the first LHAA when the first front foot pad is resting on a first surface at a first elevation and the first end foot pad is resting on a second surface at a second elevation;

wherein the first outrigger rail assembly is couplable to the center rail assembly by an Outrigger Rail Mating Assembly ("ORMA") comprising:

a top ORMA plate configured for permanent fastening to the top surface of the outrigger rail assembly;

a bottom ORMA plate configured for permanent fastening to the bottom surface of the outrigger rail assembly;

a front ORMA plate, permanently fastened to a front edge of each of the top ORMA plate and the bottom ORMA plate, and having at least one cotter pin hole; and an end ORMA plate, permanently fastened to an end edge each of the top ORMA plate and the bottom ORMA plate, and having at least one cotter pin hole;

wherein, when coupled together, the top ORMA plate, bottom ORMA plate, front ORMA plate and end ORMA plate form a pocket for receiving an end of the center rail assembly; and wherein the center rail assembly includes a cotter pin hole located along the center rail assembly;

wherein upon insertion of the end of the center rail assembly into the pocket, the cotter pin hole in the center rail assembly, the cotter pin hole in the front ORMA plate and the cotter pin hole the end ORMA plate align to facilitate insertion therein of a second cotter pin; and wherein upon insertion of the second cotter pin into the cotter pin holes, the center rail assembly is non-permanently fastened to the first outrigger rail assembly.

8. The TV lift assist device of claim 7, wherein the stand assembly further comprises:

a front rail assembly, extending perpendicularly to and away from the center rail assembly towards the front; and wherein center rail assembly is non-permanently fastened to a riser assembly shaft and permanently fastened to the front rail assembly by a Riser Assembly Shaft Mating Assembly ("RSMA").

9. The TV lift assist device of claim 8, wherein the RSMA comprises:

an RSMA center angle bracket;

an RSMA shaft bracket;

an RSMA left angle bracket;

an RSMA right angle bracket;

a left front RSMA right-angle bracket; and a right front RSMA right-angle bracket;

wherein the front rail assembly is coupled to the RSMA shaft bracket by the RSMA center angle bracket;

wherein the front rail assembly is coupled to the center rail assembly by the left front RSMA right-angle bracket and by the right front RSMA right-angle bracket; and wherein the center rail assembly is coupled to the RSMA shaft bracket by the RSMA left angle bracket and by the RSMA right angle bracket.

10. The TV lift assist device of claim 9, wherein the RSMA further comprises:

a left end RSMA right-angle bracket coupled to an end surface of the center rail assembly;

a right end RSMA right-angle bracket coupled to the end surface of the center rail assembly; and an RSMA back brace having a given width;

wherein the left end RSMA right-angle bracket is fastened, along the center rail assembly the given width from the right end RSMA right-angle bracket so as to accept insertion of the RSMA back brace therebetween; and wherein the RSMA back brace, when inserted between the left end RSMA right-angle bracket and the right end RSMA right-angle bracket increases the structural rigidity of the TV lift assist device when a riser assembly shaft is inserted into the RSMA.

11. The TV lift assist device of claim 7, wherein the first elevation is higher than the second elevation.

12. A TV lift assist device, comprising:

a TV Holder Assembly ("TVHA") configured for holding a television ("TV") during at least one TV mounting operation;

a riser assembly, coupled to the TVHA; and a stand assembly, coupled to the riser assembly, comprising:

a center rail assembly; and a first outrigger rail assembly coupled to the center rail assembly;

wherein the first outrigger rail assembly extends from a front to an end of the first outrigger rail assembly, and includes a top surface and a bottom surface;

wherein the first outrigger rail assembly comprises:

a first front foot pad coupled to the bottom surface and at a first location proximate to the first outrigger rail assembly;

a first Leg Height Adjustment Assembly ("LHAA") coupled to the first outrigger rail assembly at a second location proximate to the end of the first outrigger rail assembly;

a first adjustable leg coupled to the first LHAA; and a first end foot pad coupled to a bottom surface of the first adjustable leg; and wherein the first LHAA facilitates levelling of the stand assembly by extensions or retractions of the first adjustable leg within the first LHAA when the first front foot pad is resting on a first surface at a first elevation and the first end foot pad is resting on a second surface at a second elevation;

wherein the riser assembly further comprises:

a riser assembly shaft;

a middle riser assembly;

an upper riser assembly;

a hoist assembly; and a strap extending from the hoist assembly, over the upper riser assembly, and to the middle riser assembly to non-permanently fasten the hoist assembly to the middle riser assembly; and wherein operation of the hoist assembly facilitates raising and lowering of the middle riser assembly, along the riser assembly shaft.

13. The TV lift assist device of claim 12, wherein the middle riser assembly is non-permanently fastened to the TVHA;

wherein the middle riser assembly is non-permanently fastened to the riser assembly shaft;

wherein the upper riser assembly is non-permanently fastened to the riser assembly shaft;

wherein the hoist assembly is non-permanently fastened to the riser assembly shaft; and wherein the riser assembly shaft is non-permanently fastened to the stand assembly.

14. The TV lift assist device of claim 12, wherein the middle riser assembly facilitates extensions of the TVHA away from the riser assembly shaft.

15. The TV lift assist device of claim 14, wherein the middle riser assembly facilitates yaw movements of the TVHA relative to a ground plane formed by an X-Y plane in an X-Y-Z coordinate system.

16. A TV lift assist device, comprising:

a TV Holder Assembly ("TVHA") configured for holding a television ("TV") during at least one TV mounting operation;

a riser assembly, coupled to the TVHA; and a stand assembly, coupled to the riser assembly, comprising:

a center rail assembly; and a first outrigger rail assembly coupled to the center rail assembly;

wherein the first outrigger rail assembly extends from a front to an end of the first outrigger rail assembly, and includes a top surface and a bottom surface;

wherein the first outrigger rail assembly comprises:

a first front foot pad coupled to the bottom surface and at a first location proximate to the first outrigger rail assembly;

a first Leg Height Adjustment Assembly ("LHAA") coupled to the first outrigger rail assembly at a second location proximate to the end of the first outrigger rail assembly;

a first adjustable leg coupled to the first LHAA; and a first end foot pad coupled to a bottom surface of the first adjustable leg; and wherein the first LHAA facilitates levelling of the stand assembly by extensions or retractions of the first adjustable leg within the first LHAA when the first front foot pad is resting on a first surface at a first elevation and the first end foot pad is resting on a second surface at a second elevation;

wherein the TVHA further comprises:

a left TVHA vertical plate;

a left TVHA vertical support plate;

wherein the left TVHA vertical support plate is substantially parallel with and coupled to the left TVHA vertical plate;

a right TVHA vertical plate;

wherein the right TVHA vertical plate is substantially parallel to the left TVHA vertical plate;

a right TVHA vertical support plate;

wherein the right TVHA vertical support plate is substantially parallel with and coupled to the right TVHA vertical plate;

a TVHA upper horizontal plate;

wherein the TVHA upper horizontal plate is perpendicular to and coupled on a left side of the TVHA to the left TVHA vertical support plate; and wherein the TVHA upper horizontal plate is perpendicular to and coupled on a right side of the TVHA to the right TVHA vertical support plate;

a TVHA front shelf plate;

wherein the TVHA front shelf plate is perpendicular to and coupled on the left side of the TVHA to the left TVHA vertical support plate; and wherein the TVHA front shelf plate is perpendicular to and coupled on the right side of the TVHA to the right TVHA vertical support plate;

a TVHA end shelf plate;

wherein the TVHA end shelf plate is substantially parallel to and coupled to the TVHA front shelf plate; and a TVHA middle vertical plate;

wherein the TVHA middle vertical plate is substantially perpendicular to and coupled to TVHA upper horizontal plate;

wherein the TVHA middle vertical plate is substantially perpendicular to and coupled to TVHA end shelf plate; and wherein the TVHA middle vertical plate couples the TVHA to the riser assembly.

17. The TV lift assist device of claim 16, wherein at least one of:

the left TVHA vertical support plate is adjustably coupled to the left TVHA vertical plate, and the right TVHA vertical support plate is adjustably coupled to the left TVHA vertical plate;

wherein of at least one of:

an adjustment of the left TVHA vertical plate above the TVHA vertical support plate, and an adjustment of the right TVHA vertical plate relative to the right TVHA vertical support plate configures the TVHA to hold a television having a height ranging between twenty-four (24) inches and sixty-four (64) inches.

18. The TV lift assist device of claim 17, wherein the TVHA front shelf plate is adjustably coupled to the TVHA end shelf plate; and wherein an adjustment of the TVHA front shelf plate relative to the TVHA end shelf plate configures the TVHA to hold a television having a width ranging between twenty-four (24) inches and one hundred and twenty-four (124) inches.

19. The TV lift assist device of claim 16, wherein the TVHA further comprises at least one of:

a left TVHA assist arm coupled to one of the left TVHA vertical plate;

wherein the left TVHA assist arm stabilizes the TV by extending a TVHA TV hook beyond a left vertical plane formed by a combination of the left TVHA vertical plate and the left TVHA vertical support plate; and a right TVHA assist arm coupled to the right TVHA vertical plate;

wherein the right TVHA assist arm stabilizes the TV by extending the TVHA TV hook beyond a right vertical plane formed by a combination of the right TVHA vertical plate and the right TVHA vertical support plate.

20. The TV lift assist device of claim 16, wherein the first elevation is higher than the second elevation.

* * * * *